(12) United States Patent
Iwase et al.

(10) Patent No.: US 6,188,803 B1
(45) Date of Patent: *Feb. 13, 2001

(54) IMAGE PROCESSING DEVICE

(75) Inventors: Seiichiro Iwase; Masuyoshi Kurokawa; Mamoru Kanou, all of Kanagawa; Kenichiro Nakamura, Saitama, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/949,606

(22) Filed: Oct. 14, 1997

(30) Foreign Application Priority Data

Oct. 18, 1996 (JP) .................................... 8-275996
Oct. 29, 1996 (JP) .................................... 8-286571

(51) Int. Cl.$^7$ ........................................... G06K 9/32
(52) U.S. Cl. ......................... 382/300; 382/304; 358/428; 358/525
(58) Field of Search ................................... 382/300, 232, 382/247, 279, 303, 304, 299, 302; 358/428, 525; 345/132

(56) References Cited

U.S. PATENT DOCUMENTS

| | | | |
|---|---|---|---|
| 4,468,688 | * 8/1984 | Gabriel et al. | ......................... 358/22 |
| 4,578,812 | * 3/1986 | Yui | ......................... 382/41 |
| 4,689,756 | * 8/1987 | Koyama et al. | ...................... 364/513 |
| 5,008,752 | * 4/1991 | Van Nostrand | ...................... 358/160 |
| 5,140,541 | * 8/1992 | Sakata et al. | ................... 364/724.19 |
| 5,210,705 | * 5/1993 | Chauvel et al. | ...................... 364/572 |
| 5,276,275 | * 1/1994 | Suzuki et al. | .......................... 84/661 |
| 5,283,651 | * 2/1994 | Ishizuka | ............................... 348/704 |
| 5,367,337 | * 11/1994 | Pyle et al. | ............................ 348/521 |
| 5,574,572 | * 11/1996 | Malinowski et al. | ................. 358/451 |
| 5,600,582 | * 2/1997 | Miyaguchi | ...................... 364/724.01 |

* cited by examiner

Primary Examiner—Bhavesh Mehta
Assistant Examiner—Kanji Patel
(74) Attorney, Agent, or Firm—Ronald P. Kananen; Rader, Fishman & Grauer

(57) ABSTRACT

The present invention relates to an image processing device for converting the number of pixels or scanning lines. In particular, the image processing device according to the present invention comprises an operator for carrying out interpolation operations and a memory for storing filter coefficient sets utilized in the interpolation operations. The memory stores filter coefficient sets each corresponding to each of the phases when the pixel interval of the original image is divided by a prescribed dividing number. Out of these filter coefficient sets, a filter coefficient set that corresponds to the phase closest to that of the pixel data to undergo interpolation operations is then outputted to the operator. The operator then carries out interpolation operations on the pixel data using these filter coefficient sets so that arbitrary format conversion becomes possible.

43 Claims, 32 Drawing Sheets

FIG. 11

| CYCLE | INPUT DATA | FILTER SELECT SIGNAL | CONTROL SIGNAL | REGISTER 2-1 TO 2-4 | | | | OUTPUT DATA |
|---|---|---|---|---|---|---|---|---|
| 1 | R1 | | | | | | | |
| 2 | R2 | | | | | | | |
| 3 | R3 | | | | | | | |
| 4 | R4 | P0 | H | Rm0 | Rm1 | Rm1 | Rm3 | |
| 5 | R4 | P7 | H | R1 | Rm0 | Rm1 | Rm2 | |
| 6 | R5 | P4 | H | R2 | R1 | Rm0 | Rm2 | |
| 7 | R6 | P1 | L | R3 | R2 | R1 | Rm1 | |
| 8 | R6 | P8 | H | R3 | R2 | R1 | Rm0 | Q1 |
| 9 | R7 | P5 | H | R4 | R3 | R2 | Rm0 | Q2 |
| 10 | R8 | P2 | L | R5 | R4 | R3 | R1 | Q3 |
| 11 | R8 | P9 | H | R5 | R4 | R3 | R2 | Q4 |
| 12 | R9 | P6 | H | R6 | R5 | R4 | R2 | Q5 |
| 13 | R10 | P3 | L | R7 | R6 | R5 | R3 | Q6 |
| 14 | R10 | P0 | H | R7 | R6 | R5 | R4 | Q7 |
| | | | | R8 | R7 | R6 | R4 | Q8 |
| | | | | R9 | R8 | R7 | R5 | Q9 |
| | | | | R9 | R8 | R7 | R6 | Q10 |
| | | | | | | | R6 | Q11 |

FIG. 12

| FILTER SELECT SIGNAL P1 | NORMALIZED PHASE AMOUNT x | DECIMAL POINT REPRESENTATION COEFFICIENT | | | | 8-BIT REPRESENTATION COEFFICIENT | | | | COEFFICIENT SUM |
|---|---|---|---|---|---|---|---|---|---|---|
| | | FC1 | FC2 | FC3 | FC4 | FC1 | FC2 | FC3 | FC4 | |
| P0 | 0/10=0.0 | 0.0 | 1.0 | 0.0 | 0.0 | 0 | 128 | 0 | 0 | 128 |
| P1 | 1/10=0.1 | -0.009 | 0.981 | 0.109 | -0.081 | -1 | 126 | 14 | -10 | 129 |
| P2 | 2/10=0.2 | -0.032 | 0.928 | 0.232 | -0.128 | -4 | 119 | 30 | -16 | 129 |
| P3 | 3/10=0.3 | -0.063 | 0.847 | 0.363 | -0.147 | -8 | 108 | 46 | -19 | 127 |
| P4 | 4/10=0.4 | -0.096 | 0.744 | 0.496 | -0.144 | -12 | 95 | 63 | -18 | 128 |
| P5 | 5/10=0.5 | -0.125 | 0.625 | 0.625 | -0.125 | -16 | 80 | 80 | -16 | 128 |
| P6 | 6/10=0.6 | -0.144 | 0.496 | 0.744 | -0.096 | -18 | 63 | 95 | -12 | 128 |
| P7 | 7/10=0.7 | -0.147 | 0.363 | 0.847 | -0.063 | -19 | 46 | 108 | -8 | 127 |
| P8 | 8/10=0.8 | -0.128 | 0.232 | 0.928 | -0.032 | -16 | 30 | 119 | -4 | 129 |
| P9 | 9/10=0.9 | -0.081 | 0.109 | 0.981 | -0.009 | -10 | 14 | 126 | -1 | 129 |

FIG. 15

| TYPE | SECOND LEFT | FIRST LEFT | CENTER | FIRST RIGHT | SECOND RIGHT | THIRD RIGHT | EXAMPLE |
|---|---|---|---|---|---|---|---|
| 1 | ○ | | ○ | ○ | | ○ | $Q_3, Q_6, Q_{13}, \cdots$ |
| 2 | | ○ | ○ | | ○ | ○ | $Q_4, Q_7, Q_{11}, \cdots$ |
| 3 | ○ | ○ | | ○ | ○ | | $Q_5, Q_8, Q_{12}, \cdots$ |
| 4 | | | ○ | ○ | ○ | | $Q_9, \cdots$ |
| 5 | | ○ | ○ | ○ | | ○ | $Q_{10}, \cdots$ |

FIG. 21

| TYPE | SECOND LEFT | FIRST LEFT | CENTER | FIRST RIGHT | SECOND RIGHT | THIRD RIGHT | EXAMPLE |
|---|---|---|---|---|---|---|---|
| 1 | ○→ |  | ○ | ○→ |  | ○ | $Q_3, Q_6, Q_{13}, \cdots$ |
| 2 |  | ○ | ○ |  | ○ | ○ | $Q_4, Q_7, Q_{11}, \cdots$ |
| 3 | ○ | ○→ | ○ | ○ |  |  | $Q_5, Q_8, Q_{12}, \cdots$ |
| 4 | ○ |  | ○ | ○ | ○ |  | $Q_9, \cdots$ |
| 5 |  | ○ | ○ | ○→ |  | ○ | $Q_{10}, \cdots$ |

FIG. 22

| TYPE | SECOND LEFT | FIRST LEFT | CENTER | FIRST RIGHT | SECOND RIGHT | THIRD RIGHT |
|---|---|---|---|---|---|---|
| 2 |  | ○ | ○ |  | ○ | ○ |
| 4 | ○ |  | ○ | ○ | ○ |  |

FIG. 26

| y \ x | 8 | 9 | 10 | 11 | 12 | 13 | 14 | 15 | 16 | 17 | 18 | 19 |
|---|---|---|---|---|---|---|---|---|---|---|---|---|
| 15 | | | | | φ53 (23) | φ52 | φ51 | φ50 | | | | |
| 14 | | | | | φ83 | φ82 | φ81 | φ80 | | | | |
| 13 | | | | | φ13 | φ12 | φ11 | φ10 | | | | |
| 12 | | | | | φ43 | φ42 | φ41 | φ40 | | | | |
| 11 | | | | | φ73 | φ72 | φ71 | φ70 | | | | |
| 10 | | | | | φ03 | φ02 | φ01 | φ00 | | | | |
| 9 | | | | | φ33 | φ32 | φ31 | φ30 | | | | |
| 8 | | | | | φ63 | φ62 | φ61 | φ60 | | | | |
| 7 | | | | | φ93 | φ92 | φ91 | φ90 | | | | |
| 6 | | | | | φ23 | φ22 | φ21 | φ20 | | | | |
| 5 | | | | | φ53 | φ52 | φ51 | φ50 | | | | |
| 4 | | | | | φ83 | φ82 | φ81 | φ80 | | | | |
| 3 | | | | | φ13 | φ12 | φ11 | φ10 | | | | |
| 2 | | | | | φ43 | φ42 | φ41 | φ40 | | | | |
| 1 | | | | | φ73 | φ72 | φ71 | φ70 | | | | |
| 0 | | | | | φ03 | φ02 | φ01 | φ00 | | | | |

FIG. 34

| FILTER SELECT SIGNAL Pi | NORMALIZATION PHASE AMOUNT x | FILTER COEFFICIENT SET (DECIMAL POINT REPRESENTATION COEFFICIENT) | | | | FILTER COEFFICIENT SET (8-BIT REPRESENTATION COEFFICIENT) | | | |
|---|---|---|---|---|---|---|---|---|---|
| | | Fc1 | Fc2 | Fc3 | Fc4 | Fc1 | Fc2 | Fc3 | Fc4 |
| P0 | 0/16 =0.0 | 0.0 | 1.0 | 0.0 | 0.0 | 0 | 128 | 0 | 0 |
| P1 | 1/16 =0.0625 | -0.0549 | 0.9924 | 0.0662 | -0.0037 | -7 | 127 | 8 | 0 |
| P2 | 2/16 =0.125 | -0.0957 | 0.9707 | 0.1387 | -0.0137 | -12 | 124 | 18 | -2 |
| P3 | 3/16 =0.1875 | -0.1238 | 0.9363 | 0.2161 | -0.0286 | -16 | 120 | 28 | -4 |
| P4 | 4/16 =0.25 | -0.1406 | 0.8906 | 0.2969 | -0.0469 | -18 | 114 | 38 | -6 |
| P5 | 5/16 =0.3125 | -0.1477 | 0.8352 | 0.3796 | -0.0671 | -19 | 107 | 49 | -9 |
| P6 | 6/16 =0.375 | -0.1465 | 0.7715 | 0.4629 | -0.0879 | -19 | 99 | 59 | -11 |
| P7 | 7/16 =0.4375 | -0.1384 | 0.7009 | 0.5452 | -0.1077 | -18 | 90 | 70 | -14 |
| P8 | 8/16 =0.5 | -0.1250 | 0.6250 | 0.6250 | -0.1250 | -16 | 80 | 80 | -16 |
| P9 | 9/16 =0.5625 | -0.1077 | 0.5452 | 0.7009 | -0.1384 | -14 | 70 | 90 | -18 |
| P10 | 10/16 =0.625 | -0.0879 | 0.4629 | 0.7715 | -0.1465 | -11 | 59 | 99 | -19 |
| P11 | 11/16 =0.6875 | -0.0671 | 0.3796 | 0.8352 | -0.1477 | -9 | 49 | 107 | -19 |
| P12 | 12/16 =0.75 | -0.0469 | 0.2969 | 0.8906 | -0.1406 | -6 | 38 | 114 | -18 |
| P13 | 13/16 =0.8125 | -0.0286 | 0.2161 | 0.9363 | -0.1238 | -4 | 28 | 120 | -16 |
| P14 | 14/16 =0.875 | -0.0137 | 0.1387 | 0.9707 | -0.0957 | -2 | 18 | 124 | -12 |
| P15 | 15/16 =0.9375 | -0.0037 | 0.0662 | 0.9924 | -0.0549 | 0 | 8 | 127 | -7 |

FIG. 35

| Qi | ΣPd | REMAINDER (PHASE) | Pi (D=16) | PHASE ERROR |
|---|---|---|---|---|
| Q1 | 0.0 | 0.0 | $P_0$ (x=0.0) | 0.0 |
| Q2 | 0.7 | 0.7 | $P_{11}$ (x=0.6875) | 0.0125 |
| Q3 | 1.4 | 0.4 | $P_6$ (x=0.375) | 0.025 |
| Q4 | 2.1 | 0.1 | $P_2$ (x=0.125) | 0.025 |
| Q5 | 2.8 | 0.8 | $P_{13}$ (x=0.8125) | 0.0125 |
| Q6 | 3.5 | 0.5 | $P_8$ (x=0.5) | 0.0 |
| Q7 | 4.2 | 0.2 | $P_3$ (x=0.1875) | 0.0125 |
| Q8 | 4.9 | 0.9 | $P_{14}$ (x=0.875) | 0.025 |
| Q9 | 5.6 | 0.6 | $P_{10}$ (x=0.625) | 0.025 |
| Q10 | 6.3 | 0.3 | $P_5$ (x=0.3125) | 0.0125 |
| Q11 | 7.0 | 0.0 | $P_0$ | |
| Q12 | 7.7 | 0.7 | $P_{11}$ | |
| Q13 | 8.4 | 0.4 | $P_6$ | |
| Q14 | 9.1 | 0.1 | $P_2$ | |
| Q15 | 9.8 | 0.8 | $P_{13}$ | |
| Q16 | 10.5 | 0.5 | $P_8$ | |
| ⋮ | | | | |

IMAGE PROCESSING DEVICE

BACKGROUND OF THE INVENTION

1. Field of the Invention

The present invention relates to an image processing device and more particularly relates to an image processing device for enlarging or reducing an image by an arbitrary scale by carrying out interpolation of pixel data utilizing a filter coefficient set, of filter coefficient sets corresponding to each phase at the time of dividing the intervals of pixels of an original image by a prescribed dividing number, that is closest the phase of the pixel to be interpolated.

2. Description of Related Art

The use of Cathode Ray Tubes (hereinafter abbreviated to "CRTs") in displays such as televisions etc. is prevalent, with the handling of analog image signals compatible with various image methods and the changing of horizontal scanning frequency to attain compatibility when displaying these images being common.

However, when handling digital image signals, image resolutions often differ depending on the broadcast transmission method as in the case of, for example, NTSC (National Television System Committee) or PAL (Phase Alternation Line-rate), with the number of pixels in the horizontal and vertical directions of images digitized by these methods therefore differing with each method of broadcast transmission. As there are many broadcast methods including HDTV (High Definition TeleVision) etc., there are therefore many pixel number (resolution) standards. Because of this, it is therefore necessary for a system carrying out digital processing on image data to be compatible with all of these transmission methods and it is therefore necessary for the number of pixels to be converted by an "interpolation filter".

Further, as the number of pixels for a displayed image is also fixed at a prescribed number for liquid displays and plasma displays that have also recently become widespread, an interpolation filter for converting the number of pixels of a source image to a number of pixels compatible with these displays is also required.

Next, a description is given of an example of an interpolation filter for converting the number of pixels for an image.

First, a description will be given of the conversion of the enlargement or reducing of the image, and the sampling frequency (number of pixels).

The cases of either enlarging or reducing an image or converting (conversion across image standards of differing resolutions) the sampling frequency (number of pixels) of the image are all realized by carrying out calculations to obtain data for pixels that did not exist in the original image with respect to the position of each pixel of the original image. It is therefore possible to carry out the above two processes by utilizing an interpolation filter for carrying out the same arithmetic operations.

FIG. 1 shows an example of a portion of an original image, with circles in the center of the drawing indicating the position of pixels. This portion includes 8 horizontal pixels and 6 vertical pixels (the number of pixels has been taken to be small for simplicity).

Next, a description is given of the case where a source image is enlarged by the scale of, for example, 10/7. This scale is expressed as a ratio of lengths rather than as a surface area. In the case of the enlargement of the image of FIG. 1, the pixel arrangement (i.e. the pixel spacing etc.) is kept the same as in FIG. 1 so that the displayed image standard does not change. The resulting image after this enlargement is carried out is shown in FIG. 2. As the scale in this case is 1.429 (=10/7) the length of one side of the image is increased by 1.429 times and the number of pixels is increased by approximately $1.429^2$.

With respect to, for example, the horizontal direction, there are 8 pixels in the horizontal direction in the original image, with this increasing to 11 or 12 (adjusted to be close to 8×10/7=11.429) after enlargement. The positional relationship of each of the pixels corresponding to the same portions of the image in the analogous image after enlargement is therefore different to the positional relationship occurring in the original image. The values for data (expressing luminance and color) for each of the pixels after enlargement are therefore different with those of the original image.

FIG. 3 shows the positional relationship of pixels for the horizontal direction of an original image and an image after enlarging in the case of enlarging an image by a scale of 10/7.

In FIG. 3, $R_i$ (i=1, 2, ...) on the upper side shows pixel data for the original image and $Q_i$ (i=1, 2, ...) on the lower side represents interpolation pixel data after enlargement. A pixel corresponding to $R_i$ is then arranged at a spacing that is 10/7 times that of the spacing for the pixel corresponding to $Q_i$. FIG. 3 only shows the situation for enlargement in the horizontal direction, but the situation is the same for enlargement in the vertical direction, and a description thereof will be omitted.

The values for the data for each of the pixels after enlargement is calculated by interpolation filter operations, i.e. carrying out convolution operations on interpolation coefficients from the values for the pixel data for several peripheral source images in response to the corresponding relationship of the positions of each of the pixels of the source image show n in FIG. 3.

Next, the case of scaling the sampling frequency by, for example, 10/7 without changing the size of the image is described. Changing the sampling frequency in this way is the equivalent of changing the resolution to a higher image standard by a scale of 10/7, i.e. the number of pixels in the horizontal direction is changed by 10/7. In this case, the source image of FIG. 1 is changed one-dimensionally to an image having approximately 1.429 times the number of pixels, i.e. an image having $1.429^2$ times the surface density, as shown in FIG. 4.

The corresponding relationship of each of the pixels of FIG. 1 and each of the pixels of FIG. 2 and the corresponding relationship of each of the pixels of FIG. 1 and each of the pixels of FIG. 4 is the same in both cases, as shown in FIG. 3. The arithmetic operation for converting to an image standard where there are more pixels is the same as the arithmetic operation for enlarging an ag image Next, a description is given of the case of reducing the source image of FIG. 1 by a scale of, for example, 10/13.

As the image standard is not changed in the case of reducing the image, the arrangement of the pixels occurring in the image after reducing, i.e. the pixel spacing etc. is the same as for the source image shown in FIG. 1.

FIG. 5 shows the source image of FIG. 1 reduced by a scale of 10/13. In this case, the scaling factor is 0.769 (=10/13). The length of one side of the image is therefore reduced by 0.769 times and the number of pixels comprising the reduced image is reduced by approximately $0.769^2$.

For example, the number of pixels in the horizontal direction of the source image is 8 but after reducing this becomes 6 or 7 (adjusted to be near 8×10/13=6.154). The positional relationship of each of the pixels corresponding to the same portions of the image occurring in the analogous image after reducing is therefore different from the positional relationship of each of the pixels occurring in the original image, with the values for the data (expressing luminance and color) for each of the pixels after reducing therefore being different to those of the original image.

FIG. 6 shows the relationship between the pixels for the horizontal direction in the original image and the image after reducing when the image is reduced to a scale of 10/13.

In FIG. 6, Ri (i=1, 2, ...) of the upper side represent pixel data of the source image and Qi (i=1, 2, ...) of the lower side represent interpolation pixel data for after reducing. The pixels corresponding to Ri are arranged at a pixel spacing that is 10/13 times the spacing of the pixels corresponding to Qi. FIG. 6 shows just the situation for reducing in the horizontal direction and as the situation is the same for the vertical direction, the case for the vertical direction will be omitted.

The values for the data for each of the pixels after reducing is calculated by interpolation filter operations, i.e. carrying out convolution operations on interpolation coefficients from the values for the pixel data for several peripheral source images in response to the corresponding relationship of the positions of each of the pixels of the source image shown in FIG. 6.

Next, the case of scaling the sampling frequency by, for example, 10/13 without changing the size of the image is described. Changing the sampling frequency in this way is the equivalent of changing the resolution to a higher image standard by a scale of 10/13, i.e. the number of pixels in the horizontal direction is changed by 10/13. In this case, the source image of FIG. 1 is changed one-dimensionally to an image having approximately 0.769 times the number of pixels, i.e. an image having $0.769^2$ times the surface density, as shown in FIG. 7.

The corresponding relationship of each of the pixels of FIG. 1 and each of the pixels of FIG. 5 and the corresponding relationship of each of the pixels of FIG. 1 and each of the pixels of FIG. 7 is the same in both cases, as shown in FIG. 6. The arithmetic operation for converting to an image standard where the resolution is lower is the same as the arithmetic operation for reducing an image.

When, in the above, an image is enlarged or reduced, or a sampling frequency (number of pixels) is converted, an interpolation filter calculating pixel data for values that do not exist in the original image is necessary.

Next, a description is given of the operations carried out at the interpolation filter.

When, as shown in FIG. 8, the sampling interval of the original image is taken to be S and a position distanced by a distance (phase) P from the position of the pixel R of the source image is taken to be the position (interpolation point) of the pixel Qi generated by interpolation, a value for the pixel Qi is calculated by performing a convolution operation on the value R of the pixel for the peripheral source image.

According to sampling theory, when ideal interpolation is carried out, equation (1) and a sinc function shown in FIG. 9A are taken as an interpolation function f(x), and a convolution operation for pixels from an infinite time in the past to pixels for an infinite time in the future is carried out.

$$f(x) = \text{sin } c(\pi x x) = \text{sin } (\pi x x)/(\pi x x) \tag{1}$$

where $\pi$ is the ratio of the circumference of a circle to its diameter.

However, as it is necessary in reality to calculate the interpolation values within a finite time, an approximate interpolation coefficient is utilized within a finite range.

A nearest, approximation method, bilinear approximation method and cubic approximation method are well known as approximation methods.

In the nearest approximation method, data for one pixel after interpolation is calculated from data for one pixel of source image utilizing the kind of interpolation function shown in equation (2) and FIG. 9B. The variable x of equation (2) and FIG. 9B expresses displacement in the horizontal direction from the pixel position in the original image as a normalized amount using the sampling interval of the original image.

Equation 1 (2)

$$\begin{cases} f(x) = 1 & -0.5 < x \le 0.5 \\ f(x) = 0 & -0.5 \ge x, x > 0.5 \end{cases}$$

In the bilinear approximation method, data for one pixel after interpolation is calculated from data for two pixels of the original image utilizing the interpolation function denoted by equation (3) and shown in FIG. 9C. The variable x in equation (3) and FIG. 9C represents displacement in the horizontal direction from the pixel position in the original image as an amount normalized by the sampling interval of the original image. Further, the bilinear approximation method is a well-known method for the linear interpolation method for calculating weighted mean.

Equation 2 (3)

$$\begin{cases} f(x) = 1 - |x| & |x| \le 1 \\ f(x) = 0 & |x| > 1 \end{cases}$$

In the cubic approximation method, data for the first pixel after interpolation is calculated from data for four pixels of the original image utilizing the interpolation coefficient shown in equation (4) and FIG. 9D. The variable x of equation (4) and FIG. 9D expresses displacement in the horizontal direction from the pixel position in the original image as a normalized amount using the sampling interval of the original image.

Equation 3 (4)

$$\begin{cases} f(x) = |x|^3 - 2|x|^2 + 1 & |x| \le 1 \\ f(x) = -|x|^3 + 5|x|^2 - 8|x| + 4 & 1 < |x| \le 2 \\ f(x) = 0 & 2 < |x| \end{cases}$$

The convolution operations with the above approximation methods can be carried out by utilizing a so-called FIR (Finite Impulse Response) digital filter. In this operation, sampled values for an interpolation function, which are sampled by the number equal to the prescribed number of the pixels at the sampling points for the original image in the neighborhood of the interpolation point with the interpolation point fitted at the center of the interpolation function, are used as an interpolation filter coefficient set.

For example, when operations are performed using the bilinear approximation method, when the phase P is 0.0, the two weightings (filter coefficients) comprising the filter coefficient set are 1.0 and 0.0, and the coefficient set is therefore the values for the pixel data for the original image with which this position coincides outputted as is.

When the phase P is 0.5, the two filter coefficients are 0.5 and 0.5, and when P is 0.3, the two filter coefficients are 0.7 and 0.3.

In the case of carrying out interpolation operations using the Cubic approximation method, when the phase P is 0.0, the four weightings (filter coefficients) comprising the filter coefficient set are 0.0, 1.0, 0.0 and 0.0 and the coefficient set is the pixel data values for the original image with which this position coincides outputted as is.

Further, when the phase P is 0.5, the four filter coefficients are −0.125, 0.625, 0.625 and −0.125, and are −0.063, 0.847, 0.363 and −0.147 when P is 0.3.

However, as the phases P of pixels of the source image are different for each interpolation point calculated for the data at this time, a plurality of filter coefficient sets corresponding to different phases are required.

Next, a description is given of a related interpolation filter operation device.

FIG. 10 shows an example configuration of an operation device utilizing an interpolation operation, i.e. utilizing an FIR digital filter for carrying out interpolation function convolution operations. The operation device of FIG. 10 carries out convolution operations by utilizing a Cubic approximation method.

A coefficient memory 1 holds a plurality of filter coefficients corresponding to each interpolation point (or each phase) and outputs four filter coefficients FC1, FC2, FC3 and FC4 corresponding to filter select signals supplied by a prescribed device (not shown in the drawings) to multipliers 3-1 to 3-4.

A register 2-1 holds data supplied by a prescribed device (not shown in the drawings) for outputting to a register 2-2 in accordance with a control signal. Registers 2-2 and 2-3 hold data supplied from register 2-1 and 2-2 for outputting to registers 2-3 and 2-4 in accordance with a control signal and register 2-4 holds data supplied by register 2-3.

Registers 2-1 to 2-4 are connected in series so as to operate as a four stage shift register. Horizontally scanned input image data strings are then sequentially inputted in word units to this shift register so that pixel data for four consecutive source images is stored.

In the Cubic approximation method, interpolation data is then calculated from data for a total of four pixels that are two pixels to the left and right that sandwich the interpolation point utilizing a four stage shift register.

The multiplier 3-i (i=1, . . . , 4) multiplies the value stored in the register 2-i and the value (filter coefficient) FCi supplied by the coefficient memory 1 and outputs the result to an adder 4.

The adder 4 calculates the total of the values supplied by the multipliers 3-1 to 3-4 and outputs this total as the interpolation value.

The sum of the products of the data and filter coefficients inputted to the register 2-1 in this way along a time series is calculated at the multipliers 3-1 to 3-4 and the adder 4 with data for interpolation points that is the result of this operation being outputted along a time series.

A description will now be given of the operation of the operation device of FIG. 10 when an original image is enlarged using Cubic approximation by 10/7.

With 10/7 times enlargement of an image, the positional relationship of each of the pixels with respect to each interpolation point in the horizontal direction is set as shown in FIG. 8 and interpolation filter operations are performed.

FIG. 11 shows the values possessed by each part of the operation device of FIG. 10 occurring in each cycle.

With the hardware device for carrying out processing shown in FIG. 10, latency (delays for realizing high-speed operations) usually occurs due to pipeline processing occurring at portions for these multiplication and sum operations, but in this case it is assumed for simplicity that there is no latency.

In the first cycle of FIG. 11, input data R1 that is image data for one pixel portion of the source image is supplied by a prescribed device. At this time, the registers 2-1 to 2-4 hold data Rm0 that is one previous to the input data R1, data Rm1 that is two previous to the input data R1, data Rm2 that is three previous to the input data R1 and data Rm3 that is four previous to the input data R1.

As the value of the control signal at this time is "H", the registers 2-1 to 2-4 shift the respective data on the rising edge of the following clock.

As the data is then respectively shifted, in the second cycle, the registers 2-1 to 2-4 hold R1, Rm0, Rm1 and Rm2. Further, as the value of the control signal at this time is "H", the registers 2-1 to 2-4 then shift data on the rising edge of the following clock.

As the data is then respectively shifted again, in the third cycle, the registers 2-1 to 2-4 hold R2, R1, Rm0 and Rm1. Moreover, as the value of the control signal at this time is "H", the registers 2-1 to 2-4 then shift data on the rising edge of the following clock.

The data is then similarly shifted, so that in the fourth cycle, the registers 2-1 to 2-4 hold R3, R2, R1 and Rm0. A filter select signal P0 showing the phase of the interpolation value Q1 with respect to Rm0, R1, R2 and R3 of FIG. 3 is then supplied to the coefficient memory 1 so that the filter select signal is then supplied so as to correspond to the phase P of the output signal Qi.

In this case, Ra of FIG. 8 corresponds to Rm0, Rb corresponds to R1, Rc corresponds to R2 and Rd corresponds to R3, with Q of FIG. 8 corresponding to interpolation value Q1.

The coefficient memory 1 stores the ten kinds of filter coefficient sets shown in FIG. 12 and selects and outputs four coefficients FC1, FC2, FC3 and FC4 in response to the supplied filter select signal Pi. As there are only the ten types shown in FIG. 3 for the phase of the pixels occurring in this interpolation operation when enlarging the image by a scale of 10/7, the coefficient memory 1 only has a number of filter coefficient sets equal to this number of phases.

Namely, the filter select signal Pi corresponds to the filter coefficient set of the ten types of phases corresponding to each position where S in FIG. 8 is divided into ten equal parts of phase i/10. The decimal point representation coefficient (filter coefficient) of FIG. 12 is a value calculated by taking the phase corresponding to the filter select signal Pi as x and substituting this in equation (4). The eight bit representation coefficient is calculated by limiting this decimal point representation coefficient to an eight bit word length (here the maximum amplitude is taken to be 128).

In this case, the coefficient memory 1 outputs the filter coefficient set (0.0, 1.0, 0.0, 0.0) corresponding to the phase P0 of FIG. 12 (0, 128, 0, 0) when expressed using eight bits) to the multipliers 3-1 to 3-4 as the four filter coefficients FC1, FC2, FC3 and FC4 because the filter select signal is P0.

The product sum operation is then carried out by the multipliers 3-1 to 3-4 and the adder 4, with the results of this operation being outputted as the output data Q1.

At this time (in the fourth cycle), the registers 2-1 to 2-4 do not output the held data on the following clock because the value of the control signal is "L".

In the fifth cycle, the registers 2-1 to 2-4 continue to hold the data held in the fourth cycle. At this time, a filter select signal P7 indicating the phase of the output data Q2 with respect to Rm0, R1, R2 and R3 of FIG. 3 is supplied to the coefficient memory 1.

In this case, as shown in FIG. 3, R1 and Q1 are the same phase and the interval for Q1 and Q2 is 7/10 that of the interval S for R1 and R2. The phase is therefore 7/10 and the filter select signal P7 is supplied.

The coefficient memory 1 then outputs the filter coefficient set (−0.147, 0.363, 0.847, −0.063) (when expressed as eight bits this is (−19, 46, 108, −8)) corresponding to the phase of 7/10 of FIG. 12 to the multipliers 3-1 to 3-4 as four filter coefficients FC1, FC2, FC3 and FC4 because the filter select signal is P7.

The aforementioned product sum operation is then carried out by the multipliers 3-1 to 3-4 and the adder 4, with the result being outputted as output data Q2.

As the pixels for the source image used in computing the output data Q1 for the fourth cycle and the output data Q2 for the fifth cycle are the same, the value for the control signal for the fourth cycle is taken as "L" and the registers 2-1 to 2-4 do not undergo a shift operation at the time of the transition to the fifth cycle.

As, at this time (i.e. in the fifth cycle) the value for the control signal is "H", the registers 2-1 to 2-4 shift data of the rising edge of the following clock.

In the sixth cycle, the registers 2-1 to 2-4 hold R4, R3, R2 and R1, respectively. A filter select signal P4 indicating the phase of the output data Q3 with respect to R4, R3, R2 and F1 of FIG. 3 is then supplied to the coefficient memory 1.

The phase for this occasion becomes 14/10 with 7/10 cumulated to the previous phase of 7/10, but, with subtraction of the phase corresponding to one original image data (=10/10), the phase on this occasion becomes 4/10 (=7/10+ 7/10 −10/10).

The phase therefore primarily changes by 7/10 at a time each one cycle and as the integral portion is then handled as a data delay, the phase becomes a modulo operation.

The coefficient memory 1 then outputs the filter coefficient set (−0.096, 0.744, 0.496, −0.144) (when expressed as eight bits this is (−12, 95, 63, −18)) corresponding to P4 of FIG. 12 to the multipliers 3-1 to 3-4 as four filter coefficients FC1, FC2, FC3 and FC4.

The above product sum operation is then carried out by the multipliers 3-1 to 3-4 and the adder 4, with the results being outputted as the output data Q3.

At this time, the registers 2-1 to 2-4 shift data on the rising edge of the following clock because the value for the control signal is "H".

The output data Qi is then sequentially outputted in a similar manner as shown in FIG. 11 as the process progresses.

When the number of pixels for an image is changed using the above device, the input data rate and output data rate also changes as a result of changing this number of pixels.

For example, in a conversion with an increase in the number of pixels, although the output data rate is fixed, supply of the input data string is halted in some cases as shown in the fifth cycle of FIG. 11. Further, in a conversion with a decrease in the number of pixels, although the input is fixed, the outputting of output data is halted in some cases.

The data rate can therefore be kept fixed by providing a buffer memory for temporarily storing input/output data for the operation device shown in FIG. 10.

Reducing or enlargement of the image and changing of the resolution is then carried out using hardware (i.e. by using an electronic circuit constructed so as to correspond to each of the operations occurring in the processing).

However, when an image is enlarged or reduced or resolution is changed using a hardware device, it is preferable for processing to be carried out simultaneously during image conversion. This means that in order to carry out various processes such as image processing, television signal processing and noise removal etc. devices corresponding to each process have to be provided separately. As a plurality of devices therefore have to be provided it becomes difficult to make the overall scale of the device small.

As it is the object of the present invention to resolve the aforementioned problems, the present invention sets out to provide an appropriate image processing device that can resolve the aforementioned problems while remaining small.

SUMMARY OF THE INVENTION

In order to achieve the aforementioned object, an image processing device for carrying out pixel data interpolation operations of the present invention comprises an operator and memory. The operator is for carrying out the interpolation operations and the memory is for storing filter coefficient sets utilized in the interpolation operation. The memory stores filter coefficient sets corresponding to phases when a pixel interval of an original image is divided by a prescribed dividing number and outputs a filter coefficient set, out of the filter coefficient sets, corresponding to a phase that is closest to the phase of pixel data that is to undergo the interpolation operation to the operator and the operator carries out the pixel data interpolation operation utilizing the outputted filter coefficient set.

Further, according to the present invention, an image processing device for processing pixel data interpolation operations in parallel under single instruction multiple data stream control comprises a plurality of element processors, a memory and a controller. The plurality of element processors is for carrying out the pixel data interpolation operations. The memory is for storing filter coefficient sets utilized in the interpolation operations. The controller is for putting the plurality of the element processors under single instruction multiple data stream control. The memory supplies filter coefficient sets, out of filter coefficient sets corresponding to phases when a pixel interval of an original image is divided by a prescribed dividing numbers, corresponding to phases that are closest to phases of pixel data to be processed, to the element processors. Prescribed element processor than carries out processing of the pixel data interpolation operations utilizing pixel data and filter coefficient sets possessed by peripheral element processors.

Here, the pixel data is supplied to a plurality of the element processors in such a manner that types of patterns for positional relationships of the peripheral element processors and the prescribed element processor are reduced to the smallest possible number.

The memory storing the filter coefficient sets is connected to the element processors.

The memory stores the filter coefficient sets in order of phases corresponding to the filter coefficient sets.

Further, the element processor can comprise a storage unit for storing the filter coefficient sets and an arithmetic logic unit for carrying out operations. The filter coefficient sets corresponding to phase information for pixel data allotted to each element processor are then supplied to the storage unit via the arithmetic logic unit. Here, the element processor itself can calculate the phase information.

The storage unit storing the filter coefficient sets can be connected to the arithmetic logic unit and stores the filter coefficient sets in order of phases corresponding to the filter coefficient sets.

Further, the element processor can calculate filter coefficient sets utilized in interpolation in accordance with phase information for pixel data allotted to the element processor and can also calculate the phase information.

Further, the interpolation operations are carried out so that the first interpolation operations are first carried out with the first dividing number in accordance with the first interpolation method and thereafter the second interpolation operations can be carried out with a second dividing number in accordance with the second interpolation method on results of the first interpolation operations.

Further, as the pixel data usually comprises luminance data and color data, the color data can be interpolated using a filter coefficient set corresponding to each phase when a pixel interval of an original image is divided by a dividing number that is smaller than the dividing number corresponding to filter coefficient sets used when carrying out interpolation of the luminance data.

According to the present invention, an image processing device for processing pixel data interpolation operations in parallel under single instruction multiple data stream control comprises a plurality of element processors, memory and a controller. The plurality of element processors are for carrying out the pixel data interpolation operations. The memory is for storing filter coefficient sets utilized in the interpolation operations. The controller is for putting the plurality of element processors under single instruction multiple data stream control. The memory supplies the pixel data to a plurality of the element processors in such a manner that types of patterns for the positional relationships of peripheral element processors, which have image data utilized by a prescribed element processor, and the prescribed element processors are reduced to the smallest possible number.

Each of the element processors then reads pixel data to be utilized in processing from the peripheral element processors in accordance with information, which corresponds to the patterns for positional relationships, supplied to each of the element processors and carries out processing of the pixel data.

With this image processing device, the processing of the pixel data is processing for carrying out interpolation of pixel values corresponding to enlarging or reducing of an image, and information generated when calculating phases of the pixels is used as information corresponding to the patterns for positional relationships in the processing for the interpolation.

Further, according to the present invention, an image processing device is provided for carrying out parallel processing for pixel data interpolation operations under single instruction multiple data stream control in association with enlarging or reducing of an image. The image processing device comprises a plurality of element processors for carrying out the interpolation operations of the pixel data supplied via an input bus to a plurality of the element processors, and a controller for putting a plurality of the element processors under single instruction multiple data stream control. The filter coefficient sets used in the interpolation are then supplied to a plurality of the element processors via the input bus, and each of the element processors carries out the pixel data interpolation processing using the filter coefficient sets.

Here, a scale of enlargement and reduction of an image can be expressed by an integral ratio and the image processing device can further comprise a memory connected to the element processors via the input bus for storing the filter coefficient sets.

The memory stores K of the filter coefficient sets when the scale of enlargement or reduction of the image is taken to be K:L, with K being possible for these to correspond to the filter coefficient sets.

Moreover, according to the present invention, an image processing device is provided for carrying out parallel processing for pixel data interpolation operations under single instruction multiple data stream control in association with enlarging or reducing of an image. The image processing device comprises a plurality of element processors for carrying out the interpolation operations of the pixel data supplied via an input bus to a plurality of the element processors, and a controller for putting a plurality of the element processors under single instruction multiple data stream control. The filter coefficient sets used in the interpolation are supplied to a plurality of the element processors via a circuit different from the input bus and each of the element processors carries out the pixel data interpolation processing using the filter coefficient sets.

The element processor of this image processing device can comprise a storage unit for storing the filter coefficient sets and an arithmetic logic unit for carrying out operations, and the image processing device further comprises a memory connected to the arithmetic logic units of the element processors via the circuit, for storing the filter coefficient sets.

The memory stores K of the filter coefficient sets when a scale of enlargement or reduction of the image is taken to be K:L and these filter coefficient sets can be stored in accordance with the order of phases so as to correspond to the filter coefficients sets.

This image processing device can further comprise a second memory for storing phase information corresponding to pixel data allotted to the element processors. The memory then supplies the filter coefficient sets to the element processors in accordance with the phase information stored in the second memory.

Here, the element processors calculate phase information corresponding to pixel data allotted to the element processors, and the filter coefficient sets are supplied from the memory to the element processors in accordance with the phase information.

The element processors can also calculate the phase information by sequentially adding or subtracting one of K and L when a scale of enlargement or reduction of the image is taken to be K:L.

Still further, according to the present invention, an image processing device is provided for carrying out parallel processing for pixel interpolation operations under single instruction multiple data stream control in association with enlarging or reducing an image. The image processing device comprises a plurality of element processors for carrying out the interpolation operations of the pixel data supplied via an input bus to a plurality of the element processors, and a controller for putting a plurality of the element processors under single instruction multiple data stream control. Each of the element processors calculates filter coefficient sets used in the interpolation in accordance with phase information of pixel data allotted to each of the element processors and carries out the pixel data interpolation processing using the filter coefficient sets.

This image processing device can further comprises a memory for storing the phase information and the element processors can calculate the phase information using an interpolation function corresponding to the interpolation.

In the above, the dividing number can be taken as a power of two and the element processor can be a one bit processor processing data one bit at a time.

The data processing in the above can be processing for carrying out interpolation of the pixel values in accordance with Cubic approximation.

BRIEF DESCRIPTION OF THE DRAWINGS

FIG. 11 is a view showing an example of signals of each part occurring in each cycle of a filter operation carried out by the device of FIG. 10;

FIG. 12 is a view showing an example of the positional relationship of filter select signals and filter coefficient sets;

FIG. 15 is a view showing an example of the positional relationship of element processors having data necessary in processing;

FIG. 21 is a view showing an example of the positional relationship of element processors having data necessary in processing;

FIG. 22 is a view showing a reduced example of the positional relationship of FIG. 21;

FIG. 26 is a view showing an example of filter select numbers sorted in the data memory;

FIG. 34 is a view showing an example of the positional relationship of filter select signals Pi and phase amounts x, and the filter coefficient sets; and FIG. 35 is a view showing an example of the positional relationship of the interpolation value Qi occurring in each cycle of the filter operation carried out at the device of FIG. 35 and the filter select signals Pi.

DETAILED DESCRIPTION OF THE PREFERRED EMBODIMENTS

First, before the present invention is described, a description is given of a device for carrying out a pixel number conversion operation using software utilizing an SIMD (Single Instruction Multiple Data Stream) format parallel processor.

Figure 13:
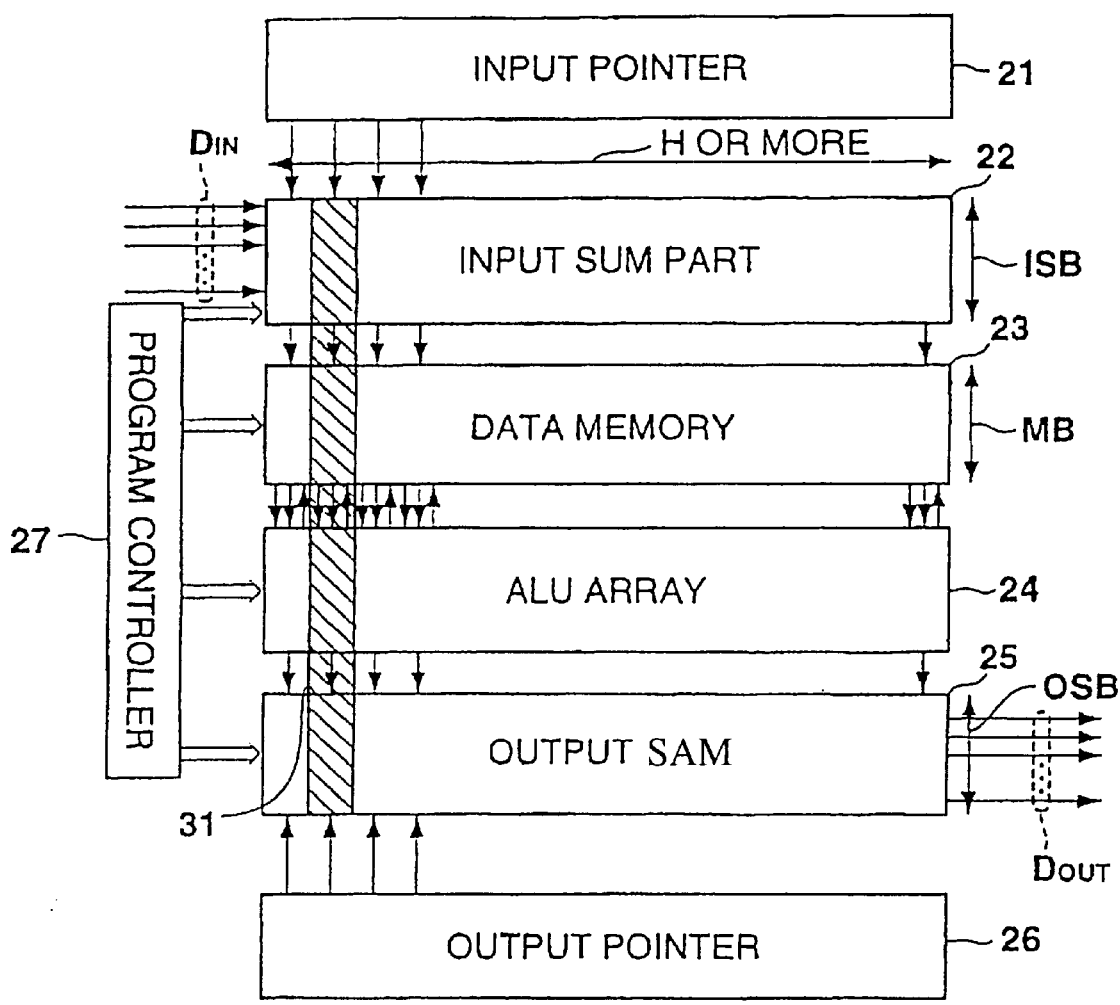
FIG. 13 is a block diagram showing an example software configuration of a device for carrying out filter operations.

FIG. 13 shows an example of a configuration for this kind of parallel processor. This parallel processor comprises an input pointer 21, an input SAM (serial access memory) 22, a data memory 23, an ALU array 24, an output SAM 25, an output pointer 26 and a program controller 27.

The input SAM 22, data memory 23, ALU array 24 and output SAM 25 form a group of element processors arranged in parallel in a linear array type. These element processors 31 are controlled so as to operate together in accordance with a single program contained in the program controller 27 (i.e. SIMD controlled). The program controller 27 has a program memory and a sequence controller etc. for running this program and generates various control signals to control various circuitry in accordance with a program pre-written to the program memory.

The input SAM 22, data memory 23 and output SAM 25 comprise a main memory. Although not described in detail, with the device of FIG. 13, a "ROW" address decoder for this main memory is included in the program controller 27.

Parallel element processors 31 (single element portions) correspond to the portions filled in with diagonal lines in FIG. 13, with a plurality of element processors 31 being arrayed in the horizontal direction, i.e. a structural element corresponding to one processor is shown by the portion filled in with diagonal lines in FIG. 13.

The operation of the linear array parallel processor for image processing use of FIG. 13 will now be described.

Input data (one pixel portion of image data) supplied to the input terminal DIN is supplied to the input SAM 22.

The input pointer 21 outputs a one bit signal of value "H", i.e. an input pointer signal (SIP) to just one element processor 31 with respect to one item of input data. This input data is then written to the input SAM 22 (input SAM cell) of the element processor 31 designated by the value "H".

The designation of the element processor 31 to which the data is provided is sequentially shifted from the element processor 31 of the left terminal in FIG. 13 towards the element processor 31 of the right terminal each clock of the input data using the input pointer signal. The input data is therefore sequentially supplied from the input SAM 22 (input SAM cell) of the left terminal element processor 31 to the input SAM cell of the right side element processor 31.

As the number of element processors 31 provided is a number of pixels H for one horizontal scanning period of the image signal or more, the pixel data for one horizontal scanning period of the image signal can be accumulated at the input SAM 22, with this input operation being repeated every horizontal scanning period.

Every time data for one horizontal scanning period of an image signal is accumulated at the input SAM 22, the program controller 27 SIMD controls the input SAM 22, data memory 23, ALU array 24 and output SAM 25 in accordance with the program and processing is executed.

This program control is repeated every horizontal scanning period. A step number calculated by dividing the time corresponding to one horizontal scanning period by the instruction cycle period of this processor can then be processed. As this is SIMD control, the following operations are executed in parallel at all of the element processors 31.

Input data for one horizontal scanning period accumulated at the input SAM 22 is transferred from the input SAM 22 to the data memory 23 in the following horizontal scanning period to be used in the following operation processing.

With transfer of data from the input SAM 22 to the data memory 23, the program controller 27 selects data for prescribed bits of the input SAM 22 using the input SAM read signal (SIR) and after accessing, the memory access signal (SWA) is outputted. This data is then written to a prescribed memory cell (described later) of the data memory 23.

Next, the program controller 27 supplies data held in the data memory 23 of this element processor 31 to the ALU arrays 24 of each element processor 31 in response to the program, with arithmetic operations of logic operations then being performed on this data. The results of this operation are then written to a prescribed address of the data memory 23.

The calculations occurring at the ALU array 24 are all carried out in bit units, with processing therefore progressing one bit at a time per one cycle. When logic operations are carried out on 8 bits of data, these operations will take at least 8 cycles and the addition of eight bits of data will take at least 9 cycles. Further, multiplication of 8 bits of data is the equivalent to adding bits 64 times and therefore takes at least 64 cycles.

Each element processor 31 is connected to neighboring element processors 31 and communication across processors is therefore possible. However, in the case of an access to the data memory 23 of a neighboring element processor 31, when SIMD control is activated and, for example, an access is made to the data memory 23 of an element processor 31 to the right, all of the element processors 31 access the data memories 23 of the element processors 31 to the right.

This kind of operation is no problem, particularly for FIR digital filters. In the case of reading data of element processors 31 that are not directly connected, the number of program steps will increase slightly but data can be read by repeatedly communicating across neighboring processors.

FIR digital filter operations can then be executed for the horizontal direction of the image by utilizing these communications together with the data held by neighboring element processors 31.

With this kind of parallel processor, data for pixels at the same position in the horizontal direction is all processed by one prescribed element processor 31 in all of the horizontal scanning periods. Therefore, when the data is transferred from the input SAM 22 to the data memory 23 input data for past horizontal scanning periods can be held in the data memory 23 until horizontal scanning periods thereafter by changing the addresses at which data is stored each horizontal period. The data required in this operation is then sequentially held in the data memory 23 in this way even for FIR digital filters for the vertical direction of the image.

The respective element processors 31 hold a prescribed number of consecutive items of pixel data for the vertical direction (vertical direction with respect to the horizontal scanning direction) within the data memory 23 and FIR digital filter operation for the vertical direction are executed.

When the operation allotted to one horizontal scanning period is complete, the data calculated in this horizontal scanning operation is transferred to the output SAM 25 during this horizontal scanning period.

Transferring of the inputted data accumulated at the input SAM 22, operations of the ALU array 24 and transferring of data to the output SAM 25 are all executed during this one horizontal scanning period under the control of an SIMD control program taking bits as units.

Output data transferred to the output SAM 25 is then outputted from the output SAM 25 in the following horizontal scanning period.

Three processes of an input process for writing input data to the input SAM 22, a process of the program controller 27 transferring input data stored at the input SAM 22 to the data memory 23, the ALU array 24 performing operations, output data being transferred to the output SAM 25, and a process of outputting the output data from the output SAM 25 are carried out with respect to each item of input data. These three processes are executed as a pipeline process taking one horizontal scanning period of the image signal as a unit.

Paying attention to the input data for one horizontal scanning period, the three processes for this input data should take up a period of time corresponding to three times the time for a horizontal scanning period because the time for each process corresponds to the time for one horizontal scanning period. However, as these three processes are carried out in parallel using pipeline processing, the processing can be carried out in a period of time corresponding to one horizontal scanning period per one horizontal scanning period portion of input data.

However, usual FIR digital filter execution is possible in the above but in the case of enlargement or reducing necessary in interpolation operations (similarly in the case of changing resolution), the number of items of data held in the input SAM 22 and the number of items of data outputted from the output SAM 25 are different for FIR digital filters for interpolation operations. It is therefore not possible for the input data Ri or the output data Qi to be densely arrayed at the input SAM 22 and the output SAM 25.

Therefore, when an element processor 31 obtains input pixel data necessary in interpolation from a prescribed number of other element processors 31, the positional relationship between this element processor 31 and the other element processors 31 changes every element processor 31. It is therefore difficult to obtain the necessary data with parallel processors of an SIMD format where all the element processors 31 carry out similar operations.

Figure 14:
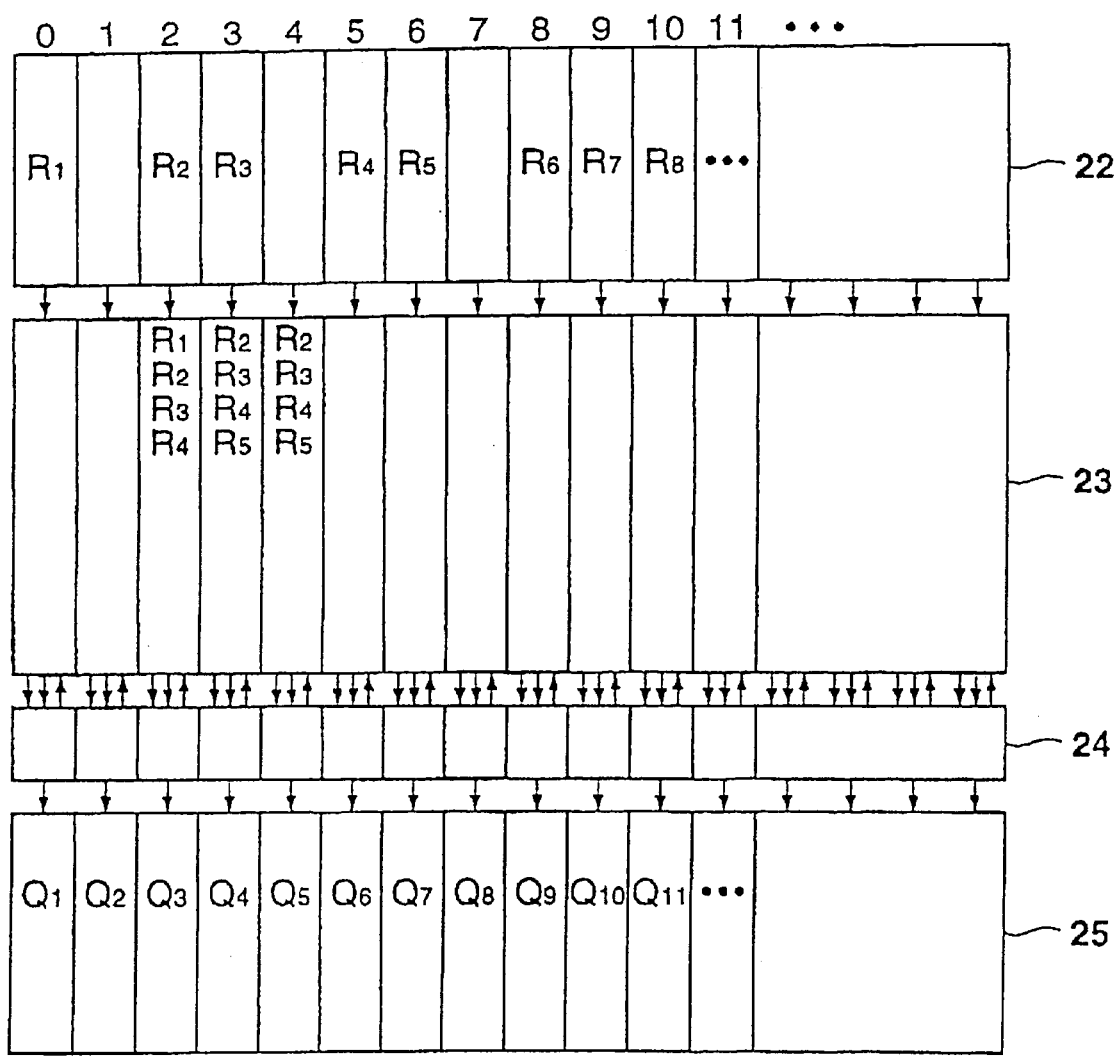
FIG. 14 is a view showing an example of a pattern for supplying input data occurring in the case of enlarging an image at the device of FIG. 13.

For example, a convolution operation with respect to four items of data of consecutive input data is necessary with this Cubic approximation. For example, in the case of enlarging the image by 10/7, as shown in FIG. 14, as the input data Ri cannot be arrayed, R1, R3 and R4 of the input data R1, R2, R3 and R4 required when calculating, for example, the output data Q3 are held in the element processors 31 that are two to the left, one to the right and three to the right, taking the element processor 31 for calculating the output data Q3 as a reference point.

On the other hand, R2, R4 and R5 of R2, R3, R4 and R5 necessary for calculating the output data Q4 are held in element processors 31 that are one to the left, two to the right and three to the right of reference part 31. Further, the input data R2, R3, R4 and R5 necessary for calculating the output data Q5 is held in element processors 31 that are two to the left, one to the left, one to the right and two to the right of the element processor 31 that is taken as a reference point.

The positional relationship between the element processors 31 holding input data necessary in calculating each item of output data and the element processors 31 for calculating this output data changes for each item of output data.

FIG. 15 shows the pattern for the element processors 31 holding the input data necessary in calculating each item of output data when an image is enlarged by a scale of 10/7. As shown in FIG. 15, in this case there is sorting into five patterns.

Further, when parallel processing is utilized in this way, each of the element processors 31 calculate output data corresponding to one pixel. This brings about the problem that it is necessary to supply different filter coefficients every element processor 31.

Accordingly, in the present invention, image processing with an SIMD format parallel processors is made possible particularly by supplying pixel data to a plurality of element processors, and by supplying filter coefficients from the prescribed memory or calculating the filter coefficients at the element processors themselves in such a manner that the types of patterns for the positional relationships of peripheral element processors, which have the pixel data utilized by the prescribed element processor, and the prescribed element processor are reduced to the smallest possible numbers.

In order to resolve the aforementioned problems, in the present invention interpolation of pixel data is carried out by utilizing a filter coefficient set, selected from one of several of filter coefficient sets. These coefficient sets correspond to each phase at the time of dividing the spacing of pixels of an original image by a prescribed dividing number, that which is closest to the phases of the interpolated pixels, so as to enlarge or reduce an image by an arbitrary scale.

First Embodiment

Figure 16:
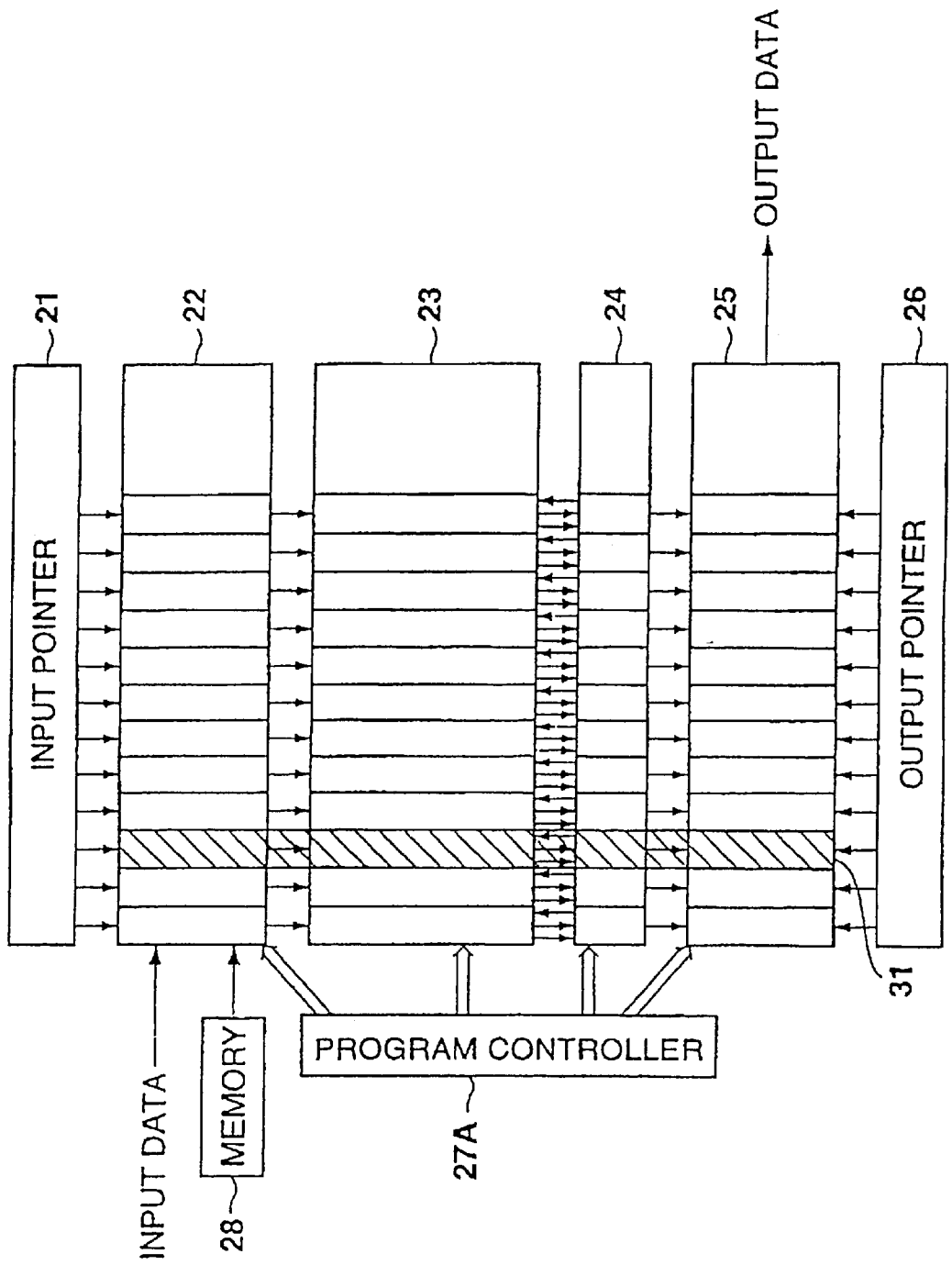
FIG. 16 is a block view showing the configuration of the first and seventh embodiment of an image processing device of the present invention.

FIG. 16 shows a configuration of a first embodiment of an image processing device of the present invention.

The input pointer 21 outputs an input pointer signal indicating whether or not input data has been received by the input SAM 22 every element processor 31. This input pointer 21 is capable of selectively providing input data to the element processor 31.

The input SAM 22 has a storage unit for storing prescribed input data every element processor 31 and stores input data in accordance with the SIP signal supplied by the input pointer 21. Further, the input SAM 22 outputs stored data to the data memory 23 when an SIR signal is received from the program controller 27A.

The data memory 23 has a storage unit for storing prescribed data each element processor 31. Data supplied by the input SAM 22 or the ALU array 24 when an SWA signal is received from the program controller 27A is then stored in this data part, with this data being outputted to the ALU array 24 when a memory read access signal (SRAA, SRBA) is received.

Figure 18:
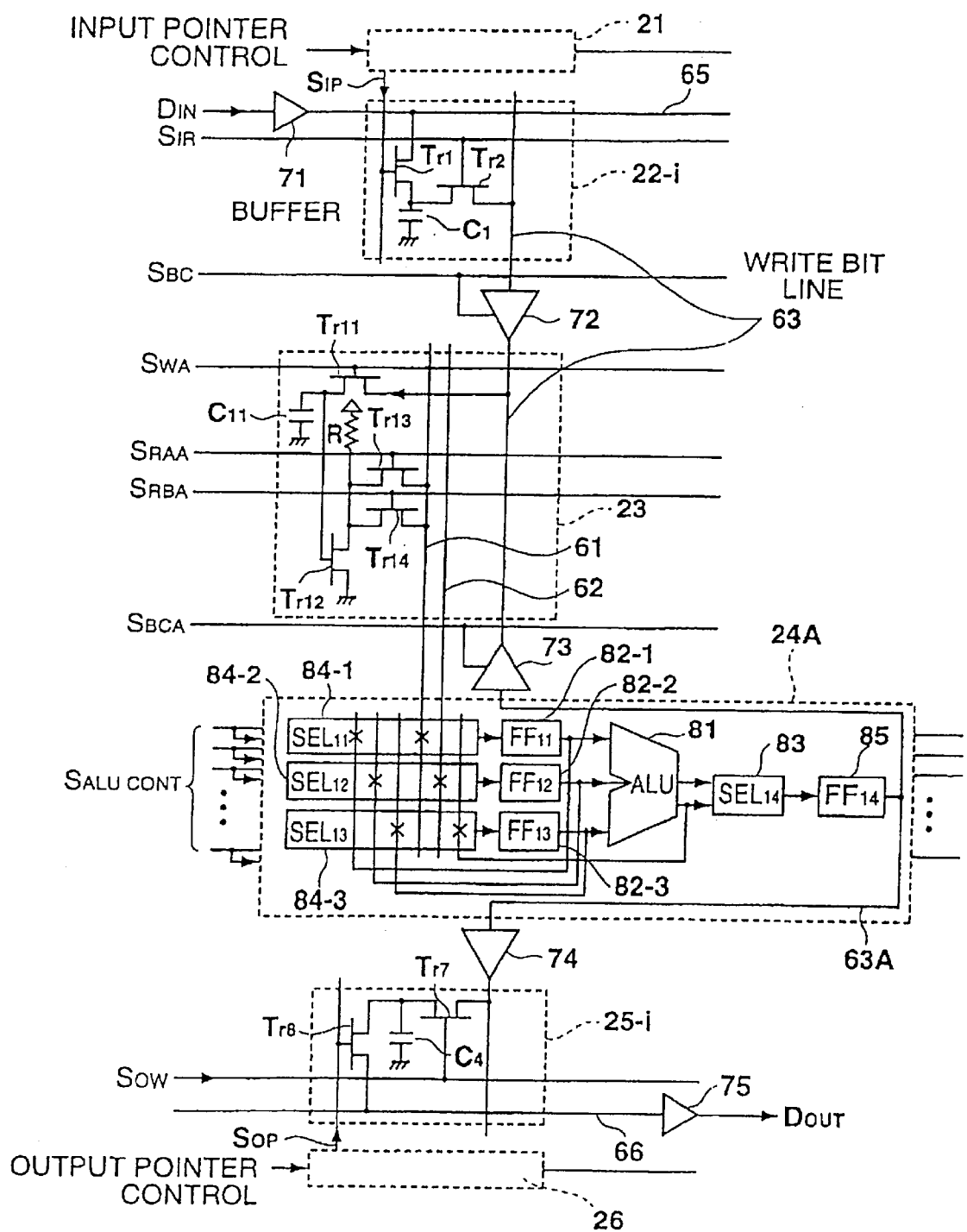
FIG. 18 is a circuit diagram showing an example configuration of the details of an element processor.

The ALU array 24 has an arithmetic part (the ALU (Arithmetic Logic Unit) 81 of FIG. 18) each element processor 31, with arithmetic being carried out on data supplied by the data memory 23 in accordance with an ALU control signal (SALU-CONT) supplied by the program controller 27A.

The output SAM 25 has a storage unit for storing prescribed output data each element processor 31. Output data from the ALU array 24 is then stored in this storage unit when an output SAM write signal supplied from the program controller 27A is received. The output SAM 25 then outputs the this stored data in accordance with an output pointer signal (SOP) supplied by the output pointer 26.

The output pointer 26 outputs an SOP signal indicating whether or not to output output data to the output SAM 25 each element processor 31. This output pointer 26 is capable of selectively outputting data from the element processor 31. The program controller 27A controls each part in accordance with a prescribed program so as to carry out various operations to be described later.

Figure 17:
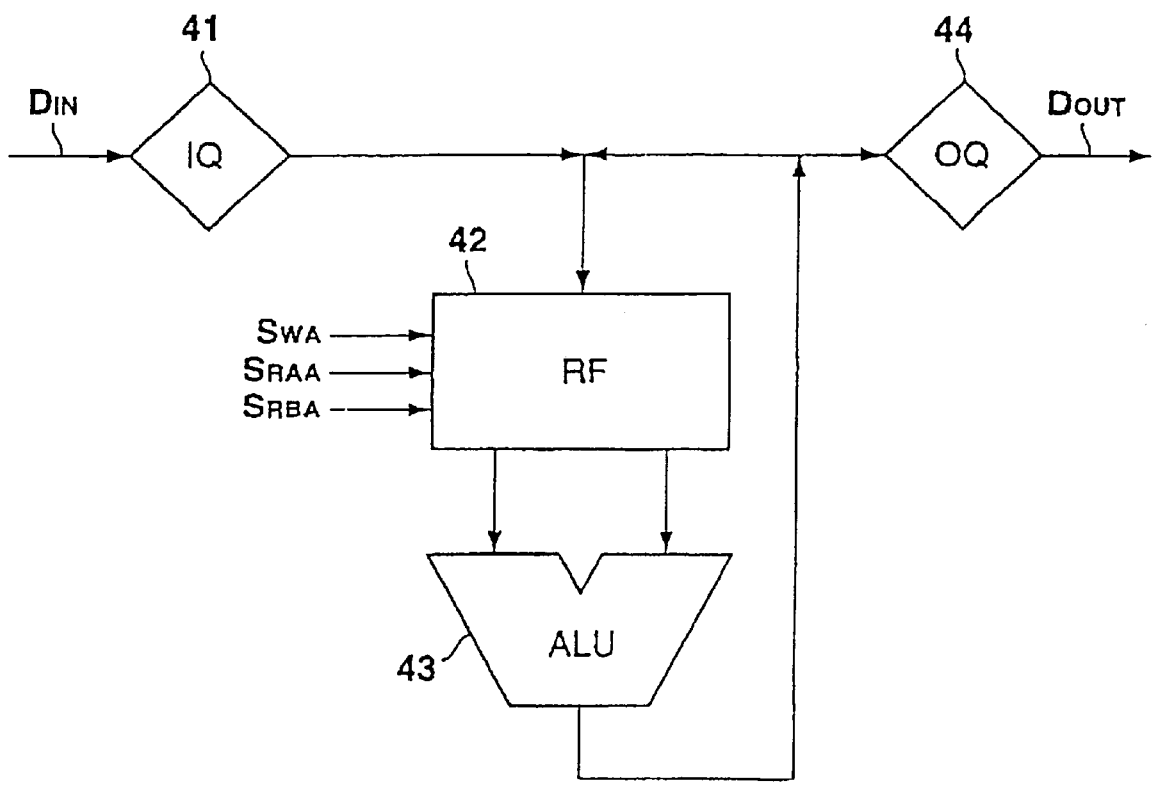
FIG. 17 is a block diagram showing an example configuration of an element processor.

FIG. 17 shows an example configuration of the element processor 31. The element processor 31 of FIG. 17 is a general purpose processor that can be put to various uses. An input buffer memory (IQ) 41 corresponds to one element processor portion of the input SAM 22 of FIG. 16 and is for storing input data. An data memory (RF) 42 corresponds to one element processor portion of the data memory 23 of FIG. 16 and is a three port memory for storing data that is being operated on. An output buffer memory (OQ) 44 corresponds to one element processor portion of the output SAM 25 of FIG. 16 and is for storing output data.

An arithmetic unit (ALU) 43 corresponds to one element processor portion of the ALU array 24 of FIG. 16, carries out various operations on data supplied by the data memory 42 and outputs the results to the data memory 42 or the output buffer 44.

At the element processor 31 of FIG. 17, input data is temporarily inputted to the input buffer memory 41 before being transferred to the data memory 42. The arithmetic unit 43 then carries out various operations on newly stored data, data stored in the past and data undergoing operations etc. supplied by the data memory 42 as necessary, with the work of writing again to the data memory 42 being repeated in accordance with the program. The results of this operation are then transferred to the output buffer 44 and outputted at a prescribed speed and format.

At the element processor 31, the input SAM 22, data memory 23 and output SAM 25 comprise a "column" of memory. Further, the ALU array 24 is a one bit ALU having a circuit configuration centered about a full adder. This element processor 31 then differs from ordinary so-called personal computers etc. that carry out processing in word units in that this element processor 31 is a bit process processor that carries out processing in bit units.

As the amount of hardware for one processor is small for a bit process processor it is possible to have a large number of processors in parallel. Parallel processors for image processors are therefore designed so that the number of element processors 31 arrayed in parallel in straight lines is at least equal to the number of pixels H for one horizontal scanning period portion of the image signal.

FIG. 18 shows an example of the detailed circuit configuration of the element processor 31. The structure of each cell of FIG. 18 is taken to be the most general structure for ease of understanding. When the same circuit is lined up as portions a plurality of times, this is expressed as one circuit (a circuit for one bit portion).

Figure 1:
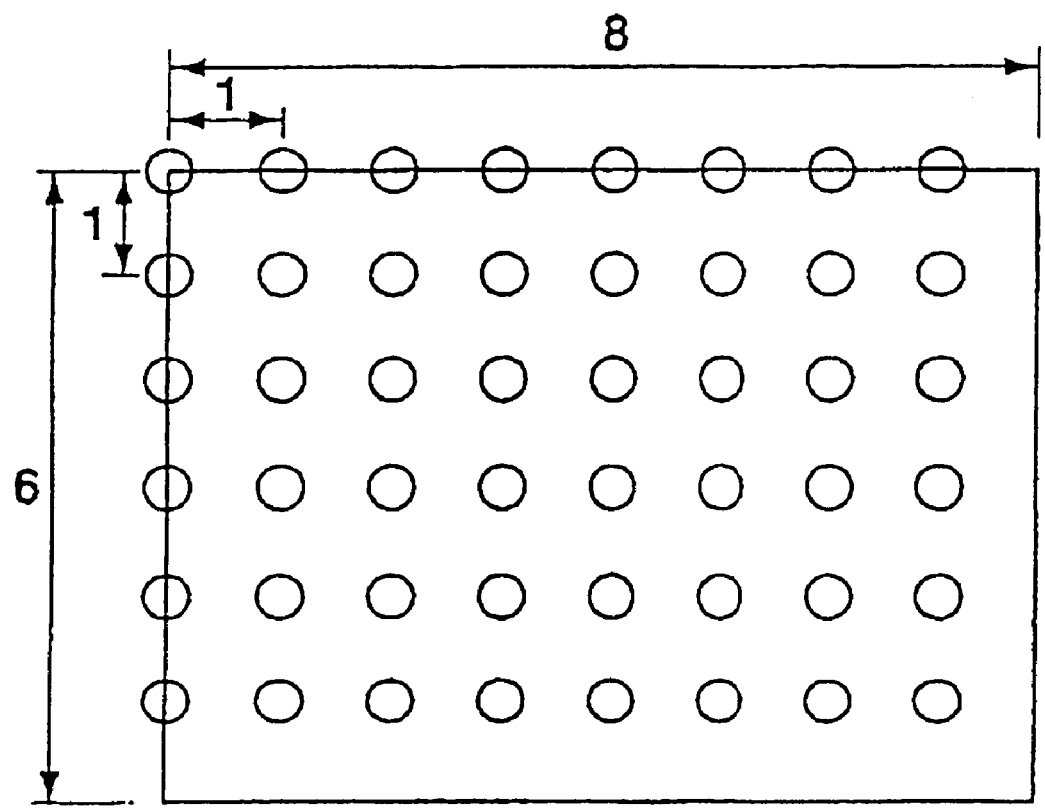
FIG. 1 is a view showing an example of an original image.
Figure 2:
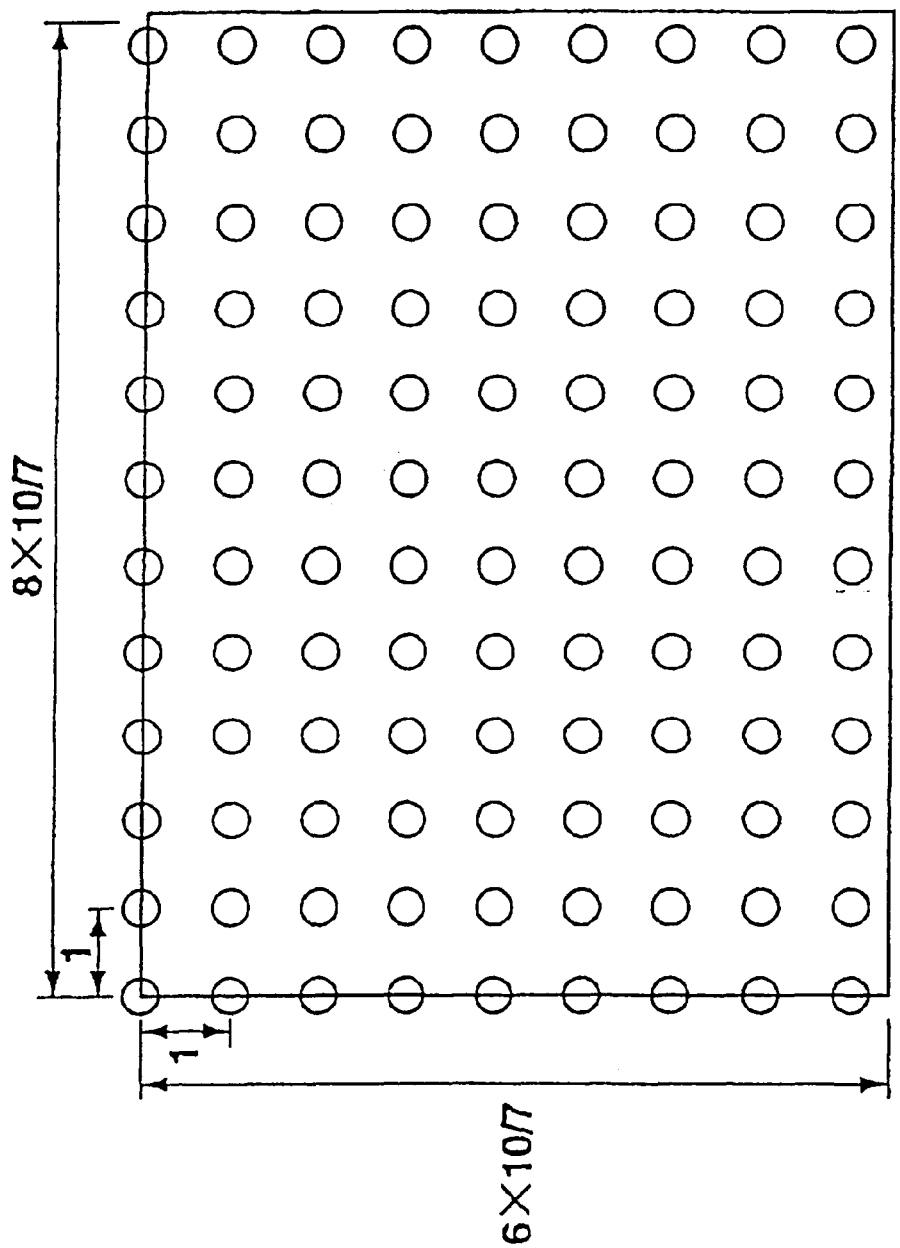
FIG. 2 is a view showing an example of an enlarged image of the original image.
Figure 3:
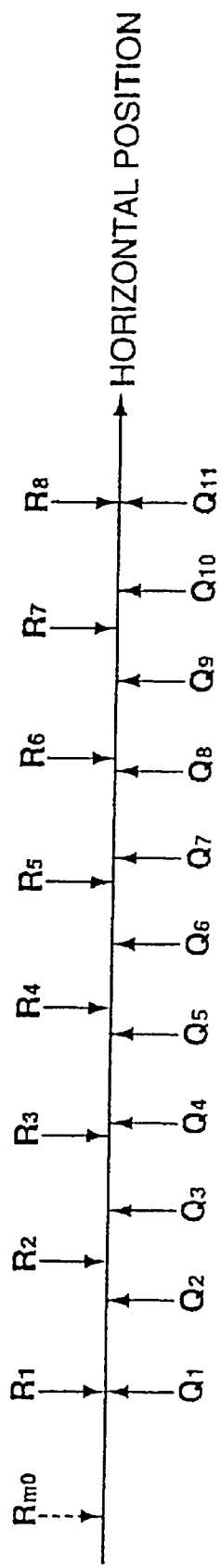
FIG. 3 is a view showing an example of the positional relationship of pixels of the original image and pixels of the enlarged image.
Figure 4:
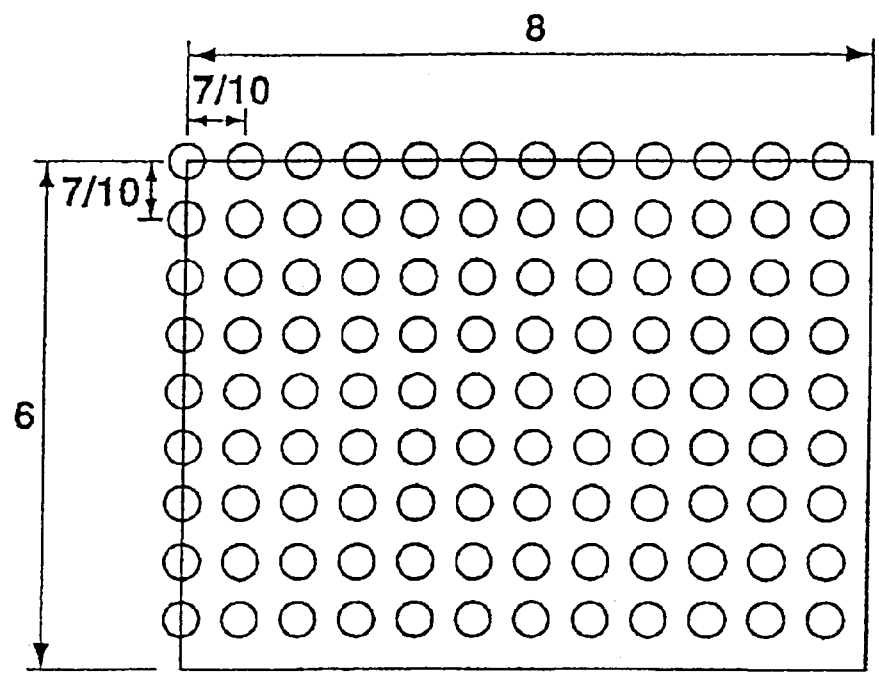
FIG. 4 is a view showing an example of an image, for an original image, for which the resolution has been increased.
Figure 5:
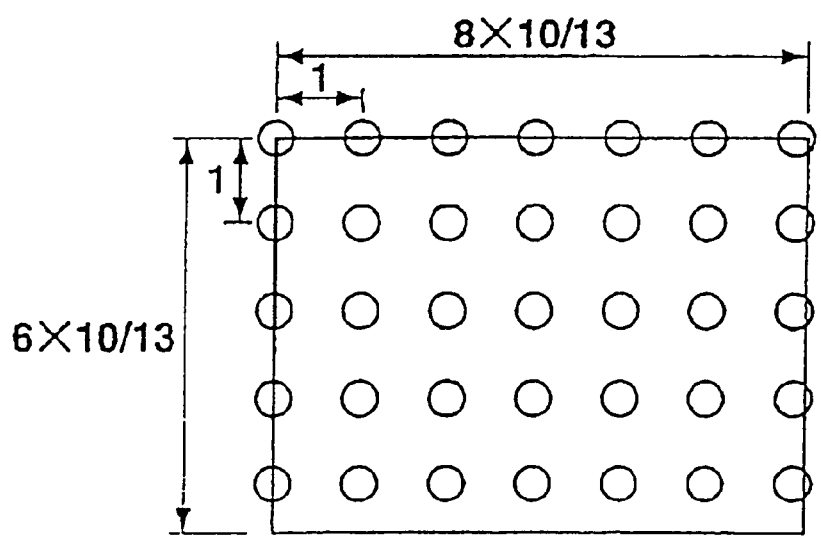
FIG. 5 is a view showing an example of a reduced version of the original image.
Figure 6:
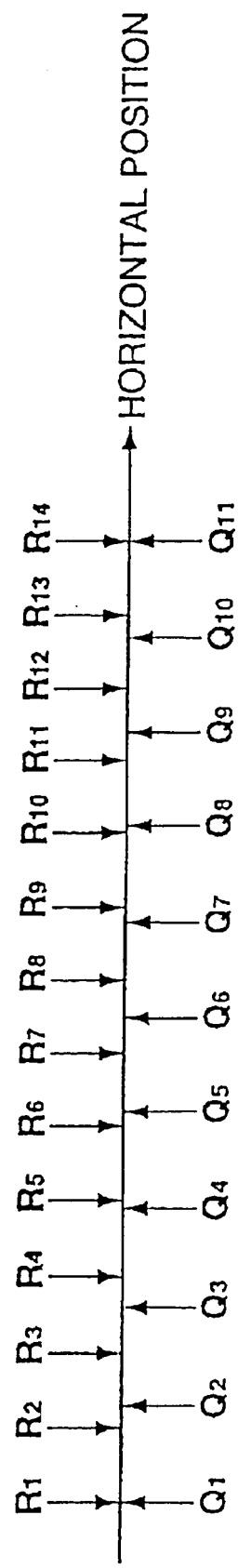
FIG. 6 is a view showing an example of the positional relationship of pixels of the original image and pixels of the reduced image.

A portion corresponding to one element processor 31 for the input SAM 22 is controlled by the input pointer 21 and comprises a number ISB, where ISB is the number of bits of input data, of input SAM cells 22-1 to 22-ISB. In FIG. 3, just one cell 22-i is shown rather than showing ISB input SAM cells 22-1 to 22-ISB.

At the input SAM cell 22-i, the gate terminal for the transistor Tr1 is connected to the input pointer 21, with the other two terminals for the transistor Tr1 being connected to an input bus and one end of a capacitor C1 for storing data for one bit.

The gate element of the transistor Tr2 is connected to the program controller 27A, an SIR signal is supplied, and the remaining two terminals of the transistor Tr2 are connected to a write bit line 63 and to one end of the capacitor C1.

One end of the capacitor C1 is connected to the transistors Tr1 and Tr2 and the remaining terminal is connected to earth.

A portion corresponding to one element processor 31 for the data memory 23 is comprised of MB data memory cells 23-1 to 23-MB (storage units) corresponding to a number of bits MB required as work memory. In FIG. 18, one single cell 23-i is shown in place of MB data memory cells 23-1 to 23-MB.

The data memory cell 23-i (i=1, . . . , MB) of the data memory 23 is a three port memory having two read bit lines 61 and 62 and one write bit line 63.

At the data memory cell 23-i, the gate terminal of the transistor Tr11 is connected to the program controller 27A, the SWA signal is supplied, and the remaining two terminals of the transistor Tr11 are connected to the write bit line 63 and one end of the capacitor C11 for storing data for one bit.

One end of the capacitor C11 is connected to the gate terminal of a transistor Tr12 and transistor Tr11, and the other terminal is connected to earth.

The remaining two terminals of the transistor Tr12 are connected to an earth connection point and to a power supply (not shown in the drawings) via a resistor R. It is also possible for the resistor R to be omitted and for the terminal of the transistor Tr12 to be connected directly to the power supply.

The gate terminal of the transistor Tr13 is connected to the program controller 27A to which a signal SRAA is supplied. The remaining two terminals of the transistor Tr13 are then connected to transistor Tr12 and resistor R, and the read bit line 61.

The gate terminal of transistor Tr14 is connected to the program controller 27A and the signal SRBA is supplied therein. The remaining two terminals of the transistor Tr14 are then connected to the transistor Tr12 and the resistor R, and to the read bit line 62, respectively.

The portion corresponding to one element processor 31 of the ALU array 24 is an ALU cell 24A (ALU part) occurring in FIG. 3. An ALU 81 of the ALU cell 24A is a one bit ALU having a circuit structure for all of the adders (full adders) etc. and performs operations on one bit values supplied by flip-flops 82-1 to 82-3, with the results being outputted to a selector 83.

The ALU cell 24A comprises the flip-flops 82-1 to 82-3 for storing one bit values inputted at the ALU 81 and selectors (SEL) 84-1 to 84-3 selecting values supplied at the flip-flops 82-1 to 82-3.

The portion corresponding to one element processor 31 of the output SAM 25 is controlled by the output pointer 26 and comprises OSB output SAM cells 25-1 to 25-OSB corresponding to the bit number (OSB) of the output signal. In FIG. 3, one cell 25-i is shown in place of the output SAM cells 25-1 to 25-OSB.

At the output SAM cell 25-i, the gate terminal of a transistor Tr7 is connected to the program controller 27A, with a signal SOW then being supplied. The remaining two terminals of the transistor Tr7 are then connected to a write bit line 63A, and one end of a capacitor C4 for storing data for one bit.

One end of the capacitor C4 is connected to transistors Tr7 and Tr8 and the other end is connected to earth.

The gate terminal of transistor Tr8 is connected to the output pointer 26, with one of the remaining two terminals of transistor 8 being connected to the capacitor C4 and the transistor Tr7, and the remaining terminal being connected to output bus 66.

All of the word lines connected to the element processor 31 are also connected to the other arrayed element processors 31, with the SIR signal, SWA signal, memory read out access signal (SRAA, SRBA), and SOW signal etc. being transmitted to all of the element processors 31. These word lines are address decoded within the program controller 27A of FIG. 16.

The input data bus 65 is connected to the input SAM cells 22-i of all of the element processors 31 and the output data bus 66 is connected to the output SAM cells 25-i of all of the element processors 31.

The memory 28 of FIG. 16 stores data for all the interpolation filter coefficients supplied by an external Central Processing Unit (not shown in the drawings, hereinafter abbreviated to "CPU") for control and necessary in filter operations at all of the element processors 31 at the startup in the horizontal flyingback period or the vertical flyingback period etc. in the order of the numbers of the element processors 31.

Next, a description will be given of the data transfers and operations occurring at the element processor 31.

With the input SAM cell 22-i of the element processor 31 designated by the input pointer 21, the transistor Tr1 goes on and the terminal voltage of the capacitor C1 becomes a voltage that responds to the input data supplied via the input data bus 65 (and buffer 71).

In this way, the input data is stored at the input SAM 22 of the designated element processor 31.

At the input SAM cell 22-i selected by the SIR signal supplied by the program controller 27A, the transistor Tr2 goes ON and a transfer data signal responding to the voltage of the capacitor C1 is generated at the write bit line 63.

At this time, the SBC signal is supplied to the buffer 72 and the SWA signal is supplied to the transistor Tr11 of a prescribe d data memory cell 23-i. Then, as a result of the transistor Tr11 going on, the terminal voltage of the capacitor C11 becomes a voltage that complies with data stored at the capacitor C1 of the input SAM cell 22-i.

When data from the ALU cell 24A is written to the data memory cell 23-i, the SBCA signal is supplied to a buffer 73.

This data transfer is carried out one bit at a time in one cycle via the write bit line 63. The SIR signal utilized when reading data from each input SAM cell 22-i of the input SAM 22 and the SWA signal utilized in writing data to each data memory cell 23-i of the data memory 23 are shown as addresses within the same address space. These signals can then be decoded using a row decoder and considered as word lines.

The ALU cell 24A then sequentially proceeds with operation processing in bit units using input data thus written at the data memory 23, data that is undergoing operations, or data stored at the flip-flops 82-1 to 82-3.

For example, the data of the data memory cell 23-i corresponding to a prescribed bit of data memory 23 and the data for the data memory cell 23-i corresponding to another bit is added, and when the addition results are written to a data memory cell 23-i corresponding to a further bit, this will operate as follows.

The program controller 27A supplies an SRAA signal to a data memory cell 23-i corresponding to a prescribed bit of the data memory 23. The transistor Tr13 of this cell then goes on and the data stored in the capacitor C11 is written to one of the read bit lines 61 or 62.

At the same time, the program controller 27A supplies an SRBA signal to a data memory cell 23-i corresponding to a further bit, transistor Tr14 of this cell goes on and the data stored at capacitor C11 is outputted to the remaining read bit line 62 or 61.

These two items of read data are then supplied to the ALU 81 via selectors 84-1 to 84-3 of the ALU cell 24A. The ALU 81 then performs prescribed operations on these items of data, with the results of these operations being supplied to the flip-flop 85 via the selector 83.

The program controller 27A then supplies the SBCA signal and the operation results from the flip-flop 85 are made to be outputted to the write bit line 63. The SWA signal is supplied to the data memory cell 23-i corresponding to a prescribed bit, the transistor Tr11 of this cell 23-i goes on and the terminal voltage of the capacitor C11 is made to be a voltage corresponding to the results of this operation.

The arithmetic operations occurring at the ALU cell 24A are carried out in accordance with the ALU control signal (SALU-CONT) supplied by the program controller 27A. The arithmetic results occurring at the ALU cell 24A are written to the data memory 23 or stored at the flip-flop 82-3 of the ALU cell 24A as necessary. When the operation occurring at the ALU 81 is an addition operation, the ALU cell 24A outputs a carry occurring in the arithmetic results to the flip-flop 82-3 and outputs a sum to the data memory 23.

Next, when data is outputted by the data memory cell 23-i, the program controller 27A supplied a memory access signal (SRAA or SRBA) to the data memory cell 23-i storing the data to be output ted. The transistor Tr13 or Tr14 of this cell 23-i is then put on and the data stored in the capacitor C11 is outputted to the read bit line 61 or 62.

The program controller 27A supplies a prescribed control signal to the ALU cell 24A and data from the data memory cell 23-i is transferred to the output SAM cell 25-i. At this time, the program controller 27A outputs the signal SOW so that data is supplied to the capacitor C4 of this output SAM cell 25-i, the transistor Tr17 of this cell goes on, and the terminal voltage of the capacitor C4 is made to be a voltage responding to this data.

This data then passes through the write bit line 63 so as to be transferred one bit at a time. At this time, processing can also be carried out on the data by the ALU 81.

The signal SOW utilized when storing data at each of the output SAM cells 25-i of the output SAM 25 and the memory access signal (SRAA, SRBA) utilized when reading data from each of the data memory cells 23-i of the data memory 23 have addresses within the same address space, are therefore decoded using a row decoder and supplied via a word line.

At the output SAM cell 25-i of the element processor 31 designated by the output pointer 26, the transistor Tr8 goes on in accordance with the output pointer signal and an output signal with a voltage corresponding to that across the capacitor C4 is outputted to the output data bus 66.

The output pointer 26 then sequentially outputs data form the output SAM cells 25-i of each element processor 31 by sequentially supplying an output pointer signal of a value of "H" to from the left end element processor 31 to the right end element processor 31 in accordance with a clock signal.

Data supplied to the output SAM cell 25-i is outputted to the output terminal DOUT via the output data bus 66.

The number of pixels for one horizontal scanning period of the image signal H or more element processors 31 are provided so that data for one horizontal scanning period of the output signal can be outputted to the output SAM 25 by carrying out this operation, with this operation being repeated every horizontal scanning period.

Each of the element processors 31 carry out processing such as the input of data transfer of data, arithmetic operations on data and the outputting of data in response to each of the various control signals supplied by the program controller 27A.

In the first embodiment, all of the filter coefficient sets are supplied to the data memory parts 23 of all of the element processors 31 during activation or during the horizontal or vertical flyingback periods. At this time, the filter coefficient set is supplied to the input SAM 22 from the memory 28 via part (a prescribed bit width) of the input data bus 65 and then transferred to the data memory 23. As the operation at this time is the same as the operation for supplying the input data Ri to the data memory 23 a description will be omitted.

Next, the operation of the first embodiment will be described with reference to the flowchart of FIG. 19.

First, in step S1, a prescribed L bits of input data (Ri (={$ri_0$, . . . , $ri_{L-1}$})) for one horizontal scanning period are inputted to the input SAM 22.

When enlarging an image by a scale of 10/7, as described above, the positional relationship of the element processors 31 holding the input data necessary in the calculation of each item of output data and the element processors 31 calculating these items of output data change every item of output data. For example, when output data for 10 pixels corresponding to the input data for 7 pixels is calculated, patterns for the element processors 31 holding the input data necessary in calculating each item of output data can be classified into five patterns shown in FIG. 15.

Figure 20:
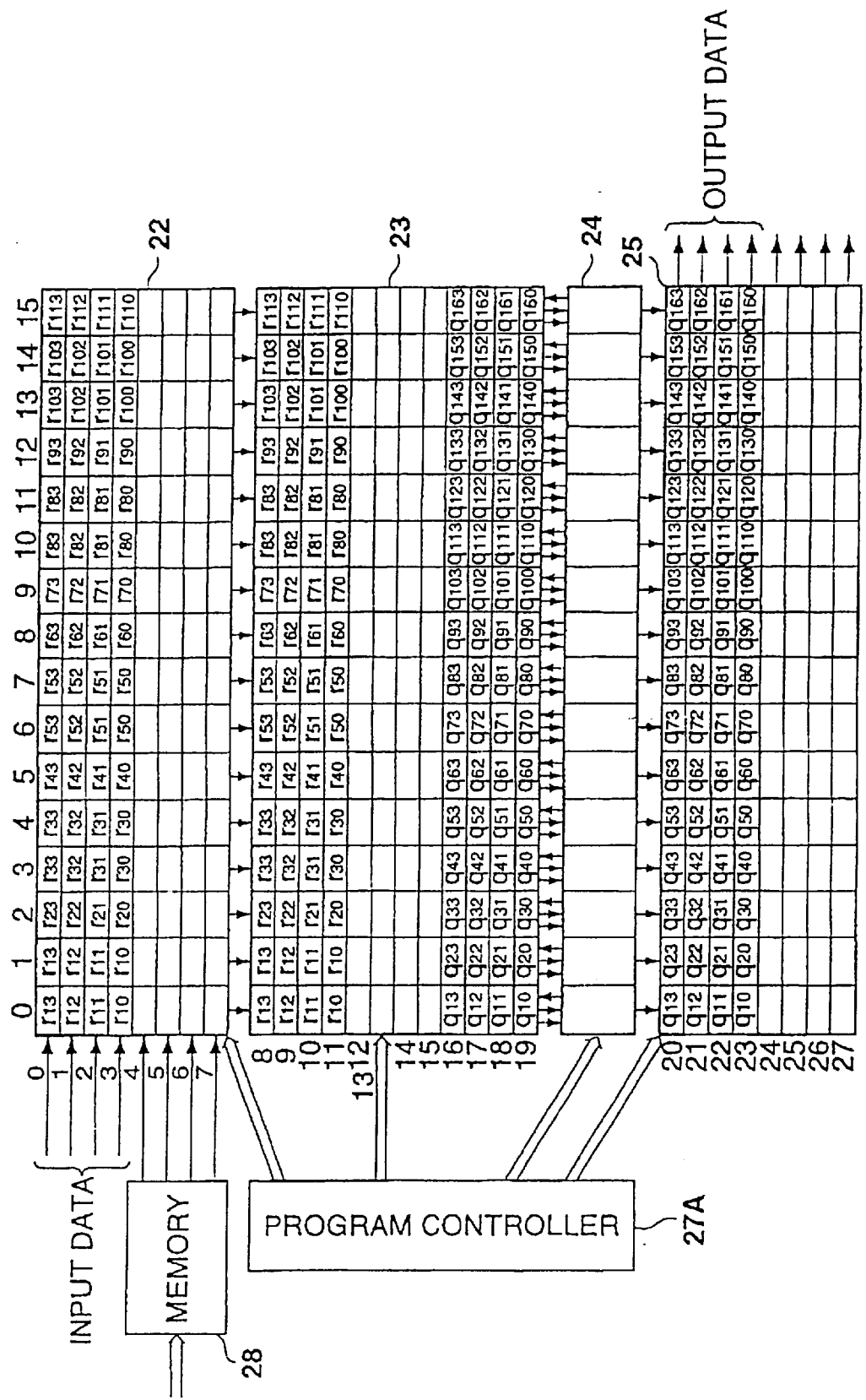
FIG. 20 is a view showing an example of data stored in each part of the image processing device of FIG. 16.

At this time, as shown in FIG. 20, some of the seven items of input data overlap, with these 7 items of input data then being supplied to ten element processors 31, i.e. element processors of the element processors 31 shown in FIG. 14 that are not supplied with input data are therefore simply supplied with the same input data as the element processor 31 neighboring to the left.

Figure 10:
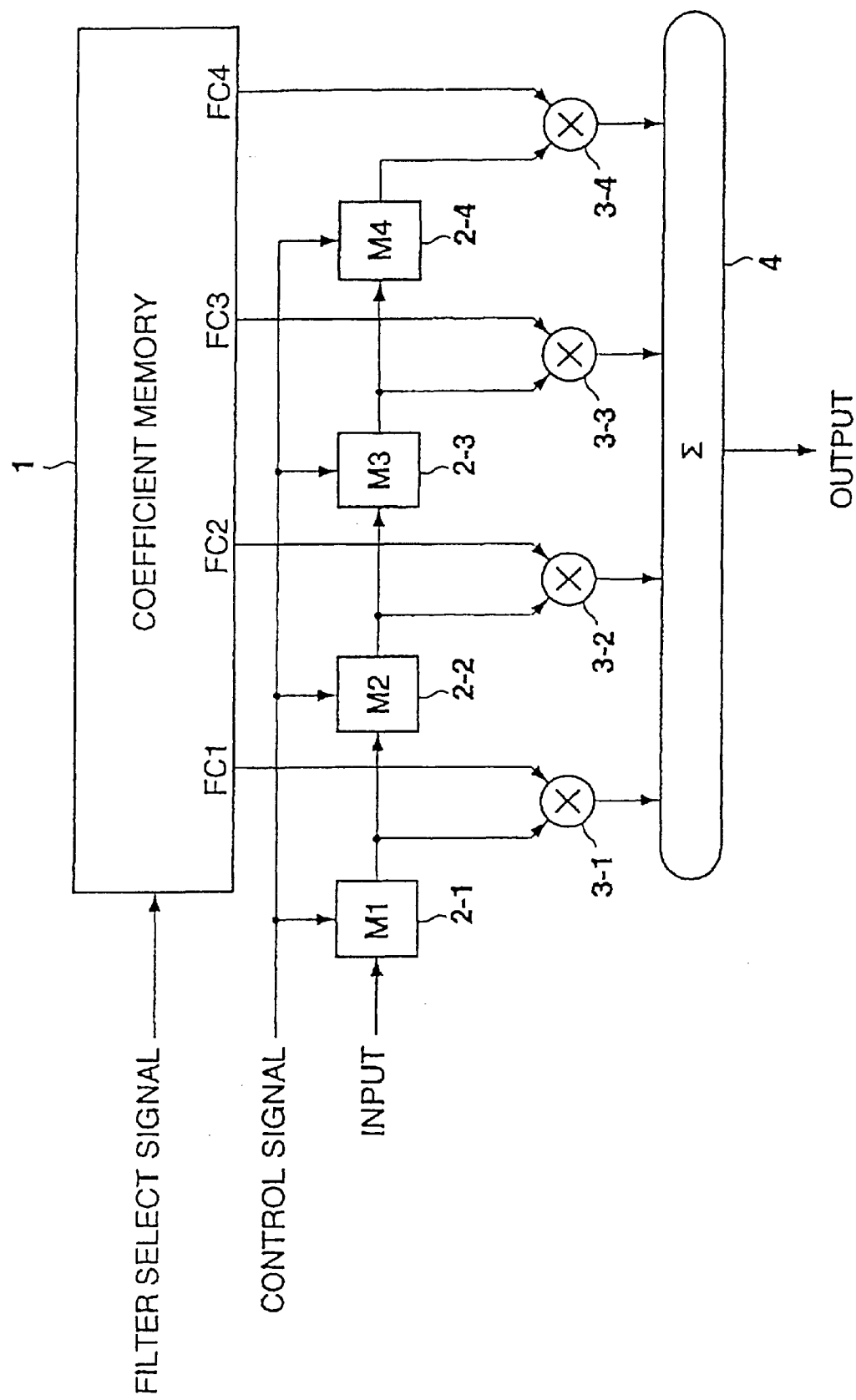
FIG. 10 is a block diagram showing an example hardware configuration of a device for carrying out filter operations.

The order of supplying this input data can be made the same as for the inputting of data occurring at the device of FIG. 10 or the data can be temporarily supplied so as to be spread out, with prescribed data then being copied in accordance with a program.

The input data Ri and the output data Qi of FIG. 20 is actually about eight bits but is shown here as four bits for simplicity. Further, the input SAM 22, the data memory 23 and the output SAM 25 are shown here with only a memory capacity that is necessary for this description.

When input data is supplied in this way, in the case of, for example, the pattern for type 1 of FIG. 21, the same input data is supplied to the element processor 31 that is two to the left and the element processor 31 that is one to the left, and the same data is supplied to the element processor 31 neighboring to the right and the element processor 31 that is neighboring two to the right. The pattern for type 1 of FIG. 21 and the pattern for type 2 can therefore be handled in the same way.

In the case of the pattern for type 3 of FIG. 21, the same input data is supplied to the element processor 31 neighboring to the left. The pattern of type 4 of FIG. 21 can by handled in the same way as the pattern of type 4.

In the case of the pattern for type 5 of FIG. 21, the same input data is supplied to the element processor 31 neighboring to the right and the element processor 31 two to the right. The pattern of type 5 of FIG. 21 can therefore by handled in the same way as the pattern of type 2.

By supplying the input data shown in FIG. 20, the aforementioned five patterns can be reduced to the two patterns (type 2 and type 4) shown FIG. 22.

It is therefore also possible to reduce the patterns for the positional relationships in cases of ratios of change other than 10/7 by performing calculations using input data supply methods in such a manner that the number of patterns becomes a minimum.

With regards to the two patterns, the program controller 27A supplies a value of one bit (0 or 1) showing a pattern corresponding to the element processor 31 to each of the element processors 31 together with the input data.

Next, in step S2 to step S5, the program controller 27A transfers the input data Ri supplied to each of the element processors 31 from the input SAM 22 to the data memory 23 one bit at a time via the write bit line 63.

In the current case, the input data Ri is set to four bits for simplicity and stored in address 0 to address 4 of input SAM 22. Therefore, as shown in FIG. 20, the contents of address 0 of the input SAM 22 are transferred to address 8 of the data memory 23, with the contents of addresses 1 to 3 of the input SAM 22 similarly being transferred to address 9 to address 11 of the data memory 23.

Then, in step S6, each element processor 31 carries out signal processing as described in the following.

In step S7 to step S10, the program controller 27A transfers the arithmetic results (output data Qi) calculated at each of the element processors 31 from the data memory 23 to the output SAM 25 one bit at a time via the read bit lines 61 and 62 and the ALU cell 24A.

In the current case, the output data Qi (=$qi_0$, ..., $qi_3$) is set to four bits for simplicity and stored in addresses 16 to 19 of data memory 23. Therefore, as shown in FIG. 20, the contents of address 16 of the data memory 23 are transferred to address 20 of the output SAM 25, with the contents of address 17 to address 19 of the data memory 23 being similarly transferred to addresses 21 to 23 of the output SAM 25.

Next, in step S11, the output data Qi calculated for one horizontal scanning portion is outputted from the output SAM 25.

A filter operation is carried out each one horizontal scanning period portion of image data. The operation of step S1, the operations of step S2 to step S10 and the operation of step S11 are carried out in parallel. When the operation of step S2 to step S10 is carried out on image data for a prescribed one horizontal scanning period portion, the operation of step S11 is carried out on the image data for one horizontal scanning period for one line previous and the operation of step S1 is carried out on one horizontal scanning line portion of image data for one line after.

Figure 23:
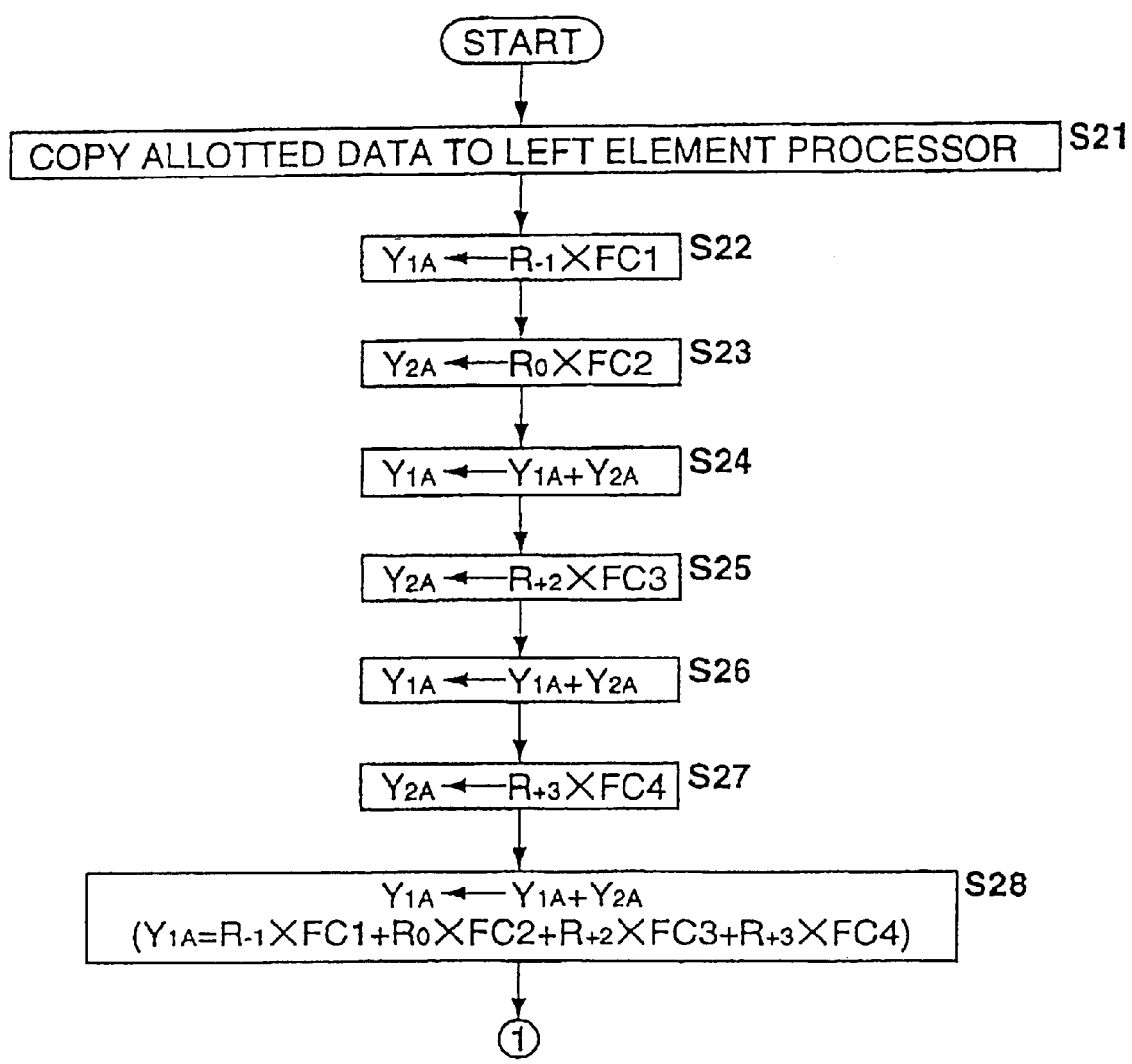
FIG. 23 is a flowchart illustrating the filter operation processing of the first and seventh embodiment of the image processing device of the present invention.
Figure 24:
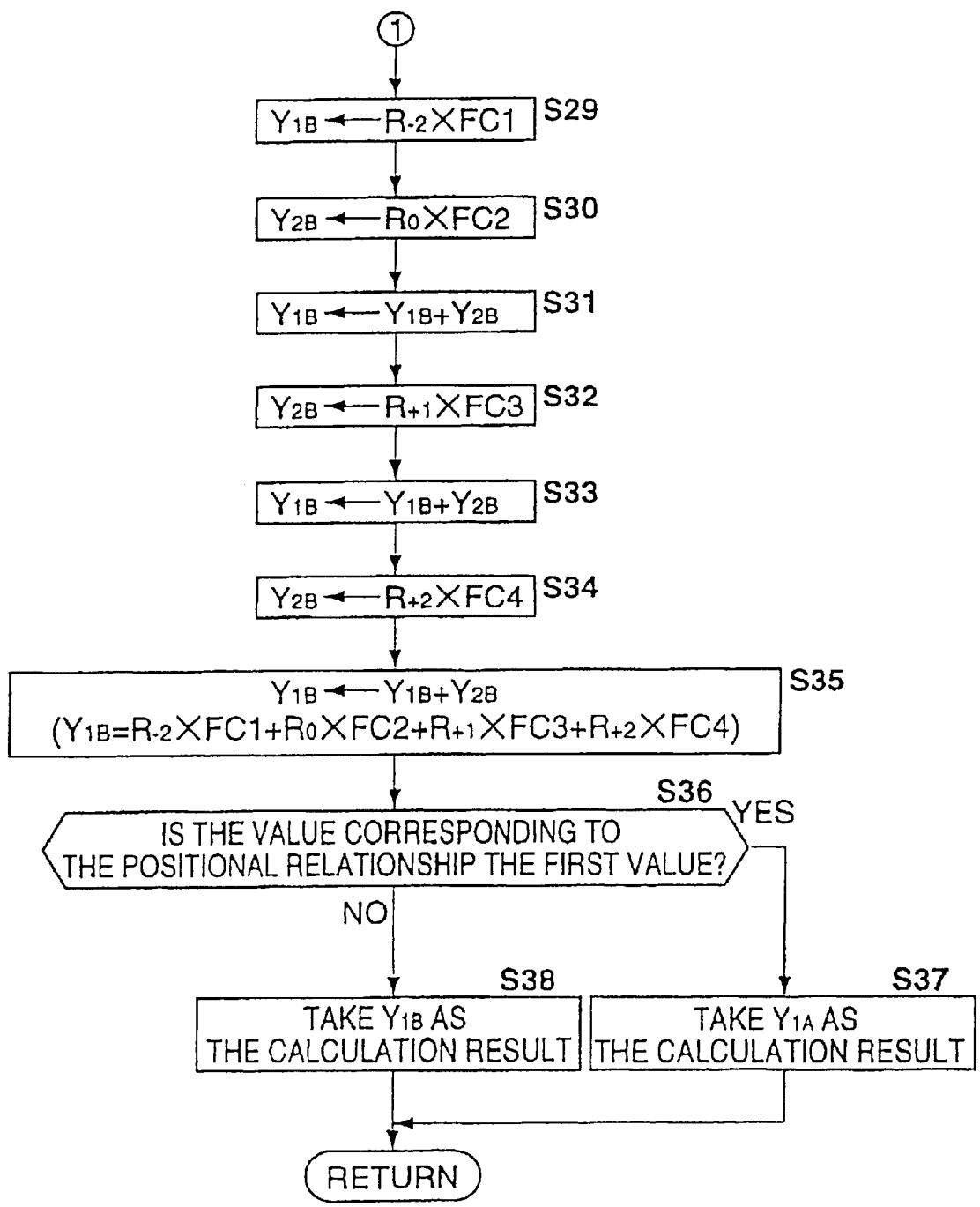
FIG. 24 is a further flowchart illustrating filter operation processing of the first and seventh embodiment of the image processing device of the present invention.

Next, a detailed description will be given of the signal processing occurring in step S6 of FIG. 19 with reference to FIG. 23 to FIG. 24.

First, in step S21, each element processor 31 holds the supplied data, with this being copied to the element processor 31 neighboring to the left.

In the following, data supplied to a prescribed element processor 31 is taken to be R0, data supplied to an element processor 31 neighboring to the left is taken to be $R_{-1}$ and data supplied to the element processor 31 neighboring two to the left is taken to be $R_{-2}$. Further, data supplied to the element processor 31 neighboring to the right is taken to be $R_{+1}$, data supplied to the element processor 31 neighboring two to the right is taken to be $R_{+2}$ and data supplied to the element processor 31 neighboring three to the right is taken to be $R_{+3}$.

Next, in step S22, the element processor 31 calculates the product of the data $R_{-1}$ for the element processor 31 neighboring to the left and the filter coefficient FC1 supplied beforehand and substitutes Y1A with the results of this calculation (Y1A←$R_{-1}$×FC1). This product operation is executed by carrying out bit arithmetic a prescribed number of times.

In step S23, the element processor 31 calculates the sum of the data R0 supplied by itself and the filter coefficient FC2 and replaces Y2A with the results of this calculation (Y2A←R0×FC2).

In step S24, the element processor 31 calculates the sum of Y1A and Y2A and substitutes Y1A with the results of this calculation (Y1A←Y1A+Y2A). This product operation is executed by carrying out bit arithmetic a prescribed number of times.

Next, in step S25, the element processor 31 calculates the product of the data $R_{+2}$ for the element processor neighboring two to the right and the filter coefficient FC3 and replaces Y2A with the results of this calculation (Y2A←$R_{+2}$×FC3).

Then, in step S26, the element processor 31 calculates the sum of Y1A and Y2A and replaces Y1A with the results of this calculation (Y1A←Y1A+Y2A).

In step S27, the element processor 31 calculates the product of the data $R_{+3}$ of the element processor 31 neighboring three to the right possessed by the element processor 31 neighboring two to the right and the filter coefficient FC4 and substitutes $Y_{2A}$ with the results of this calculation ($Y_{2A}$←$R_{+3}$×FC4).

Figure 7:
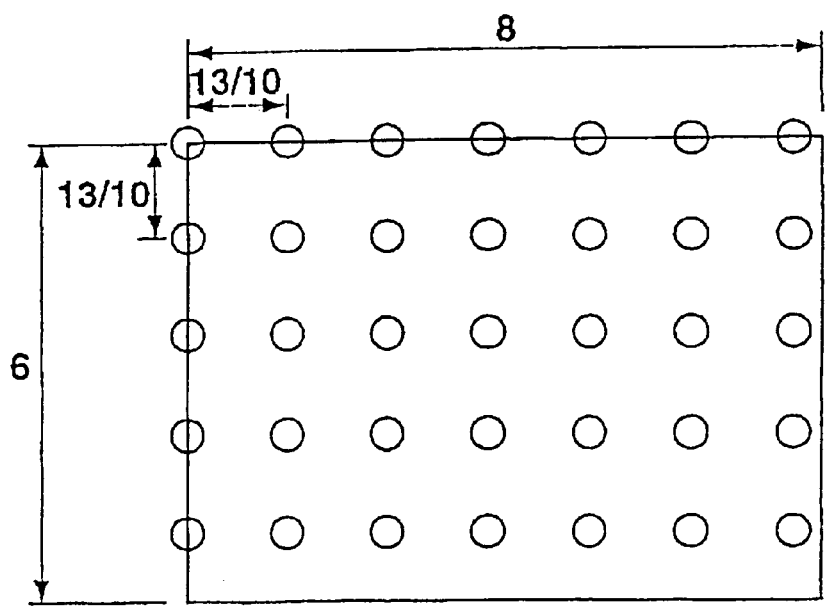
FIG. 7 is a view showing an example of an image where the resolution of the original image has been lowered.
Figure 8:
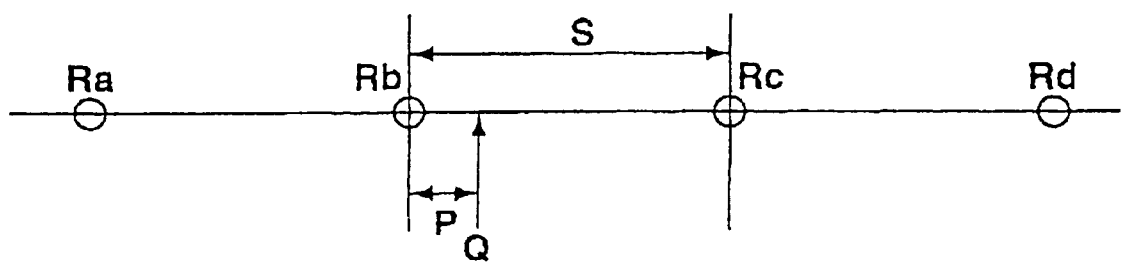
FIG. 8 is a view showing an example of the positional relationship of pixels of the original image and pixels generated by interpolation.
Figure 9A:
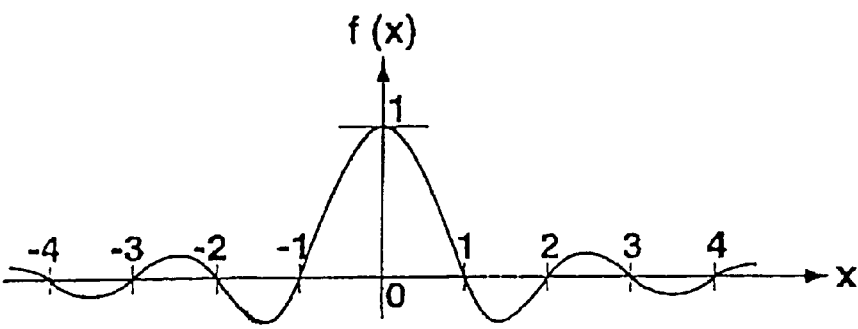
FIGS. 9A, 9B, 9C and 9D are views showing examples of interpolation functions.
Figure 9B:
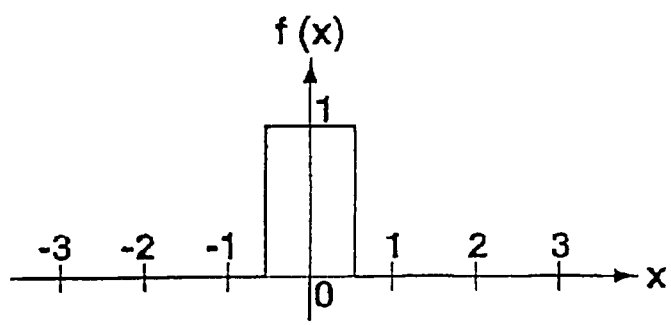
Figure 9C:
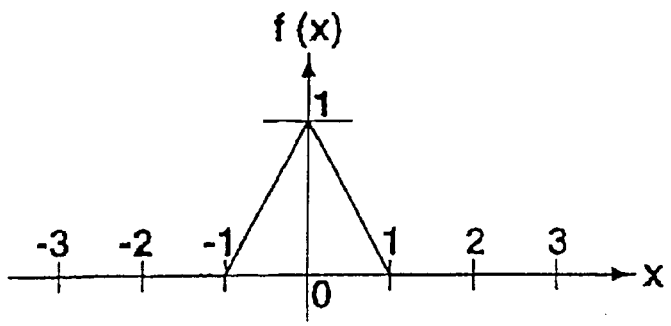
Figure 9D:
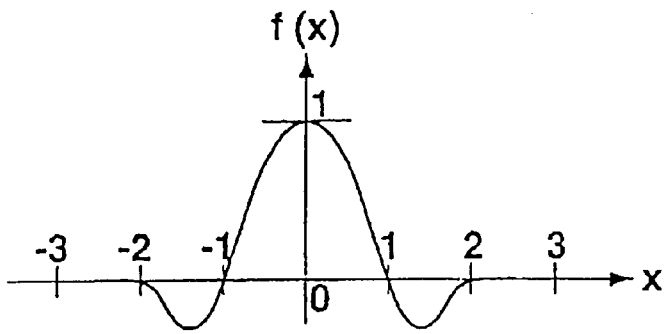

Then, in step S28, the element processor 31 calculates the sum of $Y_{1A}$ and $Y_{2A}$ and replaces $Y_{1A}$ with the results of this calculation ($Y_{1A}$←$Y_{1A}$+$Y_{2A}$). At this time, the value of $Y_{1A}$ is $R_{-1}$×FC1+$R_0$×FC2+$R_{+2}$×FC3+$R_{+3}$×FC4, corresponding to the pattern of type 2 of FIG. 7.

Next, in step S29, the element processor 31 calculates the product of the data $R_{-2}$ for the element processor 31 neighboring two to the left and the filter coefficient FC1 and replaces $Y_{1B}$ with the results of this calculation ($Y_{1B}$←$R_{-2}$×FC1).

In step S30, the element processor 31 calculates the product of the data $R_0$ supplied by itself and the filter coefficient FC2 and replaces $Y_{2B}$ with the results of this operation ($Y_{2B} \leftarrow R_0 \times FC2$).

Then, in step S31, the element processor 31 calculates the sum of $Y_{1B}$ and $Y_{2B}$ and replaces $Y_{1B}$ with the results of this calculation ($Y_{1B} \leftarrow Y_{1B} + Y_{2B}$). Next, in step S32, the element processor 31 calculates the product of the data $R_{+1}$ of the element processor 31 neighboring to the right and the filter coefficient FC3, with $Y_{2B}$ then being replaced with the results of the calculation ($Y_{2B} \leftarrow R_{+1} \times FC3$)

In step S33, the element processor 31 calculates the sum of $Y_{1B}$ and $Y_{2B}$ and replaces $Y_{1B}$ with the results of this calculation ($Y_{1B} \leftarrow Y_{1B} + Y_{2B}$).

Next, in step S34 the element processor 31 calculates the product of the data $R_{+2}$ of the element processor 31 neighboring two to the right and the filter coefficient FC4 and replaces $Y_{2B}$ with the results of this calculation ($Y_{2B} \leftarrow R_{+2} \times FC4$).

In step S35, the element processor 31 calculates the sum of $Y_{1B}$ and $Y_{2B}$ and replaces $Y_{1B}$ with the results of this operation ($Y_{1B} \leftarrow Y_{1B} + Y_{2B}$). At this time, the value of $Y_{1B}$ is $R_{-2} \times FC1 + R_0 \times FC2 + R_{+1} \times FC3 + R_{+2} \times FC4$, with this corresponding to the pattern of type 4 of FIG. 22.

In step S36, the element processor 31 refers to a value (0 or 1) expressing the aforementioned position information supplied together with the input data Ri to determine whether or not this value is a first value (the value corresponding to type 2 of FIG. 22). When it is determined that this value is a first value, step S37 is proceeded to and $Y_{1A}$ of step S28 is taken as the calculation results. When the value showing the positional relationship is determined not to be a first value (i.e. in the case of the value corresponding to type 4 of FIG. 22), $Y_{1B}$ of step S35 is taken as the results of the arithmetic.

In the above, filter arithmetic is carried out using data for the neighboring element processor 31 corresponding to the second type of positional relationship.

Filter coefficient sets corresponding to all of the element processors 31 can be stored at the memory 28 but as the same filter coefficient sets are utilized at the element processors 31 for calculating pixel values of the same phase, it is also possible to store just the number of filter coefficient sets for the number of phases utilized so that economies can be made with the storage region of the memory 28.

When image enlarging of a scale of, for example, 10/7 is carried out, as there are just ten types of phase, ten types of filter coefficient set corresponding to these phases are stored at the memory 28. These ten types of filter coefficient sets can then be repeatedly outputted in response to the order of the element processors 31. The order in this case is the order of the filter select number Pi of FIG. 11.

Further, by providing a selector and supplying one of either a filter coefficient set or input data from the memory 28 to the input SAM 22, the filter coefficient set can be supplied in the same way as the input data in a period such as the vertical flyingback period where the input SAM 22 is not utilized in the supplying of the input data Ri.

Filter coefficients of a large number of bits (long word length) can then be supplied in a short period of time by supplying filter coefficients using a bus of the same bit number as the input data.

For example, when the number of bits for the filter coefficients is 10, the four filter coefficient sets provide a total of 40 bits of data. Supplying of filter coefficients to the data memory 23 via, for example, the 16-bit input data bus 65 and the input SAM 22 during the vertical flyingback period is therefore possible.

Further, after all of the filter coefficients have been supplied, the filter coefficients can also, for example, be gradually changed using a bit width of four bits of the input data bus 65. In this case, the filter coefficients are used as is in the number of horizontal scanning periods up until the transfer is complete in order to continuity in the filter operation.

In the first embodiment, the filter coefficient set is supplied to the input SAM 22 using a pattern that is different to that for the input data Ri (as the filter coefficients are supplied to each of the element processors 31 in this order). Therefore, when the filter coefficients are supplied in parallel with the input data, a circuit is provided for pointer control of the two system input SAM 22 and the pointer control of the input data Ri and the pointer control of the filter coefficients can be carried out independently.

Second Embodiment

Figure 25:
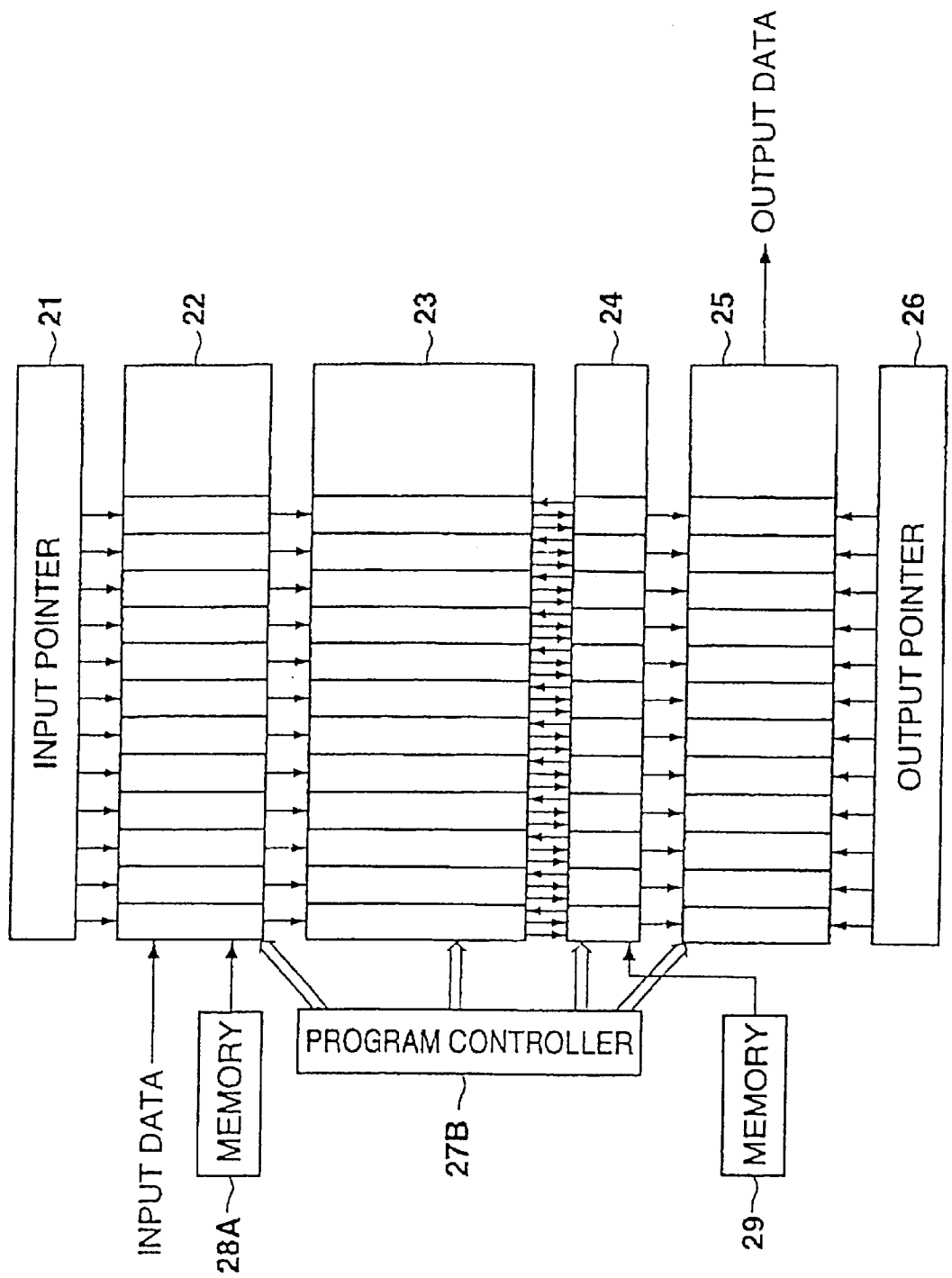
FIG. 25 is a block diagram showing the configuration of the second and eighth embodiments of the image processing device of the present invention.

FIG. 25 shows a configuration of a second embodiment of the present invention. In the second embodiment, data for the filter coefficient sets corresponding to each of the phases of the calculated pixels is held at a memory 29. The memory 29 also supplies filter coefficient sets to the data memory 23 via the ALU array 24 of the element processor 31 for calculating the value of pixels of phases corresponding to these filter sets during activation, horizontal flyingback periods or vertical flyingback periods etc. under the control of the program controller 27B.

A memory 28A then holds filter select numbers i corresponding the phases (filter select signal Pi of FIG. 12) of pixels to be calculated by these element processors 31 so as to correspond with each element processor 31. This filter select number i is then supplied to the data memory 23 together with the input data Ri via the input data bus 65 in the same way as for the filter coefficient set of the first embodiment.

The data stored at memory 28A and 29 is supplied beforehand on activation by a CPU for external control.

The program controller 27B controls each part and carries out operations described in the following.

The remaining structural elements are the same as the case for the first embodiment and their description will be omitted.

The filter select number i held in the memory 28A is supplied beforehand to the data memory 23 at, for example, the time of start up via the input data bus 65 and the input SAM 22.

For example, when there are ten kinds of pixel phases, the memory 28A can then be made to store ten filter select numbers i corresponding to the ten types of phase regardless of the number of horizontal pixels H. Namely, when there are ten filter select numbers i, this filter select number can be expressed as a four bit binary number so that the memory 28A stores four bits of data as the filter select number i.

Even when there are 1,000 filter select numbers i, this can be expressed using a ten bit binary number and the load on the input SAM 22 can therefore by reduced by supplying filter coefficients via the input SAM 22 as in the first embodiment.

FIG. 26 shows an example of filter select numbers i ($=\{\phi i_0, \ldots, \phi i_3\}$) stored in the data memories 23 for each of the element processors 31. With the data memory 23 of FIG. 26, ten types of filter select number i (i=0, . . . , 9) are stored as four bit data. For example, four bit data $\{\phi_{20}, \ldots, \phi_{23}\}$ for which the filter select number i is 2 is stored at the data memory 23 of an element processor 31 for which the number is 6.

Figure 27:
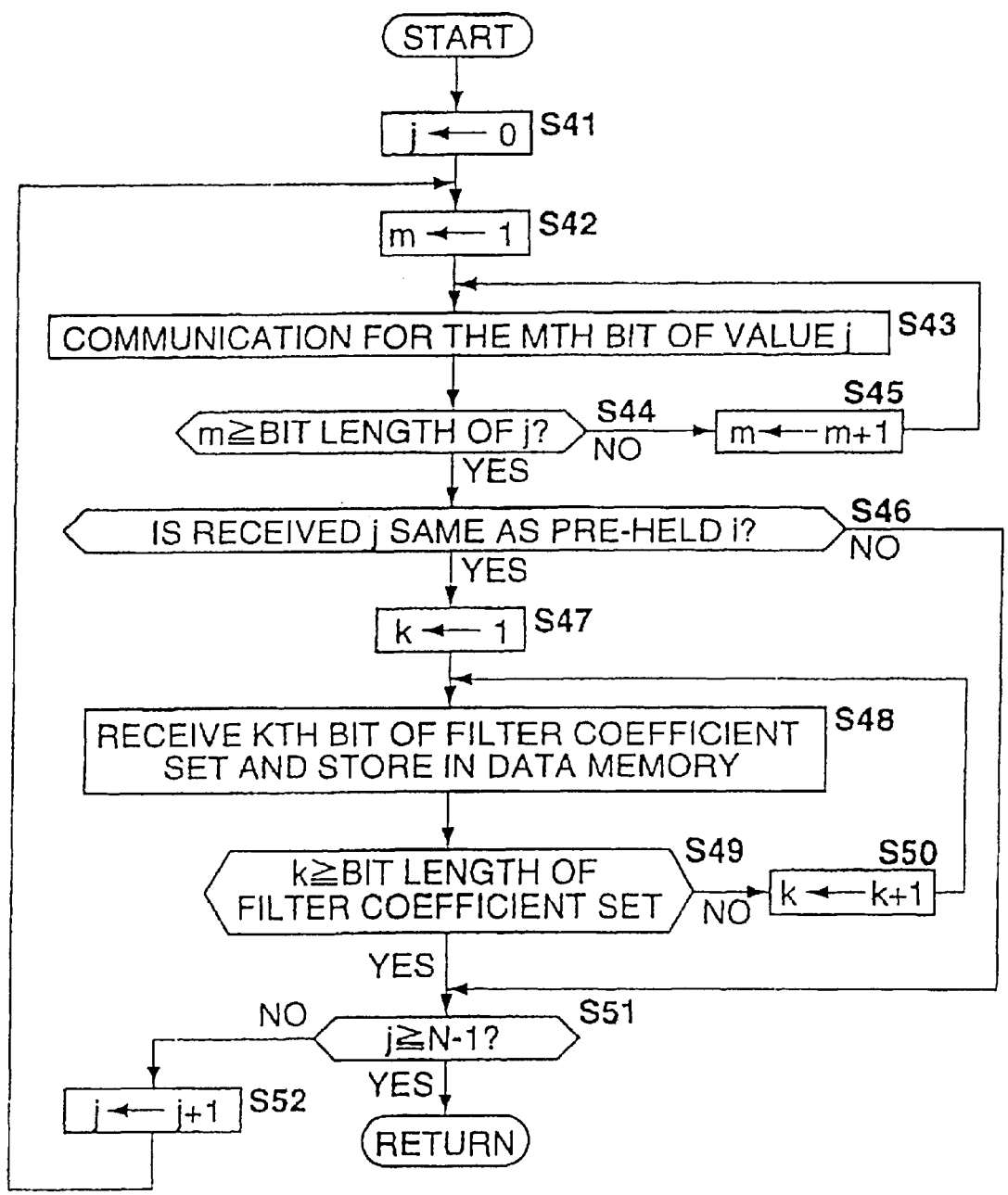
FIG. 27 is a flowchart illustrating the operation of the image processing device of FIG. 25 when filter coefficient sets are provided.

The operation of each part when filter coefficient sets are supplied to the data memories 23 of each of the element processors 31 will now be described for the second embodiment with reference to the flowchart of FIG. 27.

First, in step S41, the program controller 27B sets the value of the counter j for counting the filter select numbers i corresponding to the supplied filter coefficient sets to zero.

Next, in step S42, the program controller 27B sets the value of the counter m utilized at the time of supplying the value of the counter j in bit units to 1.

The program controller 27B then outputs the value of the mth bit of the value of the counter j to the ALU cells 24A of all of the element processors 31 and the ALU cells 24A of each of the element processors 31 receive these bit values.

In step S44, the program controller 27B determines whether or not the value for the counter m is equal to or greater than the bit length of the counter j. When the value of the counter m is smaller than the bit length of the counter j, the value of the counter m is incremented by 1 in step S45, step S43 is returned to and the following bit is supplied.

The value of the counter j is supplied to each of the element processors 31 one bit at a time.

On the other hand, when the value of the counter m is determined to be equal to or greater than the bit length of the counter j in step S44, the value of the counter j is supplied. Then, in step S46, each of the element processors 31 determine whether or not the received value of the counter j and the value of the filter select number i supplied beforehand by the memory 28A are the same. When these values are the same, a flag is set so as to correspond to this determination and step S47 is proceeded to.

In step S47, each of the element processors 31 set the value of the counter k for counting the number of bits of the supplied filter coefficient set to 1 in accordance with this flag.

In step S48, at each of the element processors 31, the values of the kth bits of the filter coefficient set outputted by the memory 29 are received by the ALU cells 24A and stored in the data memory 23.

At the memory 29, the filter coefficient sets corresponding to each phase (i.e. filter select number i) are stored sequentially from the most significant bit or least significant bit every coefficient. The filter coefficient set is then sequentially outputted to the ALU cells 24A of the element processor 31 one bit at a time via a one bit line as described above.

In step S49, each of the element processors 31 determines whether or not the value of the counter k is equal to or greater than the bit length of the filter coefficient set. When it is determined that the value of the counter k is smaller than the bit length of the filter coefficient set, the value of the counter k is incremented by one in step S50, step S48 is returned to and the following bit of the filter coefficient set is received.

On the other hand, when it is determined in step S49 that the value of the counter k is greater than or equal to the bit length of the filter coefficient set, the providing of the filter coefficient set corresponding to the value of the counter j is complete and step S51 is proceeded to.

Conversely, when the element processors 31 determine in step S46 that the value of the counter j and the value of the filter select number i supplied beforehand by the memory 28A are not the same, the element processors 31 do not receive the filter coefficient set outputted by the memory 29 and step S47 to step S50 are skipped.

Next, the program controller 27B makes a determination in step S51 as to whether or not the value of the counter j is equal to or greater than a value that is one less than a pixel phase number N. When it is determined that the value of the counter j is a value equal to or greater than the pixel phase number N reduced by one (j≧N−1), as one of the N filter coefficient sets is supplied to each of the element processors 31, the processing for supplying the filter coefficient set is complete.

On the other hand, when the program controller 27B determines that the value of the counter j is a value smaller than the pixel phase number N with one subtracted (j<N−1), the value of the counter j is incremented by one in step S52, step S42 is returned to and supplying of the filter coefficient set corresponding to the following filter select number i is carried out.

In this way, at each of the element processors 31, filter coefficients corresponding to the filter select number i supplied beforehand are received by the memory 29 and stored in the data memory 23.

In this way, by supplying the filter coefficient sets via a separate path to that for the input data Ri, the filter coefficient set can be selectively supplied to the element processor 31 in a simple manner without an excessive number of program steps being required.

When whichever of, for example, ten types of filter coefficient sets stored in the memory 29 is supplied to each element processor 31, one filter coefficient set is simultaneously supplied to about ten percent of all the element processors 31. When the filter coefficient set is, for example, 40 bits, filter coefficient sets are supplied to all of the element processors 31 in an operation of 400 (=40 bits×10) steps regardless of the number of element processors 31.

As the operation at the time of carrying out image data processing is the same as that for the first embodiment a description will be omitted.

In the second embodiment, filter coefficient sets can be provided regardless of the operating conditions of the input SAM 22 because the filter coefficient sets are provided by a separate path to the input data.

Third Embodiment

Next, the third embodiment of the present invention will be described. In this embodiment, each of the element processors calculates out the filter coefficient set in correspondence to the filter select number i.

As the configuration of the third embodiment and the operation at the time of filter calculations is the same as for the first embodiment a description will be omitted. The memory 28 stores the filter select number i in the same way as the memory 28A of the second embodiment.

Next, the operation of each of the parts when calculating the filter coefficient set will be described for the third embodiment with reference to the flowcharts of FIG. 28 and FIG. 29. Here, the filter coefficient set occurring in the Cubic approximation method of equation (4) is calculated but filter coefficient sets for other approximation methods can of course be calculated.

First, in step S61, taking the ratio of change of the image to be K/L, the phase i/k for the pixel for which the value is to be calculated is calculated using the filter select number i supplied beforehand and K, with this being stored as $X_0$ and with K and L being supplied by the program controller 27A.

Next, in step S62 the element processor 31 replaces X with $X_0$, calculates the square of X (X×X) in step S63 and stores the results of this calculation as $X_2$.

Further, in step S64, the element processor 31 calculates the product of $X_2$ and X (i.e. X cubed) and stores the result of this calculation as $X_3$.

Then, in step S65, the element processor 31 calculates the filter coefficient FC3 from X, $X_2$ and $X_3$ utilizing equation (4) in accordance with the following equation.

$$FC3 = -X_3 + 5X_2 - 8X + 4 \qquad (5)$$

The element processor 31 then, in step S66, replaces X with the value of $X_0$ (=i/K) incremented by one.

In step S67, the element processor 31 calculates the square of X (X×X) and substitutes $X_2$ with the results of this calculation. In step S68, the product of $X_2$ and X is calculated (i.e. the cube of X), with $X_3$ then being substituted with the results of this calculation.

In step S69, the element processor 31 calculates the filter coefficient FC4 from X, $X_2$ and $X_3$ utilizing equation (4) in accordance with the following equation.

$$FC4 = X_3 - 2X_2 + 1 \quad (6)$$

Then, in step S70, the element processor 31 substitutes X with a value for $X_0$ with one subtracted.

In step S71, the element processor 31 calculates the square of X (X×X) and substitutes $X_2$ with the results of this calculation. In step S72, the product of $X_2$ and X is calculated (i.e. the cube of X) and $X_3$ is substituted with the results of this calculation.

In step S73 the element processor 31 calculates the filter coefficient FC2 from X, $X_2$ and $X_3$ utilizing equation (4) in accordance with the following equation.

$$FC2 = -X_3 + 5X_2 - 8X + 4 \quad (7)$$

Next, in step S74, the element processor 31 calculates a value (2−i/K) with just one added to X and substitutes X with the results of this calculation.

Then, in step S75, the element processor 31 calculates the square of X (X×X) and substitutes $X_2$ with the results of this calculation. In step S76, the product of $X_2$ and X is calculated (i.e. the cube of X) and $X_3$ is substituted with the results of this calculation.

In step S77, the element processor 31 calculates the filter coefficient FC1 from X, $X_2$ and $X_3$ utilizing equation (4) in accordance with the following equation.

$$FC1 = X_3 - 2X_2 + 1 \quad (8)$$

In the third embodiment, filter coefficient sets (FC1, FC2, FC3, FC4) are calculated at each of the element pro cessors 31 so as to correspond to the filter select numbers i.

By calculating the filter coefficient sets at each of the element processors 31 in this way, it is no longer necessary to supply the filter coefficient sets from memory (memory 28, 29, etc.) outside of the element processor 31, nor is it any longer necessary to consider the timing of supplying the filter coefficient sets.

Fourth Embodiment

Figure 30:
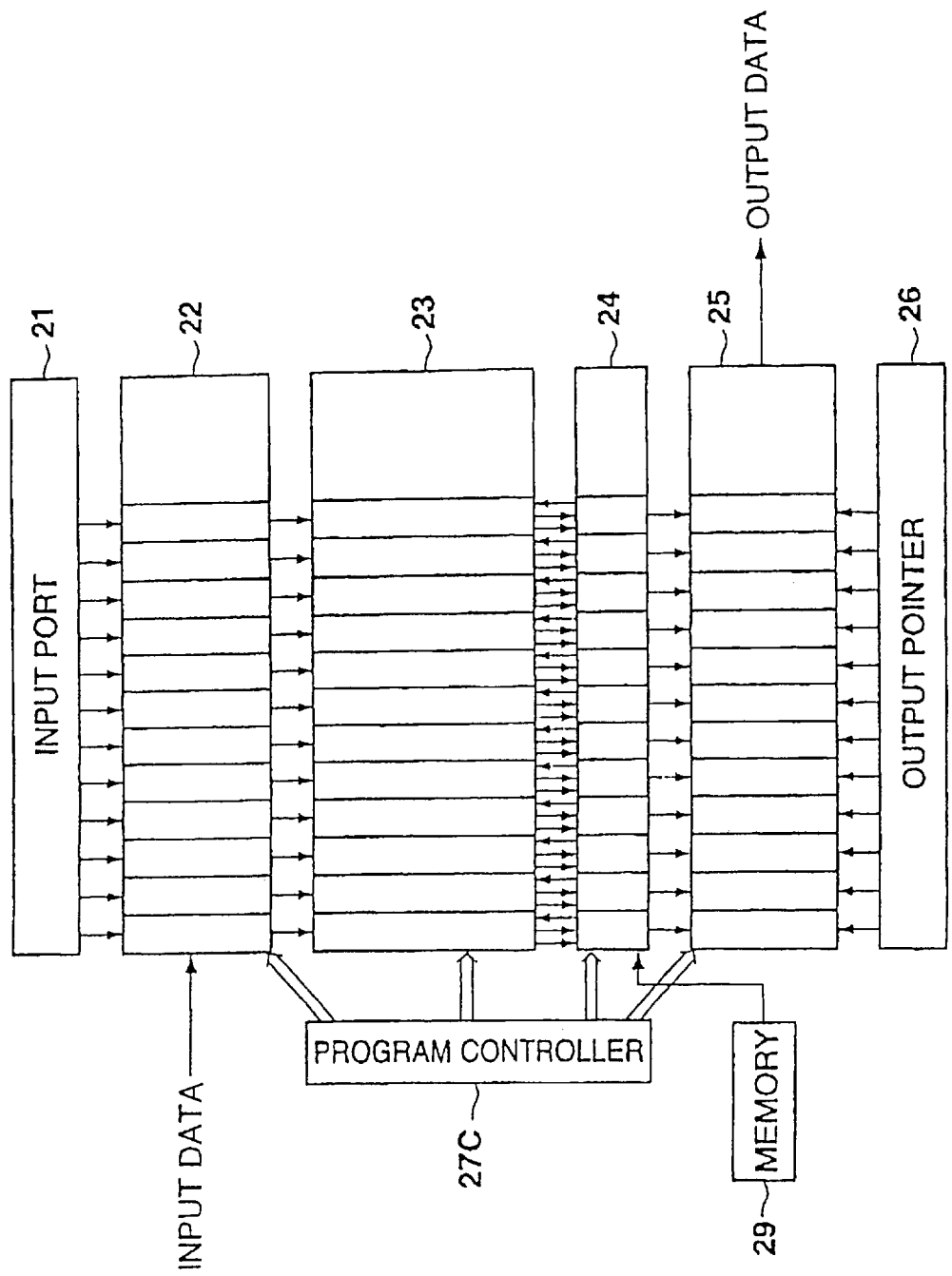
FIG. 30 is a block diagram showing the configuration of the fourth and tenth embodiments of the image processing device of the present invention.

FIG. 30 shows the configuration of a fourth embodiment of the present invention.

In the fourth embodiment, the memory 28A of the second embodiment is removed and the filter select numbers i are calculated at each of the element processors 31.

The program of the program controller 27C has been modified to operate as is described in the following but other structural elements and the operation during supplying of filter coefficients and operation during filter calculations etc. is the same as for the second embodiment and will therefore not be described.

Figure 31:
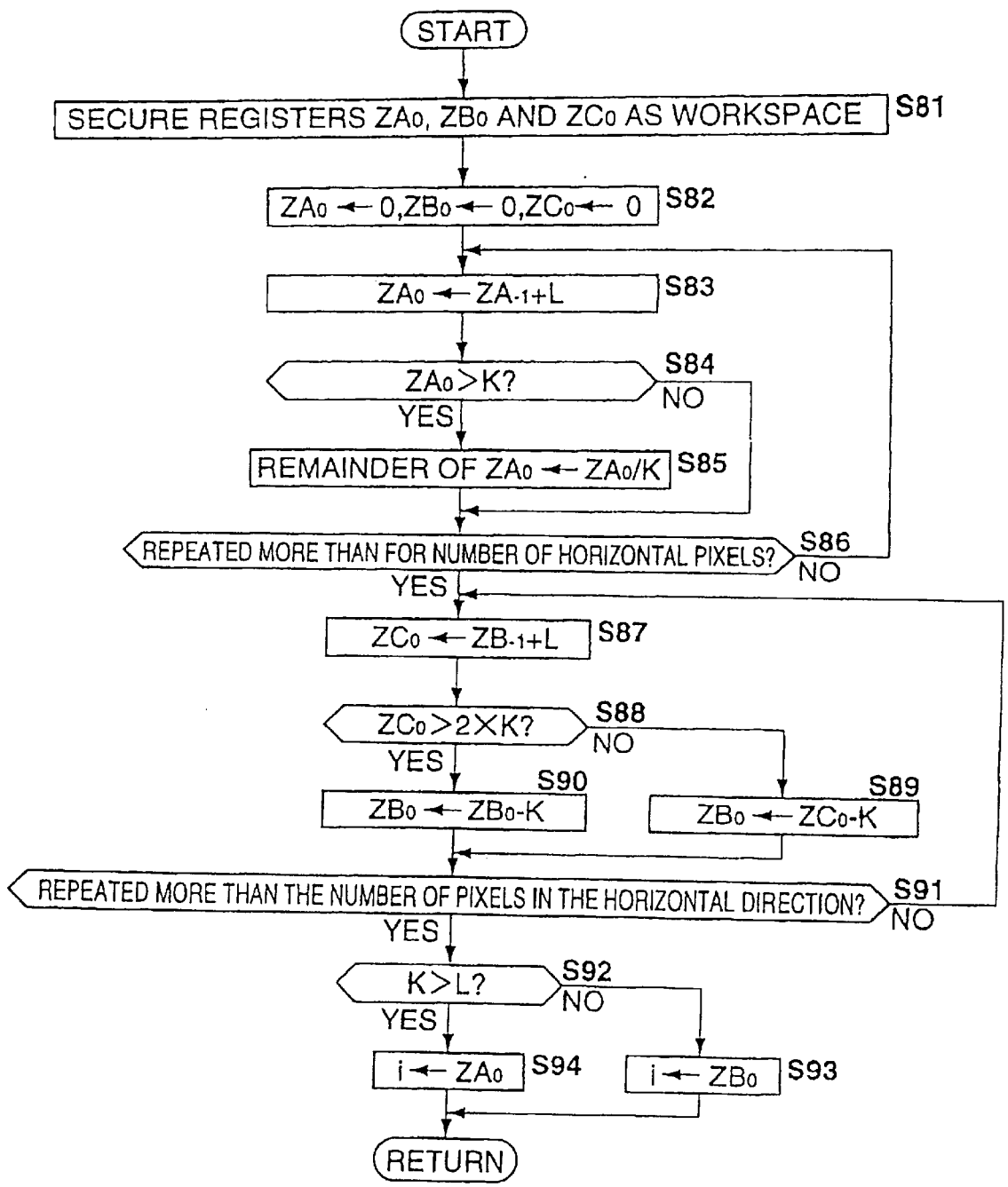
FIG. 31 is a flowchart illustrating the operation of the image processing device of FIG. 30 when each of the element processors calculate filter select numbers.

Next, a description will be given of the operation at the time of calculating the filter select number i with reference to the flowchart of FIG. 31.

First, in step S81, the element processor 31 secures registers $ZA_0$, $ZB_0$ and $ZC_0$ as a work space.

Then, in step S82, each of the element processors 31 put zero into each of $ZA_0$, $ZB_0$ and $ZC_0$.

In step S83, each of the element processors 31 calculate the product of the value $ZA_{-1}$ of $ZA_0$ of the element processor 31 neighboring to the left and L at the time of taking the ratio of change as K/L (i.e. K:L). As the element processor 31 furthest to the left side does not have an element processor 31 neighboring to the left, calculations in this case are carried out taking $ZA_{-1}$ as zero.

In step S84, each of the element processors 31 makes a determination as to whether or not the value of $ZA_0$ is larger than K. When it is determined that the value of $ZA_0$ is larger than K, in step S85, the remainder when the value for $ZA_0$ is divided by K is calculated and $ZA_0$ is substituted with the results of this calculation.

On the other hand, when it is determined by each of the element processors 31 that the value of $ZA_0$ is equal to or less than K, step S85 is skipped.

Then, in step S86, a d etermination is made by each of the element processors 31 as to whether or not the operation of step S83 to step S85 has been repeated more than the number of pixels for the horizontal direction of the image format currently being handled. When it is determined that the operation of step S83 to step S85 as yet only been repeated by a number of times that is less than the number of pixels of the horizontal direction of the image format currently being handled, step S83 is returned to and the operation of step S83 to step S85 is carried out again.

On the other hand, when the element processors 31 determine that the operation of step S83 to step S85 has been repeated a number of times in excess of the number of pixels in the horizontal direction of the image format currently being handled, step S87 is proceeded to.

In step S87, each element processor 31 calculates the product of a value $ZB_{-1}$ for $ZB_0$ of the element processor 31 neighboring to the left and stores the result of this calculation in $ZC_0$. As the element processor 31 furthest to the left side does not have an element processor 31 neighboring to the left, calculations are carried out taking $ZB_{-1}$ as zero.

Next, in step S88, an element processor 31 makes a determination as to whether or not the value for $ZC_0$ is greater than a value that is two times K. When it is determined that the value of $ZC_0$ is greater than a value that is two times the value of K, in step S90, $ZB_0$ is substituted with a value that is the value of $ZB_0$ with K subtracted.

On the other hand, when the element processor 31 determines that the value of $ZC_0$ is less than or equal to two times K, in step S89, $ZB_0$ is substituted with a value that is the value $ZC_0$ with K subtracted.

In step S91, each of the element processors 31 make a determination as to whether or not the operation of step S87 to step S90 has been repeated more than the number of pixels for the horizontal direction for the image format currently being handled. When it is determined that the operation of step S87 to step 90 has only been repeated a number of times that is equal to or less than the number of pixels for the horizontal direction of the image format currently being handled, step S87 is returned to and the operation of step S87 to step S90 is repeated again.

On the other hand, when each of the element processors 31 determine that the operation of step S87 to step S90 has been repeated more than the number of pixels for the horizontal direction of the image format currently being handled, step S92 is proceeded to.

In step S92, each of the element processors 31 make a determination as to whether K is larger than L, i.e. whether or not the process is an image enlarging process. When it is determined that K is larger than L, in step S94, the value of $ZA_0$ is utilized as the filter select number i and when K is determined to be less than or equal to L, in step S93, the value of $ZB_0$ is utilized as the filter select number i.

In this way, the filter select number i is calculated. In step S85 a dividing (or multiplying) operation is shown to be carried out but in reality subtracting is repeatedly carried out. Although the above process has a large number of processing steps, this is not a problem as this can be carried out before carrying out real time processing or can be carried out in the vertical flyingback period etc.

The positional relationship (method of inputting Ri of FIG. 14) of the input or output data and the element processors 31 can be set to correspond with the determinations occurring in step S84 and step S88, i.e. step S85 carries out the same processing as for the aforementioned phase modulo arithmetic. The allotment of input data to each of the element processors 31 can therefore be set by comparing the number with which the modulo calculation and the pixel number calculated by this element processor so as to make this correspond to the determination occurring in step S84.

Fifth Embodiment

Figure 32:
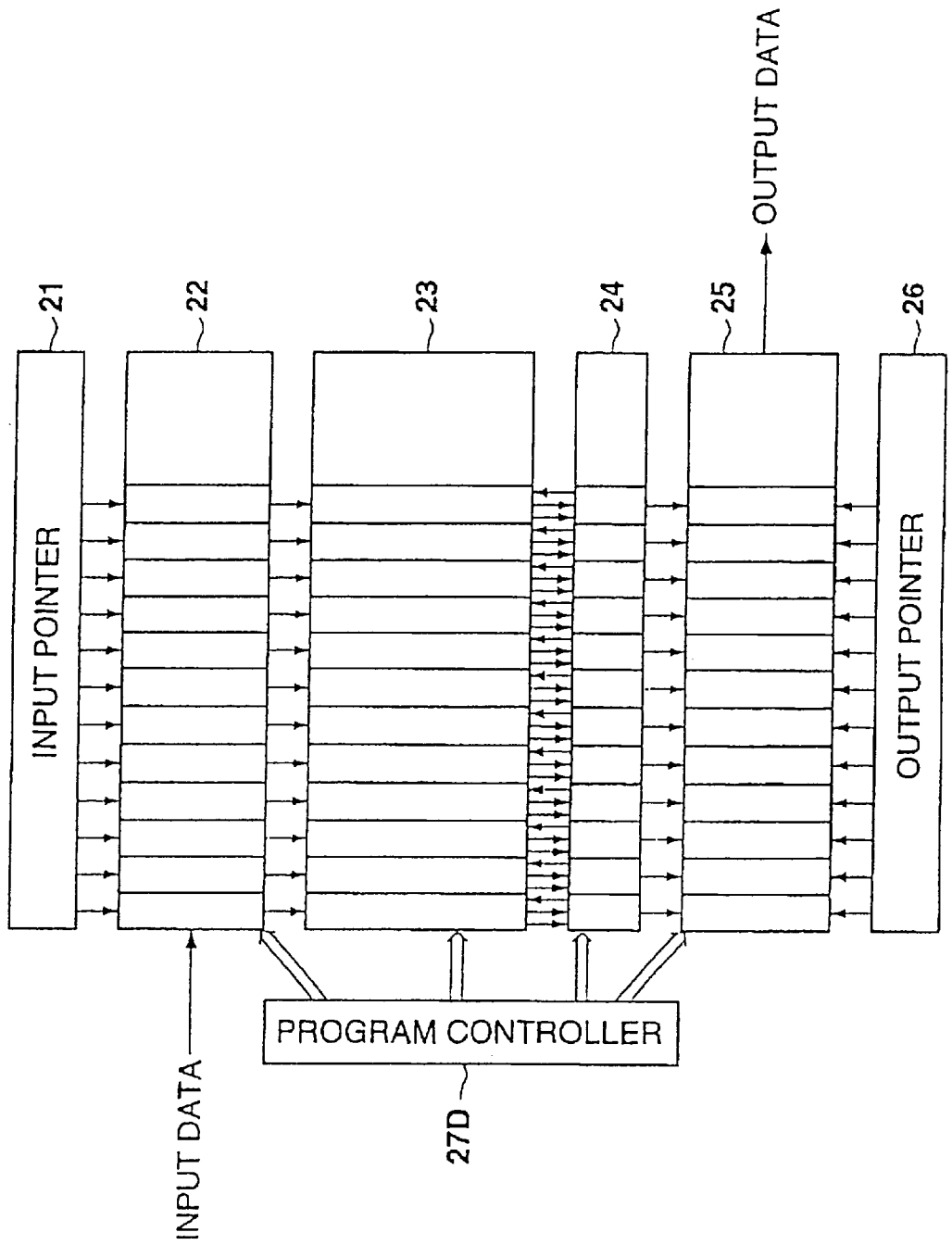
FIG. 32 is a block diagram showing the configuration of the fifth and eleventh embodiments of the image processing device of the present invention.

FIG. 32 shows a configuration of a fifth embodiment of the present invention.

The fifth embodiment calculates the filter select numbers i and corresponding filter coefficient sets at each of the element processors 31 in the same way as in the third and fourth embodiments and therefore does not require the memories 28, 28A and 29.

A program controller 27D controls each of the element processors 31 and calculates the filter select numbers i and the corresponding filter coefficient sets in the same way as the program controllers of the third and fourth embodiments.

Other structural elements are the same as for the fourth embodiment and will not be described. Further, the operation at the time of calculating the filter coefficient sets is the same as that for the third embodiment and other operations are the same as those for the fourth embodiment and therefore will not be described here.

As shown in FIG. 12, there are some filter coefficients (filter coefficients corresponding to P1, P2, P3 and P7) that do not total 128 (i.e. 1.0 expressed as a real number) of the total of four filter coefficients (expressed as 8 bits) each corresponding to each phase. This error occurs when the filter coefficients are quantized to 8 bits and, if these coefficients are used with out correction, pulsating occurs in output data corresponding to input data having a substantial direct current component, which can be deteriorate the image. It is therefore preferable to correct the filter coefficients FC1 to FC4 so that the total becomes 128.

In this case, it is better to correct FC1 or FC4 that have little influence on the characteristics of the interpolation filter than FC2 and FC3. For example, the filter coefficient total can be made to be 128 by changing the value for the filter coefficient FC1 corresponding to the phase P1 of FIG. 29 from −1 to −2.

It would also be preferable to correct filter coefficients for which the error at the time of quantization to eight bits is the greatest. For example, the filter coefficient FC3 corresponding to the phase P3 is expressed as 0.363 as a real number and as 46 when expressed in eight bits. As this error is then large at 0.464 (=0.363×128−46), the filter coefficient total can be made 128 by changing FC3 to 47.

In the above embodiment a description has been given based on the enlargement of an image but reducing of an image is of course also possible. When an image is reduced, input data is provided densely in order to the input SAM 22 and output data is outputted so as to be spread out to the output SAM 25.

Further, as there are no peripheral element processors 31 having input data to be utilized in calculations for element processors 31 at the ends (the right end and left end) in the above embodiments, the value for the input data in this case is taken to be zero and calculations are then carried out.

In addition to this, various methods such as, for example, continuing data for the ends on towards the outside or taking the ends as centers and assuming the data to be symmetrical can be considered as methods for processing the end sides of images. One of these methods can then be realized by simply listing a program corresponding to a prescribed method.

In the above embodiments each of the element processors 31 just carries out filter operations corresponding to interpolation of pixels. However, various kinds of image processing, which are desired to be executed together with conversion of the number of pixels, such as various filter processing, color operations, conversion to data of a prescribed transmission method, noise elimination, or contour enhancement etc., and television signal processing can be carried out without making modifications to the hardware configuration by making program change or program addition corresponding to the above processing in the program controller.

Further, as the capacity of the memories 28, 28A and 29 is proportional to the number of pixel phases and no larger, the scale of the device will not become large.

Further, the ratio of change of the image can be changed by changing the program for the program controller.

According to the image processing device of the present invention, image data is supplied to a plurality of element processors in such a manner that types of patterns for the positional relationship between peripheral element processors having image data utilized by prescribed element processors and prescribed element processors is kept to a minimum. Image processing can then be carried out at SIMD format parallel processors in accordance with the positional relationship of each pixel.

Further, according to the image processing device of the present invention, filter coefficient sets to be used in interpolation are supplied to respective element processors via an input bus and the respective element processors then carry out image data interpolation processing utilizing these filter coefficient sets. Image processing can then be carried out at SIMD format parallel processors in accordance with the positional relationship of each pixel.

Moreover, according to the image processing device of the present invention, filter coefficients to be used in interpolation are supplied to element processors via a circuit that is different to the input bus and the element processors then carry out image data interpolation processing using these filter coefficient sets. Image processing can then be carried out at SIMD format parallel processors in accordance with the positional relationship of each pixel.

Still further, according to the image processing device of the present invention, the element processors calculate filter coefficients to be used in interpolation in accordance with phase information for image data allotted to a particular element processor, with image data interpolation processing then being carried out utilizing these filter coefficient sets. Image processing can then be carried out at SIMD format parallel processors in accordance with the positional relationship of each pixel.

Sixth Embodiment

Figure 33:
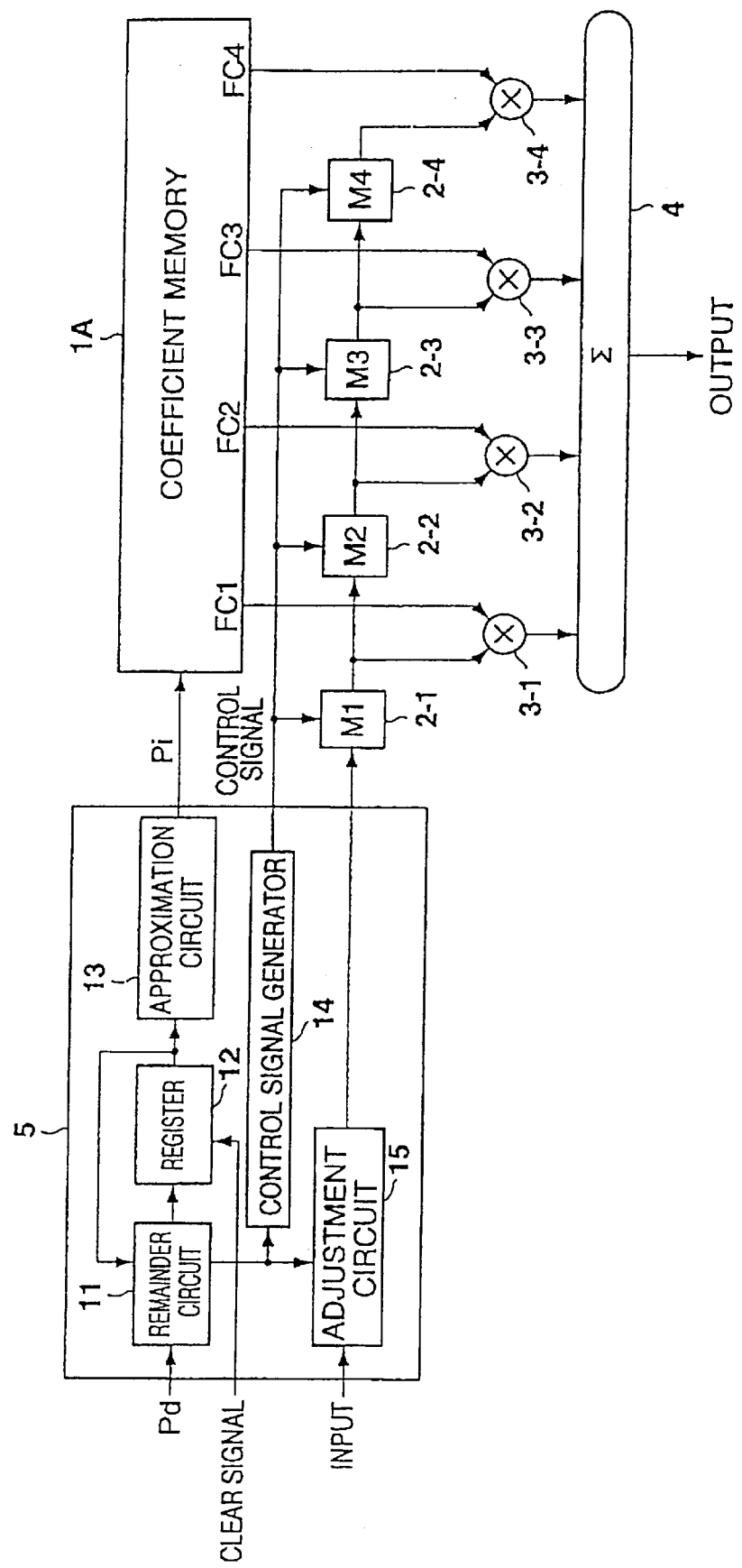
FIG. 33 is a block diagram showing the configuration of the sixth embodiment of the image processing device of the present invention.

FIG. 33 shows an example configuration for a sixth embodiment of an image processing device of the present invention.

A coefficient memory 1A stores filter coefficient sets corresponding to each phase at the time of dividing a pixel interval of an original image by a prescribed dividing number.

For example, when the dividing number is set to be 16, 16 filter coefficient sets (FC1, FC2, FC3, FC4) corresponding to a normalized phase quantity x and a filter select signal Pi are pre-stored at the coefficient memory 1A as shown in FIG. 34.

A controller 5 generates, in accompaniment with the image conversion, a filter select signal Pi in such a manner that a filter coefficient set corresponding to a pixel to be interpolated is selected in accordance with a phase change amount Pd corresponding to the pixel interval after interpolation supplied by a prescribed device (not shown in the drawings). This filter select signal Pi is then outputted to the coefficient memory 1A.

The controller 5 then generates control signals supplied to registers 2-1 to 2-4 in accordance with the cumulative value of the phase change amount Pd.

A remainder circuit 11 of the controller 5 then outputs a remainder (i.e. the decimal portion of the product) at the time of dividing the product of the value stored in a register 12 and the phase change amount Pd by one to the register 12. Further, when the product of the value stored in the register 12 and the phase change amount Pd is one or more, the remainder circuit 11 outputs a prescribed signal to a control signal generator 14 and an adjustment circuit 15.

The register 12 of the controller 5 holds a value supplied by the remainder circuit 11 and outputs this value to the remainder circuit 11 and an approximation circuit 13. The register 12 also resets the held value to zero in accordance with a clear signal supplied every one horizontal scanning period.

The approximation circuit 13 of the controller 5 outputs a filter select signal Pi corresponding to a phase amount (FIG. 34) normalized to be as close as possible to the value supplied by the register 12 to the coefficient memory 1A.

The control signal generator 14 of the controller 5 outputs a control signal of value "L" to registers 2-1 to 2-4 when a prescribed signal is supplied by the remainder circuit 11 and outputs a control signal of value "H" when there is no prescribed signal supplied by the remainder circuit 11.

The adjustment circuit 15 of the controller 5 has a buffer memory (not shown in the drawings) built-in and outputs supplied input pixel data to the register 2-1 at a prescribed timing. When a prescribed signal is supplied by the remainder circuit 11, the adjustment circuit 15 halts the outputting of pixel data occurring in this cycle.

The registers 2-1 to 2-4, multipliers 3-1 to 3-4 and the adder 4 have the same configuration as in FIG. 10 and will therefore not be described.

Next, the operation of the image processing device of FIG. 33 will be described.

First, the phase change amount Pd is supplied to the remainder circuit 11 of the controller 5. The remainder circuit 11 then outputs the decimal portion of the sum of the supplied value and the value of the register 12 to the register 12. When the sum of the supplied value and the value of the register 12 at this time is one or more, the remainder circuit 11 outputs a prescribed signal to the control signal generator 14 and the adjustment circuit 15.

The approximation circuit 13 then outputs a filter select signal Pi corresponding to the filter coefficient set of a phase x that is closest to the phase of the value of the register 12 to the coefficient memory 1A.

The most appropriate filter coefficient set of a prescribed number of filter coefficient sets is then selected for interpolation of prescribed pixel data.

The operation for calculating interpolation values using these filter coefficient sets is the same as for the device of FIG. 30 and a description is therefore omitted.

Next, the operation of the controller 5 when enlarging an image by a scale of 10/7 using, for example, 16 filter coefficient sets pre-stored in the memory 1A will be described with reference to FIG. 35.

First, when a first interpolation value Q1 (FIG. 3) of a phase of zero is calculated, the value of the register 12 is set to an initial value of zero. This value is then supplied to the approximation circuit 13 and the approximation circuit 13 then selects a filter select signal P0 (x=0.0) of the filter select signals Pi shown in FIG. 34 for which the phase x is nearest to the supplied value 0 and outputs this filter select signal P0 to the coefficient memory 1A. At this time, the phase x corresponding to the filter select signal P0 is 0.0 and as this is the same as the supplied value, the phase-related error in this case is zero.

At this time, the phase change amount Pd (in this case, Pd=0.7) is supplied to the remainder circuit 11 and the decimal portion of the sum of the value 0 of the register 12 and the phase change amount 0.7, i.e. 0.7 is outputted to the register 12.

Next, when a second interpolation value Q2 (FIG. 3) of a phase of 0.7 is calculated, the value of the register 12 at this time is set to an initial value of 0.7. This value is then supplied to the approximation circuit 13 and the approximation circuit 13 selects a filter select signal P11 (x=0.6875) of the filter select signals Pi shown in FIG. 34 for which the phase x is nearest to the supplied value 0.7 and outputs this filter select signal P11 to the coefficient memory 1A. At this time, the phase x corresponding to the filter select signal P11 is 0.6875 and as this is different to the supplied value of 0.7 an error relating to the phase of 0.0125 occurs.

At this time, the phase change amount Pd (in this case, Pd=0.7) is supplied to the remainder circuit 11 and the decimal portion of the sum of the value 0.7 of the register 12 and the phase change amount 0.7, i.e. 0.4 is outputted to the register 12.

Next, when a third interpolation value Q3 (FIG. 3) of a phase of 0.4 is calculated, the value of the register 12 at this time is set to an initial value of 0.4. This value is then supplied to the approximation circuit 13 and the approximation circuit 13 then selects a filter select signal P6 (x=0.375) of the filter select signals Pi shown in FIG. 34 for which the phase x is nearest to the supplied value 0.4 and outputs this filter select signal P6 to the coefficient memory 1A. At this time, the phase x corresponding to the filter select signal P6 is 0.375 and as this is different to the supplied value of 0.4 an error relating to the phase of 0.025 occurs.

At this time, the phase change amount Pd (in this case, Pd=0.7) is supplied to the remainder circuit 11 and the decimal portion of the sum of the value 0.4 of the register 12 and the phase change amount 0.7, i.e. 0.1 is outputted to the register 12.

Fourth to tenth interpolation values Qi are then calculated in the above way. When the eleventh interpolation value Q11 is calculated the phase of the pixel to be interpolated is returned to zero. Therefore, in this case, a total of ten filter coefficient sets of the 16 filter coefficient sets are utilized.

As the phase change amount Pd is decided by L of the ratio of change K:L, enlarging or reducing of an image by different scales can be achieved just by changing the value of the phase change amount Pd.

When a prescribed number of filter coefficient sets are used regardless of the aforementioned ratio of change, although the aforementioned phase errors occur, as these are approximated in the sinc function as the interpolation function, this degree of phase error does not present a major problem. The number for dividing the pixel intervals can also be made large as necessary.

In the sixth embodiment, an image can be enlarged or reduced using hardware by an arbitrary scale.

In the above description the number for dividing the pixel intervals was set to 16 but other dividing numbers are possible.

In the above the phase change amount Pd has been expressed using a decimal fraction but an integer obtained by dividing this decimal fraction using a unit phase amount obtained by dividing the pixel interval by the dividing number can also be taken as a phase change amount. In this case, the process for calculating the remainder using the remainder circuit 11 is made simple by taking the dividing number as a power of two, i.e. in this case, the remainder circuit 11 is a binary adder that ignores upper bits. The approximation circuit 13 can then simply be a circuit that carries out rounding off to limit word length.

When only a prescribed number (in this case 10) of the filter coefficient sets for the number (in this case 16) corresponding to the dividing number are used, the coefficient memory 1A only has to stored the filter coefficient sets that are actually used and economies can therefore be made with regards to the storage region of the coefficient memory 1A.

Seventh Embodiment

Next, a description will be given of a seventh embodiment of the present invention. As the configuration of the seventh embodiment is the same as that of the first embodiment, a description will be omitted.

The memory 28 of FIG. 16 holds data for all of the interpolation filter coefficients necessary for filter calculations occurring at all of the element processors that are supplied by a CPU (not shown in the drawings) for external use during activation, the horizontal flyingback period of the vertical flyingback period in the numerical order of the element processors 31. Namely, the memory 28 only stores the preset dividing number of filter coefficient sets in the same way as the coefficient memory 1A of the sixth embodiment.

Figure 19:
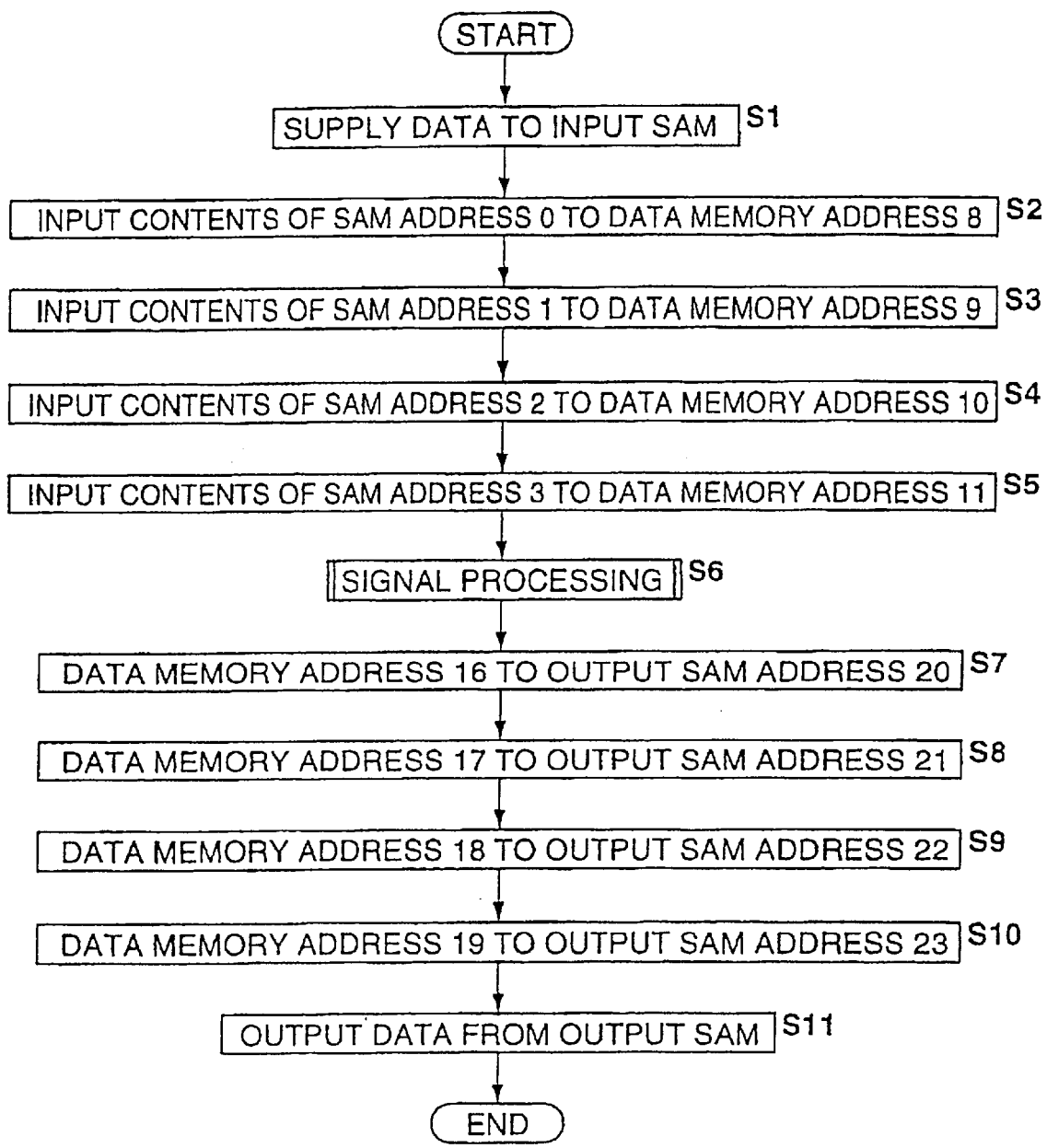
FIG. 19 is a flowchart illustrating the operation of the image processing device of FIG. 16.

Further, as the operation of this seventh embodiment of the present invention is the same as that of the first embodiment with the exception of the signal processing operation of step S6 of FIG. 19, a detailed description will be omitted. Further, as the essential parts of the signal processing operation of step S6 of FIG. 19 are the same as those of the first embodiment, a detailed description of the details of the signal processing occurring in step S6 of FIG. 19 occurring in the seventh embodiment will be given with reference to the flowcharts of FIG. 23 and FIG. 24.

First, in step S21, each element processor 31 stores the supplied data and copies this data to the element processor 31 neighboring to the left. In this embodiment, a configuration has been adopted where communication is only possible with element processors that are first and second to the left and first and second to the right. Therefore, when compensation calculations are carried out, just data that is supplied to the three neighboring element processors 31 to the right is used so that in step S21, this data is copied beforehand to the element processor neighboring to the left.

In the following, data supplied to a prescribed element processor 31 is taken to be $R_0$, data supplied to an element processor 31 neighboring to the left is taken to be $R_{-1}$ and data supplied to the element processor 31 neighboring two to the left is taken to be $R_{-2}$. Further, data supplied to the element processor 31 neighboring to the right is taken to be $R_{+1}$, data supplied to the element processor 31 neighboring two to the right is taken to be $R_{+2}$ and data supplied to the element processor 31 neighboring three to the right is taken to be $R_{+3}$.

Next, in step S22, the element processor 31 calculates the product of the data $R_{-1}$ for the element processor 31 neighboring to the left and the filter coefficient FC1 supplied beforehand and substitutes $Y_{1A}$ with the results of this calculation. This product arithmetic is executed by carrying out bit arithmetic a prescribed number of times.

The filter coefficient set of the filter coefficient sets (FC1, FC2, FC3, FC4) utilized in interpolation operations of a phase that is closest to the phase of the pixel to be processed by this element processor is selected.

By preparing a prescribed number of filter coefficient sets and using the most appropriate filter coefficient set corresponding to the phase of the pixel to be processed, the most appropriate filter coefficient set can be selected with the same operation even when the ratio of change is altered.

In step S23, the element processor 31 calculates the product of the data R0 supplied to itself and the filter coefficient FC2 and replaces $Y_{2A}$ with the result of this calculation.

In step S24, the element processor 31 calculates the sum of $Y_{1A}$ and $Y_{2A}$ and replaces $Y_{1A}$ with the results of this calculation. This sum calculation is executed by carrying out a bit calculation a prescribed number of times.

Next, in step S25, the element processor 31 calculates the product of the data $R_{+2}$ of the element processor 31 neighboring two to the right and the filter coefficient FC3 and replaces $Y_{2A}$ with the results of this calculation.

In step S26, the element processor 31 calculates the sum of $Y_{1A}$ and $Y_{2A}$ and substitutes $Y_{1A}$ with the results of this calculation.

In step S27, the element processor 31 calculates the product of the data R+3 of the element processor 31 neighboring three to the right possessed by the element processor 31 neighboring two to the right and the filter coefficient FC4 and substitutes $Y_{2A}$ with the results of this calculation.

Then, in step S28, the element processor 31 calculates the sum of $Y_{1A}$ and $Y_{2A}$ and replaces $Y_{1A}$ with the results of this calculation. At this time, the value of $Y_{1A}$ is $R_{-1} \times FC1 + R_0 \times FC2 + R_{+2} \times FC3 + R+3 \times FC4$, corresponding to the pattern of type 2 of FIG. 22.

Next, in step S29, the element processor 31 calculates the product of the data $R_{-2}$ for the element processor 31 neighboring two to the left and the filter coefficient FC1 and substitutes $Y_{1B}$ with the results of this calculation.

In step S30, the element processor 31 calculates the product of the data Ro supplied by itself and the filter coefficient FC2 and replaces $Y_{2B}$ with the results of this operation.

Then, in step S31, the element processor 31 calculates the sum of $Y_{1B}$ and $Y_{2B}$ and replaces $Y_{1B}$ with the results of this calculation.

Next, in step S32, the element processor 31 calculates the product of the data $R_{+1}$ of the element processor 31 neighboring to the right and the filter coefficient FC3, with $Y_{2B}$ then being replaced with the results of the calculation.

In step S33, the element processor 31 calculates the sum of $Y_{1B}$ and $Y_{2B}$ and replaces $Y_{1B}$ with the results of this calculation.

Next, in step S34 the element processor 31 calculates the product of the data $R_{+2}$ of the element processor 31 neighboring two to the right and the filter coefficient FC4 and replaces $Y_{2B}$ with the results of this calculation.

In step S35, the element processor 31 calculates the sum of $Y_{1B}$ and $Y_{2B}$ and replaces $Y_{1B}$ with the results of this operation. At this time, the value of $Y_{1B}$ is $R_{-2} \times FC1 + R_0 \times FC2 + R_{+1} \times FC3 + R_{+2} \times FC4$, with this corresponding to the pattern of type 4 of FIG. 22.

In step S36, the element processor 31 refers to a value (0 or 1) expressing the aforementioned position information supplied together with the input data Ri to determine whether or not this value is a first value (the value corresponding to type 2 of FIG. 22). When it is determined that this value is a first value, step S37 is proceeded to and $Y_{1A}$ of step S28 is taken as the calculation results. When the value showing the positional relationship is determined not to be a first value (i.e. in the case of the value corresponding to type 4 of FIG. 22), $Y_{1B}$ of step S35 is taken as the results of the arithmetic.

In the above way, filter calculations (interpolation calculations) are carried out using data for neighboring element processors 31 corresponding to two types of positional relationship. Further, by selecting filter coefficient sets in such a manner that the phase error becomes a minimum, image processing of an arbitrary ratio of change can be carried out even with SIMD format parallel processors.

Further, by providing a selector and supplying one of either a filter coefficient set or input data from the memory 28 to the input SAM 22, the filter coefficient set can be supplied in the same way as the input data in a period such as the vertical flyingback period where the input SAM 22 is not utilized in the supplying of the input data Ri.

Filter coefficients of a large number of bits (long word length) can then be supplied in a short period of time by supplying filter coefficients using a bus of the same bit number as the input data.

For example, when the number of bits for the filter coefficients is 10, the four filter coefficient sets provide a total of 40 bits of data. Supplying of filter coefficients to the data memory 23 via, for example, the 16-bit input data bus 65 and the input SAM 22 during the vertical flyingback period is therefore possible.

In the seventh embodiment, the filter coefficient set is supplied to the input SAM 22 using a pattern that is different to that for the input data Ri (as the filter coefficients are supplied to each of the element processors 31 in this order). Therefore, when the filter coefficients are supplied in parallel with the input data, a circuit is provided for pointer control of the two system input SAM 22 and the pointer control of the input data Ri and the pointer control of the filter coefficients can be carried out independently.

The order of supplying this input data can be the same as for the inputting of the data for the device of FIG. 13 or the data can be temporarily supplied in a sparse state with prescribed data then being copied in accordance with a program.

Eighth Embodiment

Next, a configuration of an eighth embodiment of the present invention will be described. In the eighth embodiment, the memory 29 holds data for filter coefficient sets corresponding to prescribed dividing numbers in the same way as the memory 28 of FIG. 16. During activation, in a horizontal flyingback period or in a vertical flyingback period etc., the memory 29, under the control of the program controller 27B, supplies filter coefficient sets to the data memory 23 via the ALU arrays 24 of the element processors 31 for calculating values for pixels of phases corresponding to this filter coefficient set. As the configuration of this eighth embodiment is the same as for the second embodiment, a description will be omitted.

The memory 28A holds filter select numbers i corresponding to the phases of the pixels calculated by the element processors 31 so as to correspond to each element processor 31 (i.e. a number i corresponding to the filter select signal Pi for the filter coefficient set for which the phase x is closest to the phase of the pixel to be interpolated). This filter select number i is supplied to the data memory 23 together with the input data Ri via the input data bus 65 in the same way as for the filter coefficient set of the second embodiment.

The filter select numbers i held in the memory 28A is supplied beforehand to the data memory 23 via the input data bus 65 and the input SAM 22 at, for example, the time of start up.

For example, when the number by which the pixel interval is divided (i.e. the number of filter coefficient sets) is 16, it is preferable for the memory 28A to store 16 filter select numbers corresponding to 16 types of phase regardless of the number of pixels H in the horizontal direction. Namely, when the filter select number is 16, this filter select number can be expresses as four bits of binary and the memory 28A can therefore store four bits of data as the filter select number i.

Further, the filter select number i can be expressed using ten binary bits even for 1,000 types. The capacity of the memory 28A can therefore be reduced as in the eighth embodiment by supplying the filter coefficients via the input SAM 22.

FIG. 26 shows an example of filter select numbers i (={$\phi i_0, \ldots, \phi i_3$}) stored in the data memories 23 for each of the element processors 31. With the data memory 23 of FIG. 26, of the 16 types of filter select number, ten types of filter select number i (i=0, ..., 9) are stored as four bit data. For example, four bit data {$\phi_{30}, \ldots, \phi_{33}$} for which the filter select number i is 3 is stored at the data memory 23 of an element processor 31 for which the number is 6.

The operation of each part when filter coefficient sets are supplied to the data memories 23 of each of the element processors 31 will now be described for the eighth embodiment but as the operation is principally the same as that of the second embodiment, a description will be given using the flowchart of FIG. 21.

First, in step S41, the program controller 27B sets the value of the counter j for counting the filter select numbers i corresponding to the supplied filter coefficient sets to zero.

Next, in step S42, the program controller 27B sets the value of the counter m utilized at the time of supplying the value of the counter j in bit units to 1.

The program controller 27B then outputs the value of the mth bit of the value of the counter j to the ALU cells 24A of all of the element processors 31 and the ALU cells 24A of each of the element processors 31 receive these bit values.

In step S44, the program controller 27B determines whether or not the value for the counter m is equal to or greater than the bit length of the counter j. When the value of the counter m is smaller than the bit length of the counter j, the value of the counter m is incremented by 1 in step S45, step S43 is returned to and the following bit is supplied.

The value of the counter j is supplied to each of the element processors 31 one bit at a time.

On the other hand, when the value of the counter m is determined to be equal to or greater than the bit length of the counter j in step S44, the value of the counter j is supplied. Then, in step S46, each of the element processors 31 determine whether or not the received value of the counter j and the value of the filter select number i supplied beforehand by the memory 28A are the same. When these values are the same, a flag is set so as to correspond to this determination and step S47 is proceeded to.

In step S47, each of the element processors 31 set the value of the counter k for counting the number of bits of the supplied filter coefficient set to 1 in accordance with this flag.

In step S48, at each of the element processors 31, the values of the kth bits of the filter coefficient set outputted by the memory 29 are received by the ALU cells 24A and stored in the data memory 23.

At the memory 29, the filter coefficient sets corresponding to each phase (i.e. filter select number i) are stored sequentially from the most significant bit (MSB) or least significant bit (LSB) every coefficient. The filter coefficient set is then sequentially outputted to the ALU cells 24A of the element processor 31 one bit at a time via a one bit line as described above.

In step S49, each of the element processors 31 determines whether or not the value of the counter k is equal to or greater than the bit length of the filter coefficient set. When it is determined that the value of the counter k is smaller than the bit length of the filter coefficient set, the value of the counter k is incremented by one in step S50, step S48 is returned to and the following bit of the filter coefficient set is received.

On the other hand, when it is determined in step S49 that the value of the counter k is greater than or equal to the bit length of the filter coefficient set, the providing of the filter coefficient set corresponding to the value of the counter j is complete and step S51 is proceeded to.

Conversely, when the element processors 31 determine in step S46 that the value of the counter j and the value of the filter select number i supplied beforehand by the memory 28A are not the same (i.e. that a flag has not been set), the element processors 31 do not receive the filter coefficient set outputted by the memory 29, i.e. the filter coefficient set is not stored in the data memory 23 and step S47 to step S50 are skipped. In reality, it is difficult to carry out a skip process under SIMD control and the element processors 31 therefore carry out processing that has the same effect as skipping step S47 to step S50.

Next, the program controller 27B makes a determination in step S51 as to whether or not the value of the counter j is equal to or greater than a value that is one less than the number of filter coefficient sets N. When it is determined that the value of the counter j is a value equal to or greater than the number of filter coefficient sets N reduced by one ($j \geq N-1$), as one of the N filter coefficient sets is supplied to each of the element processors 31, the processing for supplying the filter coefficient set is complete.

On the other hand, when the program controller 27B determines that the value of the counter j is a value smaller than the filter coefficient set number N with one subtracted ($j<N-1$), the value of the counter j is incremented by one in step S52, step S42 is returned to and supplying of the filter coefficient set corresponding to the following filter select number i is carried out.

In this way, at each of the element processors 31, filter coefficients corresponding to the filter select number i supplied beforehand are received by the memory 29 and stored in the data memory 23.

In this way, by supplying the filter coefficient sets via a separate path to that for the input data Ri, the filter coefficient set can be selectively supplied to the element processor 31 in a simple manner without an excessive number of program steps being required.

When whichever of, for example, sixteen types of filter coefficient sets stored in the memory 29 is supplied to each element processor 31, one filter coefficient set is simultaneously supplied to about one sixteenth of all the element processors 31. When the filter coefficient set is, for example, 40 bits, filter coefficient sets are supplied to all of the element processors 31 in an operation of 640 (=40 bits×16) steps regardless of the number of element processors 31.

As the operation at the time of carrying out image data processing is the same as that for the second embodiment a description will be omitted.

In the eighth embodiment, filter coefficient sets can be provided regardless of the operating conditions of the input SAM 22 because the filter coefficient sets are provided by a separate path to the input data.

In the eighth embodiment, changing the ratio of change can be achieved by changing the filter select number i corresponding to each of the element processors 31 stored in the memory 28A.

Ninth Embodiment

The following is a description of a ninth embodiment of the present invention. In the ninth embodiment, each of the element processors 31 calculate the filter coefficient sets at each of the element processors 31 in accordance with the filter select number i.

The configuration of the ninth embodiment and operation at the time of filter operations is the same as for the first embodiment and a description will therefore be omitted. However, the memory 28 is taken to store the filter select numbers i in the same manner as the memory 28A of the eighth embodiment.

Therefore, it is necessary to only change the filter select number i corresponding to each element processor 31 stored in the memory 28 in order to change the ratio of change.

Figure 28:
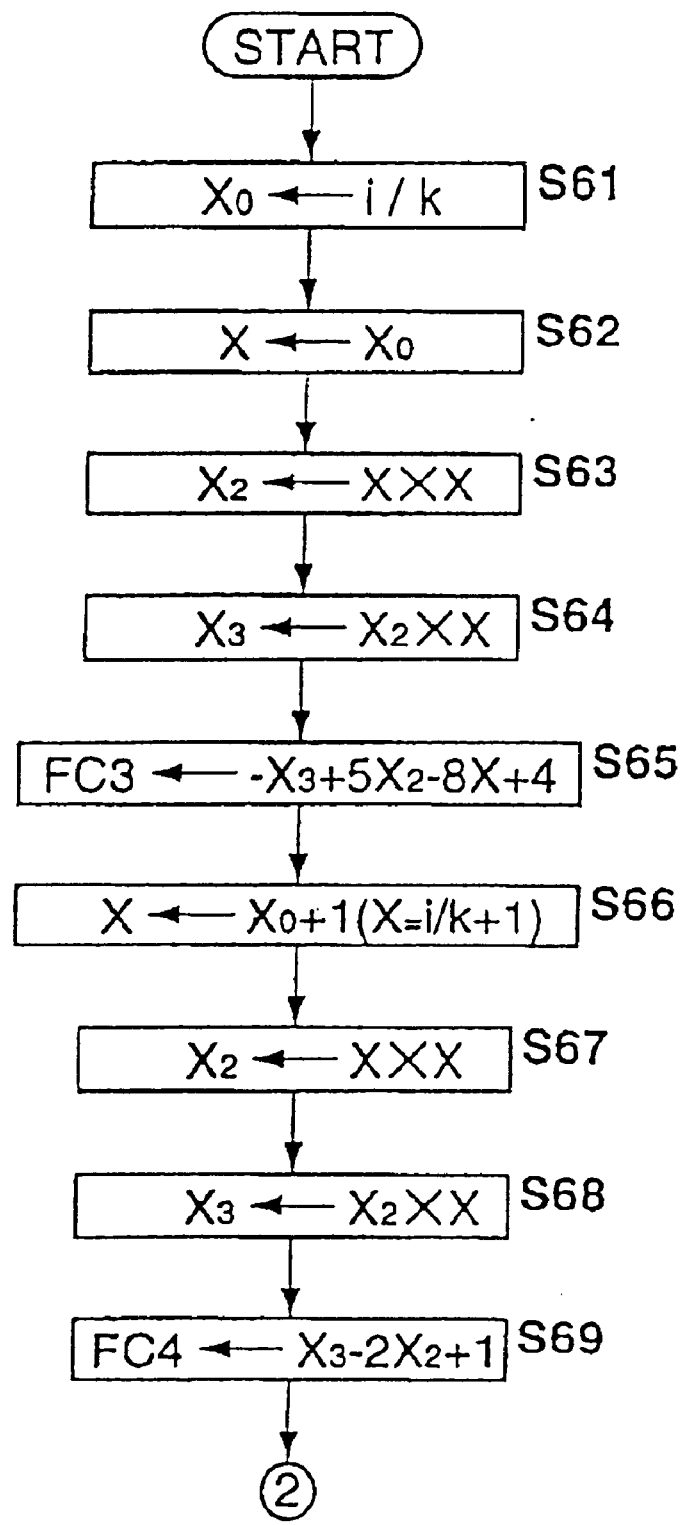
FIG. 28 is a flowchart illustrating the operation when each element processor calculates filter coefficient sets in the third and ninth embodiments.
Figure 29:
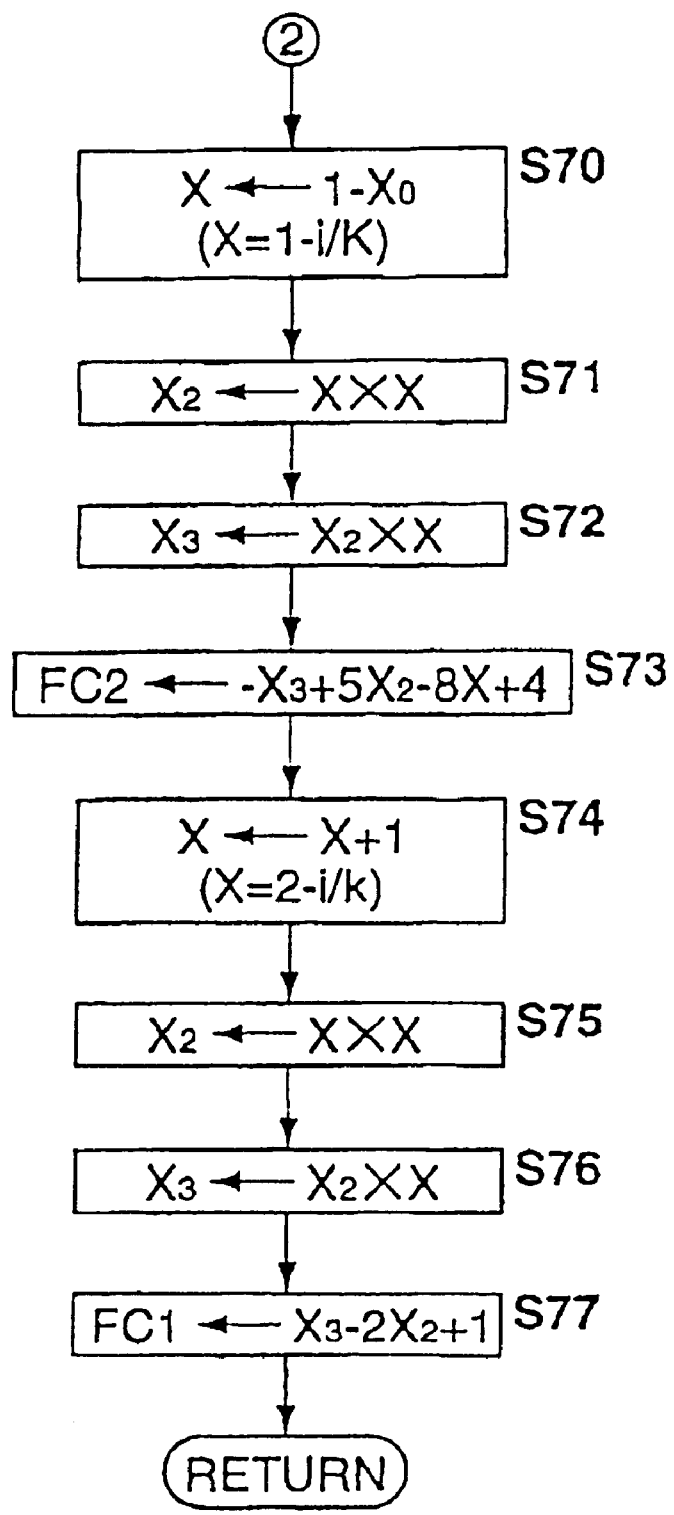
FIG. 29 is further flowchart illustrating the operation when each element processor calculates filter coefficient sets in the third and ninth embodiments.

Next, a description is given of the operation of each of the parts when calculating filter coefficient sets in the ninth embodiment, with a description being given with reference to the flowchart of FIG. 28 and FIG. 29 as the operation is almost the same as that of the third embodiment of the present invention. It is of course, also possible to calculate the filter coefficients occurring in other approximation methods.

First, in step S61, taking the ratio of change of the image to be K/L, the phase i/k for the pixel for which the value is to be calculated is calculated using the filter select number i supplied beforehand and K, with this being stored as $X_0$ and with K and L being supplied by the program controller 27A.

Next, in step S62 the element processor 31 replaces X with $X_0$, calculates the square of X (X×X) in step S63 and stores the results of this calculation as $X_2$.

Further, in step S64, the element processor 31 calculates the product of $X_2$ and X (i.e. X cubed) and stores the result of this calculation as $X_3$.

Then, in step S65, the element processor 31 calculates the filter coefficient FC3 from X, $X_2$ and $X_3$ utilizing equation (4) in accordance with the following equation.

$$FC3 = -X_3 + 5X_2 - 8X + 4 \quad (5)$$

The element processor 31 then, in step S66, replaces X with the value of $X_0$ (=i/K) incremented by one.

In step S67, the element processor 31 calculates the square of X (X×X) and substitutes $X_2$ with the results of this calculation. In step S68, the product of $X_2$ and X is calculated (i.e. the cube of X), with $X_3$ then being substituted with the results of this calculation.

In step S69, the element processor 31 calculates the filter coefficient FC4 from X, $X_2$ and $X_3$ utilizing equation (4) in accordance with the following equation.

$$FC4 = X_3 - 2X_2 + 1 \quad (6)$$

Then, in step S70, the element processor 31 substitutes X with a value for X0 with one subtracted.

In step S71, the element processor 31 calculates the square of X (X×X) and substitutes $X_2$ with the results of this calculation. In step S72, the product of $X_2$ and X is calculated (i.e. the cube of X) and $X_3$ is substituted with the results of this calculation.

In step S73 the element processor 31 calculates the filter coefficient FC2 from X, $X_2$ and $X_3$ utilizing equation (4) in accordance with the following equation.

$$FC2 = -X_3 + 5X_2 - 8X + 4 \qquad (7)$$

Next, in step S74, the element processor 31 calculates a value (2−i/K) with just one added to X and substitutes X with the results of this calculation.

Then, in step S75, the element processor 31 calculates the square of X (X×X) and substitutes $X_2$ with the results of this calculation. In step S76, the product of $X_2$ and X is calculated (i.e. the cube of X) and $X_3$ is substituted with the results of this calculation.

In step S77, the element processor 31 calculates the filter coefficient FC1 from X, $X_2$ and $X_3$ utilizing equation (4) in accordance with the following equation.

$$FC1 - X_3 - 2X_2 + 1 \qquad (8)$$

In the third embodiment, filter coefficient sets (FC1, FC2, FC3, FC4) are calculated at each of the element processors 31 so as to correspond to the filter select numbers i.

By calculating the filter coefficient sets at each of the element processors 31 in this way, it is no longer necessary to supply the filter coefficient sets from memory (memory 28, 29, etc.) outside of the element processor 31, nor is it any longer necessary to consider the timing of supplying the filter coefficient sets.

Tenth Embodiment

The following is a description of a configuration of a tenth embodiment of the present invention.

In the tenth embodiment, the memory 28A of the eighth embodiment is removed and the filter select numbers i are calculated at each of the element processors 31.

The program of the program controller 27C has been modified to operate as is described in the following but other structural elements and the operation during supplying of filter coefficients and operation during filter calculations etc. is the same as for the eighth embodiment and will therefore not be described.

Next, a description will be given of the operation at the time of calculating the filter select number i and as this operation is almost the same as that of the fourth embodiment, a description will be given with reference to the flowchart of FIG. 31.

First, in step S81, the element processor 31 secures registers $ZA_0$, $ZB_0$ and $ZC_0$ as a work space.

Then, in step S82, each of the element processors 31 put zero into each of $ZA_0$, $ZB_0$ and $ZC_0$.

In step S83, each of the element processors 31 calculate the product of the value $ZA_{-1}$ of $ZA_0$ of the element processor 31 neighboring to the left and L at the time of taking the ratio of change as K/L (i.e. K:L). As the element processor 31 furthest to the left side does not have an element processor 31 neighboring to the left, calculations in this case are carried out taking $ZA_{-1}$ as zero.

In step S84, each of the element processors 31 makes a determination as to whether or not the value of $ZA_0$ is larger than K. When it is determined that the value of $ZA_0$ is larger than K, in step S85, the remainder when the value for $ZA_0$ is divided by K is calculated and $ZA_0$ is substituted with the results of this calculation.

On the other hand, when it is determined by each of the element processors 31 that the value of $ZA_0$ is equal to or less than K, step S85 is skipped. In reality, carrying out skipping in processes under SIMD control is difficult and the element processors 31 therefore carry out processing having the same effect as skipping in step S85.

Then, in step S86, a determination is made by each of the element processors 31 as to whether or not the operation of step S83 to step S85 has been repeated more than the number of pixels for the horizontal direction of the image format currently being handled. When it is determined that the operation of step S83 to step S85 as yet only been repeated by a number of times that is less than the number of pixels of the horizontal direction of the image format currently being handled, step S83 is returned to and the operation of step S83 to step S85 is carried out again.

On the other hand, when the element processors 31 determine that the operation of step S83 to step S85 has been repeated a number of times in excess of the number of pixels in the horizontal direction of the image format currently being handled, step S87 is proceeded to.

In step S87, each element processor 31 calculates the product of a value $ZB_{-1}$ for $ZB_0$ of the element processor 31 neighboring to the left and stores the result of this calculation in $ZC_0$. As the element processor 31 furthest to the left side does not have an element processor 31 neighboring to the left, calculations are carried out taking $ZB_{-1}$ as zero.

Next, in step S88, an element processor 31 makes a determination as to whether or not the value for $ZC_0$ is greater than a value that is two times K. When it is determined that the value of $ZC_0$ is greater than a value that is two times the value of K, in step S90, $ZB_0$ is substituted with a value that is the value of $ZB_0$ with K subtracted.

On the other hand, when the element processor 31 determines that the value of $ZC_0$ is less than or equal to two times K, in step S89, $ZB_0$ is substituted with a value that is the value $ZC_0$ with K subtracted.

In step S91, each of the element processors 31 make a determination as to whether or not the operation of step S87 to step S90 has been repeated more than the number of pixels for the horizontal direction for the image format currently being handled. When it is determined that the operation of step S87 to step 90 has only been repeated a number of times that is equal to or less than the number of pixels for the horizontal direction of the image format currently being handled, step S87 is returned to and the operation of step S87 to step S90 is repeated again.

On the other hand, when each of the element processors 31 determine that the operation of step S87 to step S90 has been repeated more than the number of pixels for the horizontal direction of the image format currently being handled, step S92 is proceeded to.

In step S92, each of the element processors 31 make a determination as to whether K is larger than L, i.e. whether or not the process is an image enlarging process. When it is determined that K is larger than L, in step S94, the value of $ZA_0$ is utilized as the filter select number i and when K is determined to be less than or equal to L, in step S93, the value of $ZB_0$ is utilized as the filter select number i.

In this way, the filter select number i is calculated. In step S85 a dividing (or multiplying) operation is shown to be carried out but in reality subtracting is repeatedly carried out. Although the above process has a large number of processing steps, this is not a problem as this can be carried out before carrying out real time processing or can be carried out in the vertical flyingback period etc.

The positional relationship (method of inputting Ri of FIG. 14) of the input or output data and the element processors 31 can be set to correspond with the determinations occurring in step S84 and step S88, i.e. step S85 carries out the same processing as for the aforementioned phase modulo arithmetic. The element processor 31 at which a modulo operation occurs is then determined to be a place in FIG. 14 that does not have input data, in accordance with the determination occurring in step S84.

Eleventh Embodiment

The following is a description of a configuration of an eleventh embodiment of the present invention. The configuration of the eleventh embodiment is basically the same as the configuration of the fifth embodiment shown in FIG. 32.

The eleventh embodiment calculates the filter select numbers i and corresponding filter coefficient sets at each of the element processors 31 in the same way as in the ninth and tenth embodiments and therefore does not require the memories 28, 28A and 29.

A program controller 27D controls each of the element processors 31 and calculates the filter select numbers i and the corresponding filter coefficient sets in the same way as the program controllers of the third and fourth embodiments.

Other structural elements are the same as for the tenth embodiment and will not be described. Further, the operation at the time of calculating the filter coefficient sets is the same as that for the ninth embodiment and other operations are the same as those for the tenth embodiment and therefore will not be described here.

In the above embodiments, processing can be simplified by making the filter operations two-stage when the dividing number is made large in order to reduce the phase error.

For example, rather than replacing Cubic approximation of a dividing number of 16 with Cubic approximation of a dividing number of 256, first cubic approximation of a dividing number of 16 could be carried out. Processing for all of the interpolation can then be simplified by carrying out, for example, bilinear approximation of a dividing number of 16 on two close points of the interpolation values present in the results of this operation.

Further, as the pixel data usually comprises luminance data including luminance information and color data including color information, interpolation processing can be carried out at a larger dividing ratio for the luminance data that demands fine detail than for the color data.

In the above embodiments a description is given mainly of enlargement of images but reducing of images is also possible. When an image is reduced, input data is supplied in a dense manner in order to the input SAM 22 and is supplied to the output SAM 25 in a thinned out manner.

Further, as element processors 31 at the edges (left end and right end) of the embodiments do not have peripheral element processors 31 having input data utilized in calculations, calculations in these cases are carried out taking the value of the input data to be zero.

In addition to this, various methods such as, for example, continuing data for the ends on towards the outside or taking the ends as centers and assuming the data to be symmetrical can be considered as methods for processing the end sides of images. One of these methods can then be realized by simply listing a program corresponding to a prescribed method.

As the capacities of the memories 28, 28A and 29 depend on the numerators and denominators of the dividing numbers corresponding to the type of phase of a pixel or ratio of change and do not have to be larger than this, the size of these memories does not cause the device to become large.

According to the image processing device of the present invention, filter coefficient sets closest in phase to the phase of pixel data to undergo interpolation operations are outputted from a storage unit storing filter coefficient sets corresponding to each phase at the time of dividing pixel intervals of an original image by a prescribed dividing number to an operator. This operator then carries out pixel data interpolation operations using these filter coefficient sets so that images can be enlarged or reduced at arbitrary rates of change.

Further, according the image processing device of the present invention, filter coefficient sets of phases closest to the phases of pixel data to be processed of the filter coefficient sets corresponding to each of the phases when the pixel interval of the original image is divided by a prescribed dividing number are supplied to each of the element processors, with the element processors then carrying out pixel data interpolation processing utilizing these filter coefficient sets. Images can therefore be enlarged or reduced by arbitrary ratios of change using SIMD format parallel processors.

What is claimed is:

1. An image processing device for carrying out pixel data interpolation operations, comprising:

an operator for carrying out said interpolation operations between a source and a generated pixel; and a memory for storing filter coefficient sets utilized in said interpolation operation, wherein when a pixel interval of an original source image is divided by a prescribed dividing number, thereby requiring pixel interpolation, said filter memory then outputs a filter coefficient set to said operator, wherein said outputted filter coefficient set corresponds to a phase that is closest to a phase of a pixel data that is to undergo said interpolation operation, wherein said phase is the distance from a source image pixel to a generated image pixel, and said operator then carries out said pixel data interpolation operation utilizing said outputted filter coefficient set.

2. The image processing device of claim 1, wherein said dividing number is taken as a power of two.

3. An image processing device for processing pixel data interpolation operations in parallel under single instruction multiple data stream control, comprising:

a plurality of element processors for carrying out said pixel data interpolation operations;

a random access memory for storing filter coefficient sets utilized in said interpolation operations, and a controller for putting plurality of said element processors under single instruction multiple data stream control;

said random access memory supplying filter coefficient sets corresponding to a phase when a pixel interval of an original image is divided by a prescribed dividing number;

wherein said phase is closest to the phases of pixel data to be processed and is the distance of a source image pixel to a generated image pixel;

wherein a prescribed element processor carries out processing of said pixel data interpolation operations utilizing pixel data and filter coefficient sets possessed by a plurality of peripheral element processors.

4. The image processing device of claim 3, wherein said dividing number is taken as a power of two.

5. The image processing device of claim 3, wherein said element processor is a one bit processor processing data one bit at a time.

6. The image processing device of claim 3, wherein said pixel data is supplied to a plurality of said element processors in such a manner that types of patterns for positional relationships of said peripheral element processors and said prescribed element processor are reduced to the smallest possible number.

7. The image processing device of claim 3, wherein said memory storing said filter coefficient sets is connected to said element processors.

8. The image processing device of claim 7, wherein said memory stores said filter coefficient sets in order of phases corresponding to said filter coefficient sets.

9. The image processing device of claim 3, wherein said element processor comprises a storage unit for storing said filter coefficient sets and an arithmetic logic unit for carrying out operations, said filter coefficient sets corresponding to phase information for pixel data allotted to each element processor being supplied to said storage unit via said arithmetic logic unit.

10. The image processing device of claim 9, wherein said element processor calculates said phase information.

11. The image processing device of claim 9, wherein said storage unit storing said filter coefficient sets is connected to said arithmetic logic unit and stores said filter coefficient sets in order of phases corresponding to said filter coefficient sets.

12. The image processing device of claim 3, wherein said element processor calculates filter coefficient sets utilized in interpolation in accordance with phase information for pixel data allotted to said element processor.

13. The image processing device of claim 11, wherein said element processor calculates said phase information.

14. The image processing device of claim 3, wherein said interpolation operation is a calculation corresponding to Cubic approximation.

15. The image processing device of claim 3, wherein, said interpolation operations are carried out so that first interpolation operations are first carried out with a first dividing number in accordance with a first interpolation method and thereafter second interpolation operations are carried out with a second dividing number in accordance with a second interpolation method on results of said first interpolation operations.

16. The image processing device of claim 3, wherein said pixel data comprises luminance data and color data, said color data being interpolated using a filter coefficient set corresponding to each phase when a pixel interval of an original image is divided by a dividing number that is smaller than said dividing number corresponding to filter coefficient sets used when carrying out interpolation of said luminance data.

17. An image processing device for processing pixel data interpolation operations in parallel under single instruction multiple data stream control, comprising:
    a plurality of element processors for carrying out said pixel data interpolation operations;
    a random access memory for storing filter coefficient sets utilized in said interpolation operations; and
    a controller for putting a plurality of said element processors under single instruction multiple data stream control,
    said random access memory supplying said pixel data to a plurality of said element processors so that types of patterns for the positional relationships of peripheral element processors which have pixel data utilized by a prescribed element processor,
    wherein said prescribed element processors are reduced to the smallest possible number.

18. The image processing device of claim 17, wherein each of said element processors reads pixel data to be utilized in processing from said peripheral element processors in accordance with information, which corresponds to said patterns for positional relationships, supplied to each of said element processors and carries out processing of said pixel data.

19. The image processing device of claim 18, wherein said processing of said pixel data is processing for carrying out interpolation of pixel values corresponding to enlarging or reducing of an image, and information generated when calculating phases of said pixels is used as information corresponding to said patterns for positional relationships in said processing for said interpolation.

20. The image processing device of claim 17, wherein said element processor is a one bit processor processing data one bit at a time.

21. The image processing device of claim 17, wherein processing of said pixel data is processing for carrying out interpolation of said pixel values in accordance with Cubic approximation.

22. An image processing device for carrying out parallel processing for pixel data interpolation operations under single instruction multiple data stream control in association with enlarging or reducing of an image, said image processing device comprising:
    a plurality of element processors for carrying out said pixel data interpolation operations, said pixel data being supplied via an input bus to a plurality of said element processors; and
    a controller for putting a plurality of said element processors under single instruction multiple data stream control,
    a plurality of said element processors being also supplied with filter coefficient sets used in said interpolation via said input bus, and
    each of said element processors carrying out said pixel data interpolation processing using said filter coefficient sets corresponding to phases of said pixel data associated with enlarging or reducing of said image, wherein
    said phase is the distance of a source image pixel to a generated image pixel.

23. The image processing device of claim 22, wherein a scale of enlargement and reduction of an image is expressed by an integral ratio.

24. The image processing device of claim 22, further comprising a memory connected to said element processors via said input bus for storing said filter coefficient sets.

25. The image processing device of claim 24, wherein said memory stores a number K of said filter coefficient sets when said scale of enlargement or reduction is taken to be K:L, where K is the size of a newly generated image and L is the size of the original source image.

26. The image processing device of claim 25, wherein said memory stores K of said filter coefficient sets in accordance with the order of phases corresponding to said filter coefficient sets.

27. The image processing device of claim 22, wherein said element processor is one bit processor processing data one bit at a time.

28. The image processing device of claim 22, wherein processing of said pixel data is processing for carrying out interpolation of said pixel values in accordance with Cubic approximation.

29. An image processing device for carrying out parallel processing for pixel interpolation operations under signal instruction multiple data stream control in association with enlarging or reducing of an image, said image processing device comprising:

a plurality of element processors for carrying out said pixel data interpolation operations, said pixel data being supplied via an input bus to a plurality of said element processors, and a controller for putting a plurality of said element processors under single instruction multiple data stream control, a plurality of said element processors being also supplied with filter coefficient sets used in said interpolation via a circuit different from said input bus, and each of said element processors carrying out said pixel data interpolation processing using said filter coefficient sets corresponding to phases of said pixel data associated with enlarging or reducing of said image, wherein said phase is the distance of a source image pixel to a generated image pixel.

30. The image processing device of claim 29, wherein said element processor comprises a storage unit for storing said filter coefficient sets and an arithmetic logic unit for carrying out operations, and said image processing device further comprises a memory connected to said arithmetic logic units of said element processors via said circuit, for storing said filter coefficient sets.

31. The image processing device of claim 30, wherein said memory stores a number K of said filter coefficient sets when said scale of enlargement or reduction is taken to be K:L, where K is the size of a newly generated image and L is the size of the original source image.

32. The image processing device of claim 31, wherein said memory stores K of said filter coefficient sets in accordance with the order of phases corresponding to said filter coefficient sets.

33. The image processing device of claim 30, further comprising a second memory for storing phase information corresponding to pixel data allotted to said element processors, said memory supplying said filter coefficient sets to said element processors in accordance with said phase information stored in said second memory.

34. The image processing device of claim 30, wherein said element processors calculate phase information corresponding to pixel data allotted to said element processors, and said filter coefficient sets are supplied from said memory to said element processors in accordance with said phase information.

35. The image processing device of claim 34, wherein a scale of enlargement or reduction of said image it taken to be K:L, said element processor calculates said phase information by sequentially adding or subtracting one of K and L, where K is the size of a newly generated image and L is the size of the original source image.

36. The image processing device of claim 29, wherein said element processor is a one bit processor processing data one bit at a time.

37. The image processing device of claim 29, wherein processing of said pixel data is processing for carrying out interpolation of said pixel values in accordance with Cubic approximation.

38. An image processing device for carrying out parallel processing for pixel interpolation operations under single instruction multiple data stream control in association with enlarging or reducing of an image formed with supplied pixel data, said image processing device comprising:

a plurality of element processors for carrying out said pixel data interpolation operations, said pixel data being supplied via an input bus to a plurality of said element processors, and a controller for putting a plurality of said element processors under single instruction multiple data stream control, each of said element processors calculating filter coefficient sets used in said interpolation in accordance with phase information of pixel data allotted to each of said element processors, and carrying out said pixel data interpolation processing using said filter coefficient sets, wherein said phase is the distance from a source image pixel to a generated image pixel.

39. The image processing device of claim 38, further comprising a memory for storing said phase information.

40. The image processing device of claim 38, wherein said element processors calculate said phase information.

41. The image processing device of claim 40, wherein said element processor calculates said phase information using an interpolation function corresponding to said interpolation.

42. The image processing device of claim 38, wherein said element processor is a one bit processor processing data one bit at a time.

43. The image processing device of claim 38, wherein said pixel data processing is processing for carrying out interpolation of said pixel values in accordance with Cubic approximation.

* * * * *